(12) United States Patent
Harding et al.

(10) Patent No.: US 10,562,178 B2
(45) Date of Patent: Feb. 18, 2020

(54) MACHINE FOR BEAUTY SALON

(71) Applicant: WINK ROBOTICS, Oakland, CA (US)

(72) Inventors: Nathan Harding, Oakland, CA (US);
Kurt Amundson, Berkeley, CA (US);
Michael Muller, Augsburg (DE);
Russell B. Ford, Palo Alto, CA (US)

(73) Assignee: Wink Robotics, Oakland, CA (US)

( * ) Notice: Subject to any disclaimer, the term of this patent is extended or adjusted under 35 U.S.C. 154(b) by 0 days.

(21) Appl. No.: 16/461,273

(22) PCT Filed: Nov. 16, 2017

(86) PCT No.: PCT/US2017/061891
§ 371 (c)(1),
(2) Date: May 15, 2019

(87) PCT Pub. No.: WO2018/093964
PCT Pub. Date: May 24, 2018

(65) Prior Publication Data
US 2019/0335835 A1 Nov. 7, 2019

Related U.S. Application Data

(60) Provisional application No. 62/423,000, filed on Nov. 16, 2016.

(51) Int. Cl.
*B25J 9/16* (2006.01)
*G06K 9/00* (2006.01)
(Continued)

(52) U.S. Cl.
CPC ........... *B25J 9/043* (2013.01); *A41G 5/02* (2013.01); *B25J 9/023* (2013.01); *B25J 9/1615* (2013.01);
(Continued)

(58) Field of Classification Search
CPC ............ G06K 9/00281; G06T 7/70; G06T 2207/30201; A41G 5/02; B25J 9/023; B25J 9/041; B25J 9/042; B25J 9/043; B25J 9/1615; B25J 9/1679; B25J 9/1682; B25J 9/1694; B25J 9/1697
See application file for complete search history.

(56) References Cited

U.S. PATENT DOCUMENTS 7,600,519 B2  10/2009  Dinh .......................... 132/201
8,061,365 B2  11/2011  Rehkemper et al. ........ 132/73.6
(Continued)

FOREIGN PATENT DOCUMENTS

| JP | 2008017936 A | 1/2008 | ............ A45D 44/00 |
| JP | 2017073099 A | 4/2017 | ............ G06T 7/60 |
| WO | WO 2016/014132 A1 | 1/2016 | ............ A45D 29/00 |

*Primary Examiner* — Andrew W Johns
(74) *Attorney, Agent, or Firm* — Diederiks & Whitelaw, PLC.

(57) ABSTRACT

A device for automating the process of installing eyelash extensions onto the natural eyelashes of a subject with an option of additionally painting the nails of a subject. In some embodiments, the placing of extensions is carried out by a robotic mechanism utilizing computer vision, and in some embodiments, a barrier is created between the robotic mechanism and said subject in order to protect them in the event of a malfunction.

53 Claims, 35 Drawing Sheets

(51) Int. Cl.
  *B25J 9/04* (2006.01)
  *A41G 5/02* (2006.01)
  *B25J 11/00* (2006.01)
  *G06T 7/70* (2017.01)
  *B25J 9/02* (2006.01)

(52) U.S. Cl.
  CPC ........... *B25J 9/1697* (2013.01); *B25J 11/008* (2013.01); *G06K 9/00281* (2013.01); *G06T 7/70* (2017.01); *G06T 2207/10012* (2013.01); *G06T 2207/30201* (2013.01)

(56) References Cited

U.S. PATENT DOCUMENTS

| | | |
|---|---|---|
| 8,113,218 B2 | 2/2012 | Nguyen .................. 132/201 |
| 8,127,774 B2 | 3/2012 | Dinh ..................... 132/201 |
| 8,396,598 B2 | 3/2013 | Sutherland et al. ......... 700/264 |
| 8,464,732 B2 | 6/2013 | Wong .................... 132/317 |
| 8,701,685 B2 | 4/2014 | Chipman ................ 132/201 |
| 8,899,242 B2 | 12/2014 | Wong .................... 132/218 |
| 8,911,453 B2 | 12/2014 | Tenney et al. ......... A61B 19/50 |
| 8,967,158 B2 | 3/2015 | Sanbonmatsu ......... A41G 5/02 |
| 2012/0158019 A1 | 6/2012 | Tenney et al. ............. 606/133 |
| 2014/0261514 A1 | 9/2014 | Martins et al. ......... A41G 5/02 |
| 2017/0193283 A1* | 7/2017 | Li .................. G06K 9/00268 |

* cited by examiner

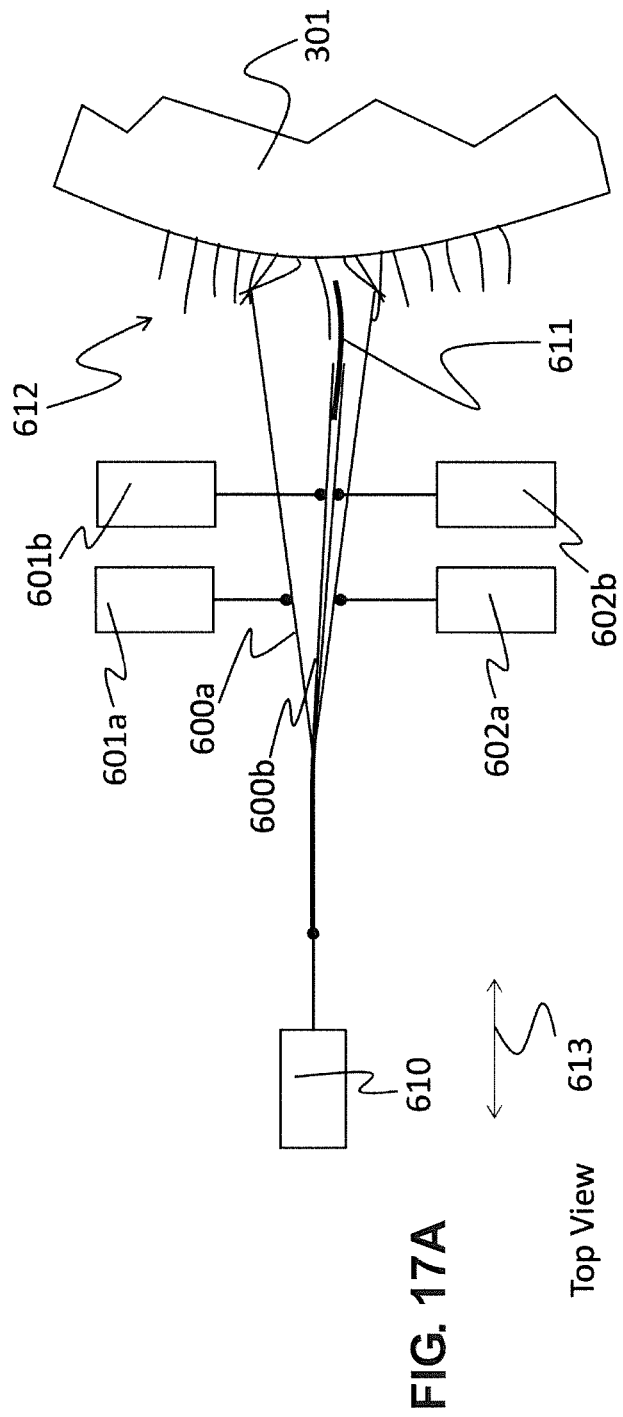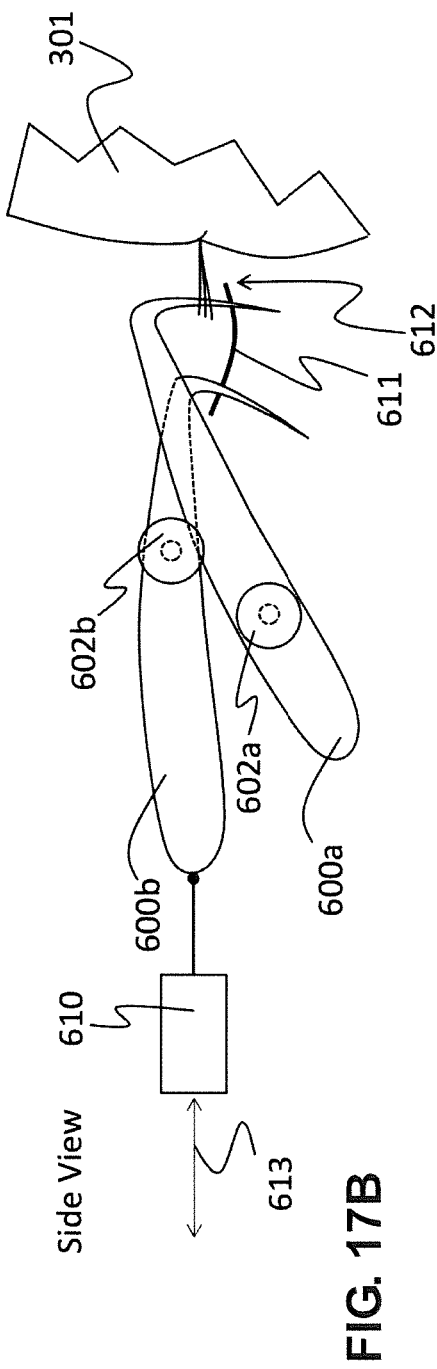
FIG. 17A Top View
FIG. 17B Side View

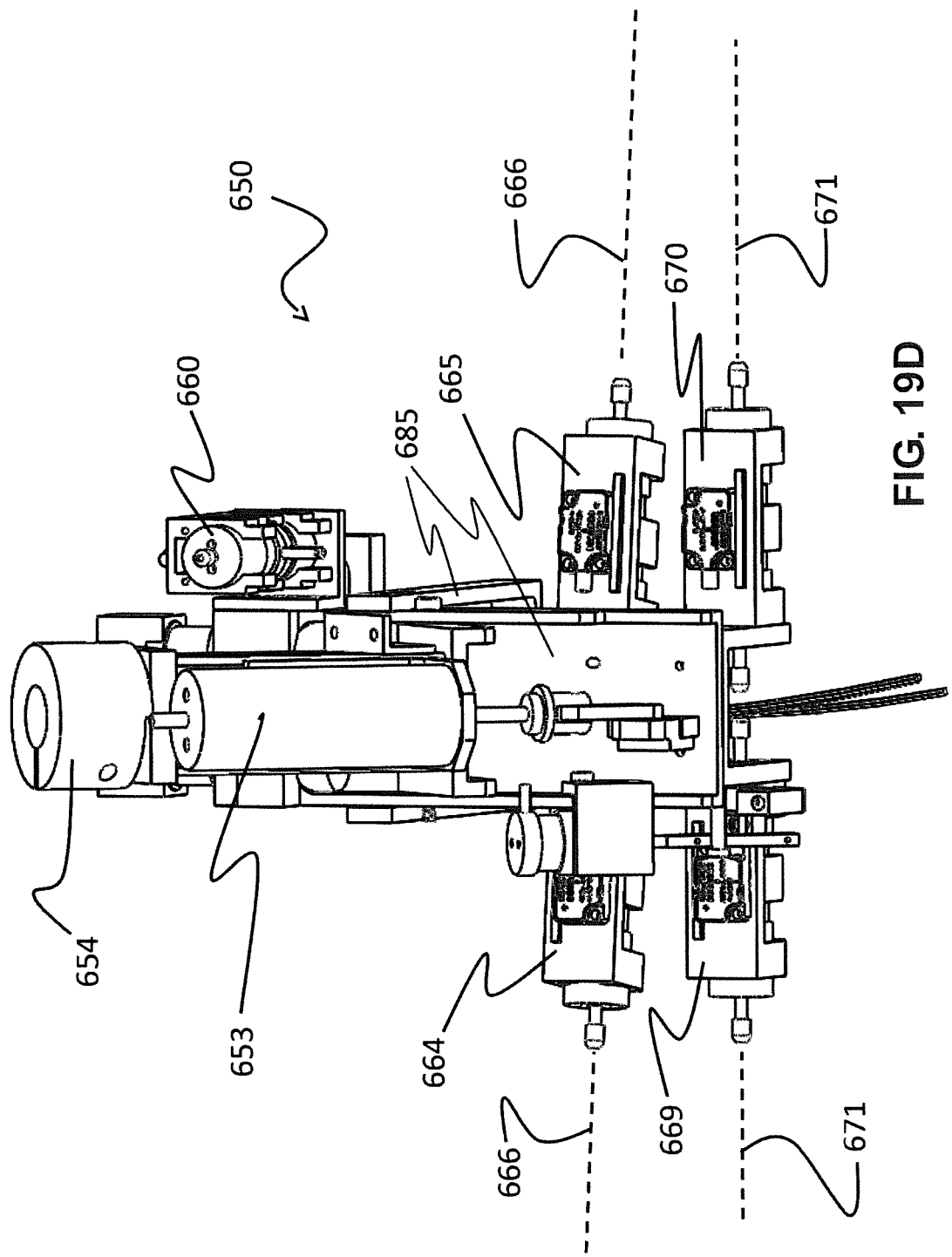

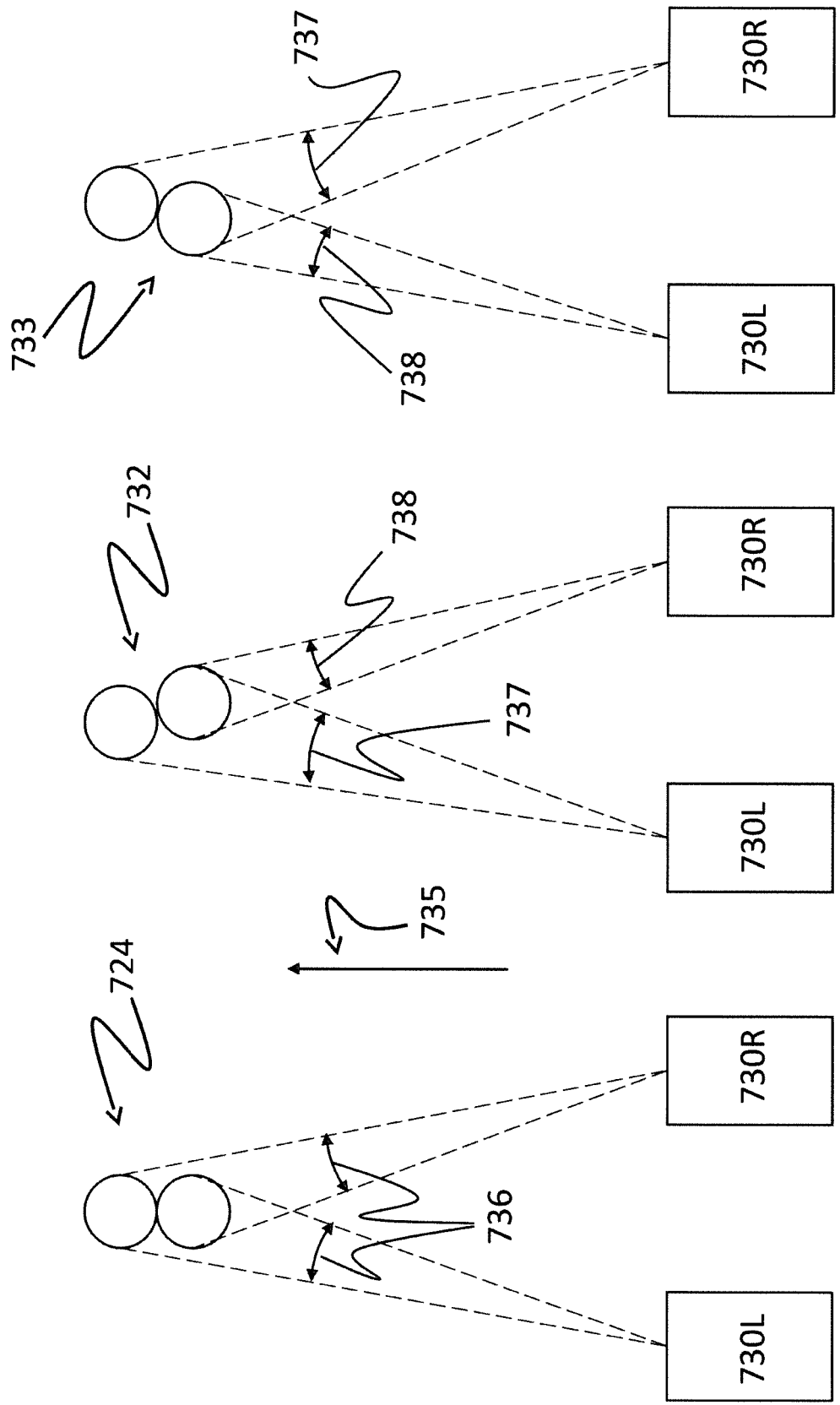

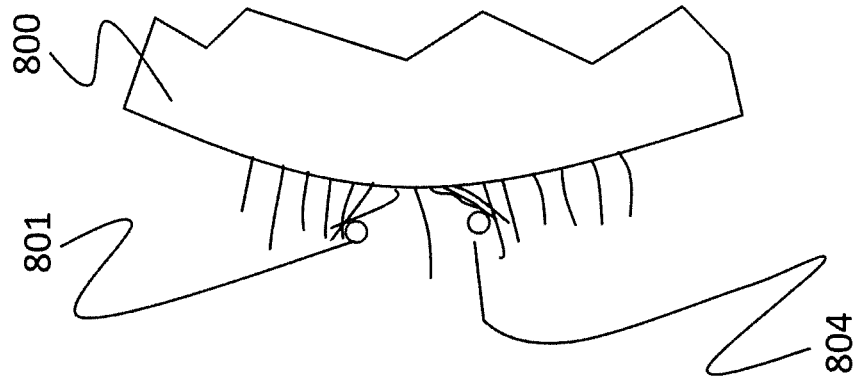
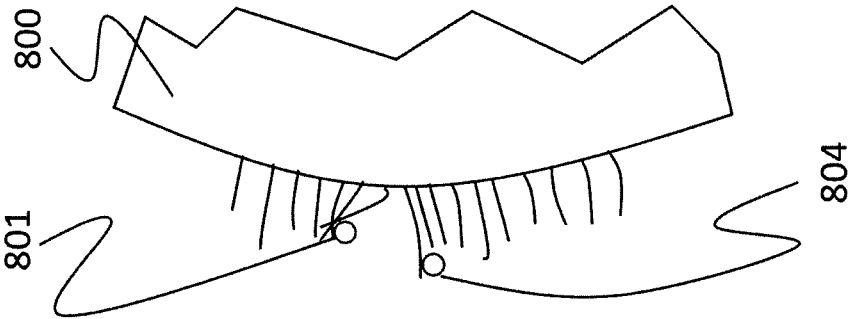
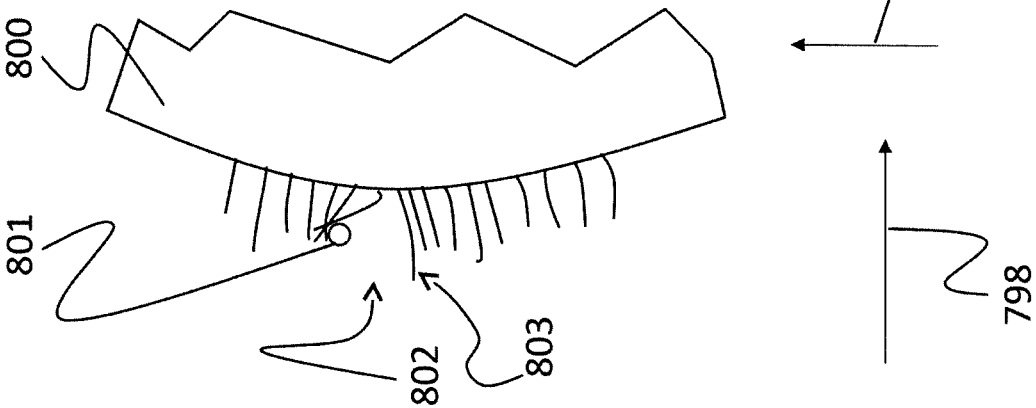
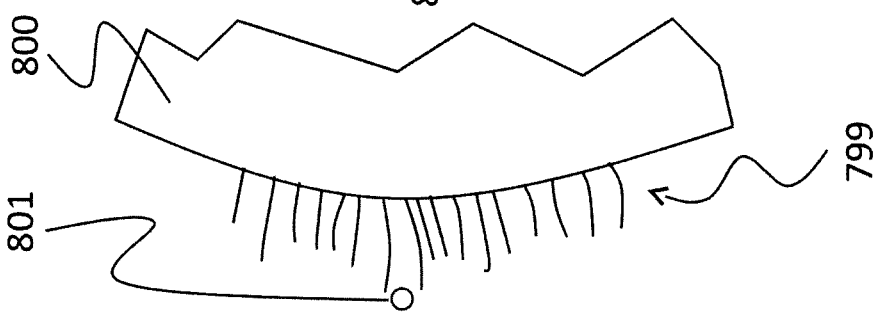

MACHINE FOR BEAUTY SALON

CROSS-REFERENCE TO RELATED APPLICATIONS

This application represents the U.S. National Phase of International Application No. PCT/US2017/061891, filed on Nov. 16, 2017 and titled "Machine for Beauty Salon" which claims the benefit of U.S. Provisional Application No. 62/423,000, which was filed on Nov. 16, 2016 and titled "Machine for Beauty Salon". The entire contents of these applications are incorporated herein by reference.

FIELD OF THE INVENTION

The invention relates to the process of applying eyelash extensions and optionally to applying nail polish.

BACKGROUND OF THE INVENTION

Eyelash extensions are increasing in popularity all over the world. Eyelash extensions are usually differentiated from what is called an "artificial eyelash" or an "artificial eyelash structure" by the fact that they are affixed one to one to a natural eyelash fiber. An "artificial eyelash" is a complete set of eyelash fibers (usually for one eye) that is connected to a backing material (a thin strip at the proximal end of the eyelash fibers), which is affixed to the eyelid. This process is therefore simpler and is provided for home use. Eyelash extensions, however, are laboriously glued, usually with a cyanoacrylate adhesive, to each natural eyelash fiber one at a time by a beauty technician. Extensions may have branches, such as shown in U.S. Pat. No. 8,127,774, and there are some schemes for interlocking with nearby eyelashes, such as disclosed in U.S. Pat. No. 8,113,218.

When eyelash extensions are applied for the first time, the appointment can take a considerable amount of time, lasting up to two hours. During an appointment, each eyelash extension must be picked up in the proper orientation with tweezers, dipped in adhesive, and then placed against one of the subject's natural eyelash fibers until adhesion occurs. Because this large amount of labor costs beauty salons money, and because the length of time required and cost deters some customers, there have been some labor-saving devices proposed. One such device is a dispenser for eyelashes that is held in the hand, disclosed in U.S. Patent Application Publication No. 2014/0261514. There have also been labor saving proposals regarding the trays on which the extensions come from the factory, such as can be seen in U.S. Pat. No. 8,701,685. These trays are intended to combat the fact that it is not only the adhesion step of the process which is difficult for humans. Just picking the eyelash extensions up with a pair of tweezers is challenging. Also, it has been proposed that the handling of adhesive and the step of dipping the extension into adhesive can be eliminated by providing each extension with a pre-installed piece of heat shrink tubing which is used to affix the extension to the natural eyelash fiber.

There is a need, therefore, for a way to more effectively install eyelash extensions, which would reduce both the time and the cost of doing so. The invention described here applies to all eyelash extensions, whether branched, interlocked, or otherwise, and to all methods of adhesion to the natural eyelash, whether by adhesive, heat shrink tubing, or otherwise.

SUMMARY OF THE INVENTION

The invention is a machine which contains a robotic mechanism for installing eyelash extensions. It can also include a structure which protects the subject from the robotic mechanism. The robotic mechanism is controlled by a control system which includes a sensor system that can identify and locate eyelash fibers (some of which are natural and some of which are artificial). It also includes a manipulator, which may resemble tweezers, that is used to pick up eyelash extensions, apply adhesive if necessary, and place the extension against the natural eyelash fiber on which it is to be adhered. In one embodiment, the robotic mechanism and control system can also be used to apply nail polish or nail polish remover to the hand.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 17A is a top view of an alternative robotic head mechanism using the curved tweezers of FIGS. 16A-E.

FIG. 17B is a side view of the alternative robotic head mechanism of FIG. 17A.

FIG. 19D is a fourth view of the robotic head mechanism of FIG. 19A.

FIG. 24A shows how a stereo camera system can help identify eyelash clusters.

FIG. 24B shows how the stereo camera system of FIG. 24A can help identify eyelash clusters.

FIG. 24C shows how the stereo camera system of FIG. 24A can help identify eyelash clusters.

FIG. 30A shows a first portion of a method of isolation using two separate probes and not requiring good knowledge of eyelash location until the latter steps.

FIG. 30B shows a second portion of the method of FIG. 30A.

FIG. 30C shows a third portion of the method of FIG. 30A.

FIG. 30D shows a fourth portion of the method of FIG. 30A.

DETAILED DESCRIPTION OF THE INVENTION

The following description sets forth numerous specific configurations, parameters, and the like. It should be recognized, however, that such description is not intended as a limitation on the scope of the present invention but is instead provided as a description of exemplary embodiments.

In the following description, when the term "eyelash" is used, it is meant to refer to one or more natural eyelash fibers of a person. When the term "eyelash extension" or "extension" is used, it is meant to refer to an artificial eyelash extension. When the term "fan of the eyelashes" is used, it refers to all the natural eyelashes associated with an eye.

Robotic Eyelash Extension

Figure 1:
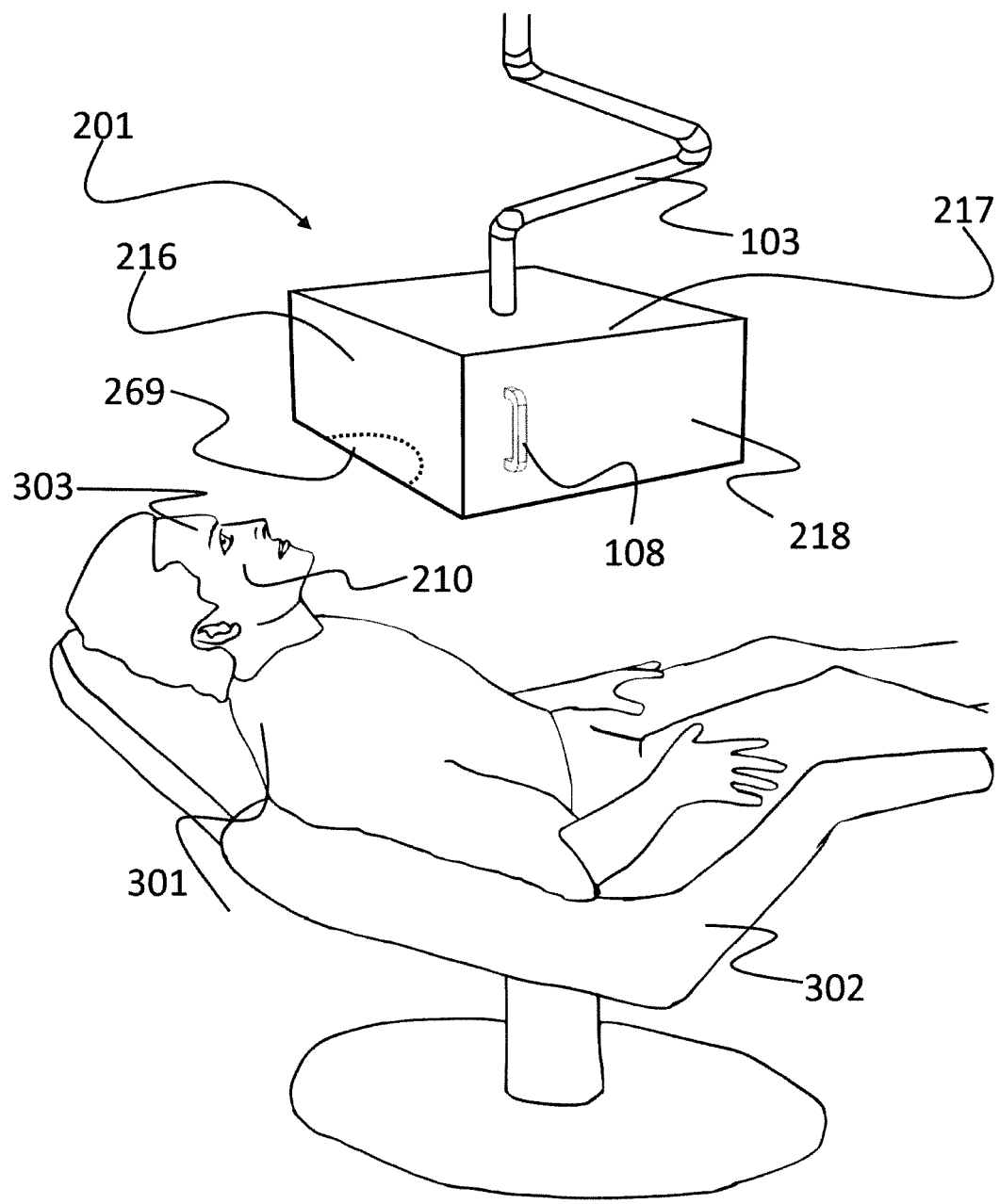
FIG. 1 shows the basic external features of an embodiment of the invention.

FIG. 1 is an external view of a robotic eyelash extension system which illustrates the basic external features of an embodiment of the present invention. This embodiment has an enclosure 201 which is intended to protect a subject 301 and the user (the word "subject" will be used to denote the person who is receiving the eyelash extensions, and the word "user" will be used to denote the person who is operating the equipment, usually, but not necessarily a beauty technician). Subject 301 reclines on a chair 302 much like the chair in a dentist office or, more appropriately, the type of beauty salon chair that can recline as is often done in order to wash a subject's hair. Enclosure 201 is attached to the floor, ceiling, or chair by an arm 103 which is used to position enclosure 201 against the face of subject 301 so that the robotic mechanism inside will have access to the eyelashes of subject 301. Arm 103 can take many forms (and can even be just a cart that rolls enclosure 201 above subject 301 and has an easy way to set the distance from the floor to enclosure 201), but here the arm is meant to be portrayed as the arm typically used in the dental office to position various tools such as an x-ray device. Arm 103 can include a pantograph mechanism (not shown) like the ones used in dental offices to keep the dentist's instrument table level at all times as it is moved easily to various positions. Arm 103 can also be a simple swing arm rotating about a vertically oriented pivot. The system in FIG. 1 also shows a window 269 which is comprised of an opening on the underside of enclosure 201 that permits the robotic mechanism access to the eyelashes of subject 301 when enclosure 201 is in proximity to subject 301. Of course, while enclosure 201 can protect subject 301 and the user from the robotic mechanism, it cannot protect against parts of the robotic mechanism that can protrude from window 269. There are several ways to further ensure safety. First, experts in robotics will note that it is possible to create a robot that is inherently safe through strict process controls and redundant sensing and processing such as is done in surgical robotics. However, it is also possible to provide a layer of protection placed on the person such that the robotic mechanism cannot reach any portion of subject 301 through window 269 except their eyelashes. It is even possible to design the robotic mechanism to be so weak that it cannot damage the human eye (this is possible because the eyelash extension being applied is extremely light and can be manipulated by a very weak robot). For the following discussion, it will generally be assumed that the robot is inherently safe and can operate in close proximity to the human subject and user without undue risk, although the embodiments presented here are generally appropriate regardless of choice of safety system.

Figure 2:
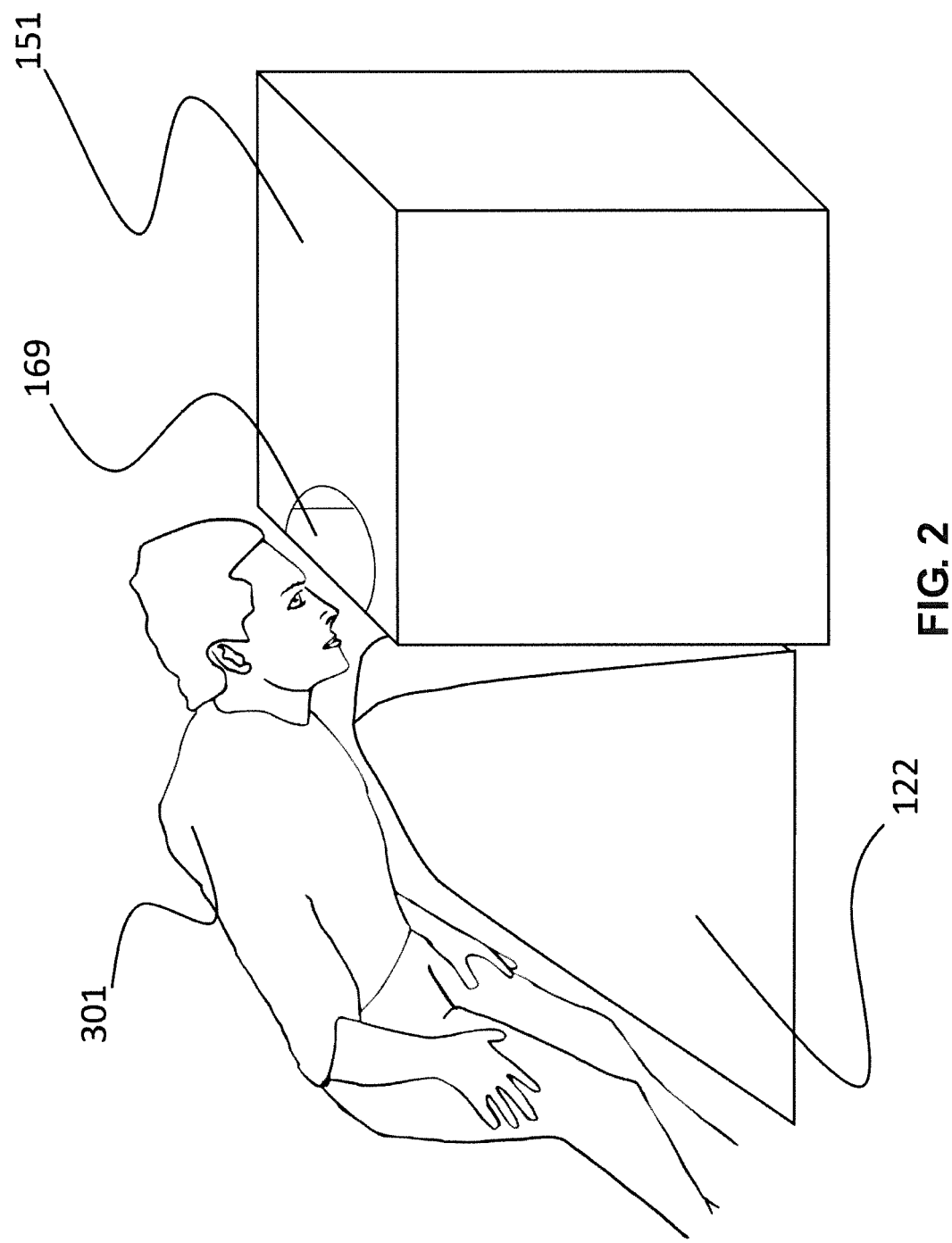
FIG. 2 shows an embodiment with an alternate pose of a subject.

In an alternate embodiment, shown in FIG. 2, subject 301, rather than reclining, leans forward over an alternate chair 122. In FIG. 2, alternate chair 122 is depicted as a large padded pyramidal form, but chair 122 can just as easily be a forward-facing massage chair or a kneeling computer chair. In this embodiment, an alternate enclosure 151 can sit on the floor or support surface, with an alternate opening 169 on its top side. Of course, this will result in a different orientation of the robotic mechanism, but it is well understood in the art of robotics how the orientation of a robot can be adjusted. Advantageous to this alternate embodiment is that subject 301 can remove themselves from the system at any time, where in the previous embodiment, enclosure 201 is removed before subject 301 can exit. Furthermore, this embodiment also places alternate enclosure 151 on the ground or support surface directly, or on short legs, reducing the need for other support structure. However, it is disadvantageous that many persons find this posture less comfortable than the reclined posture of the previous embodiment. Nevertheless, the two embodiments can generally use similar robotic mechanisms and equipment.

Figure 3:
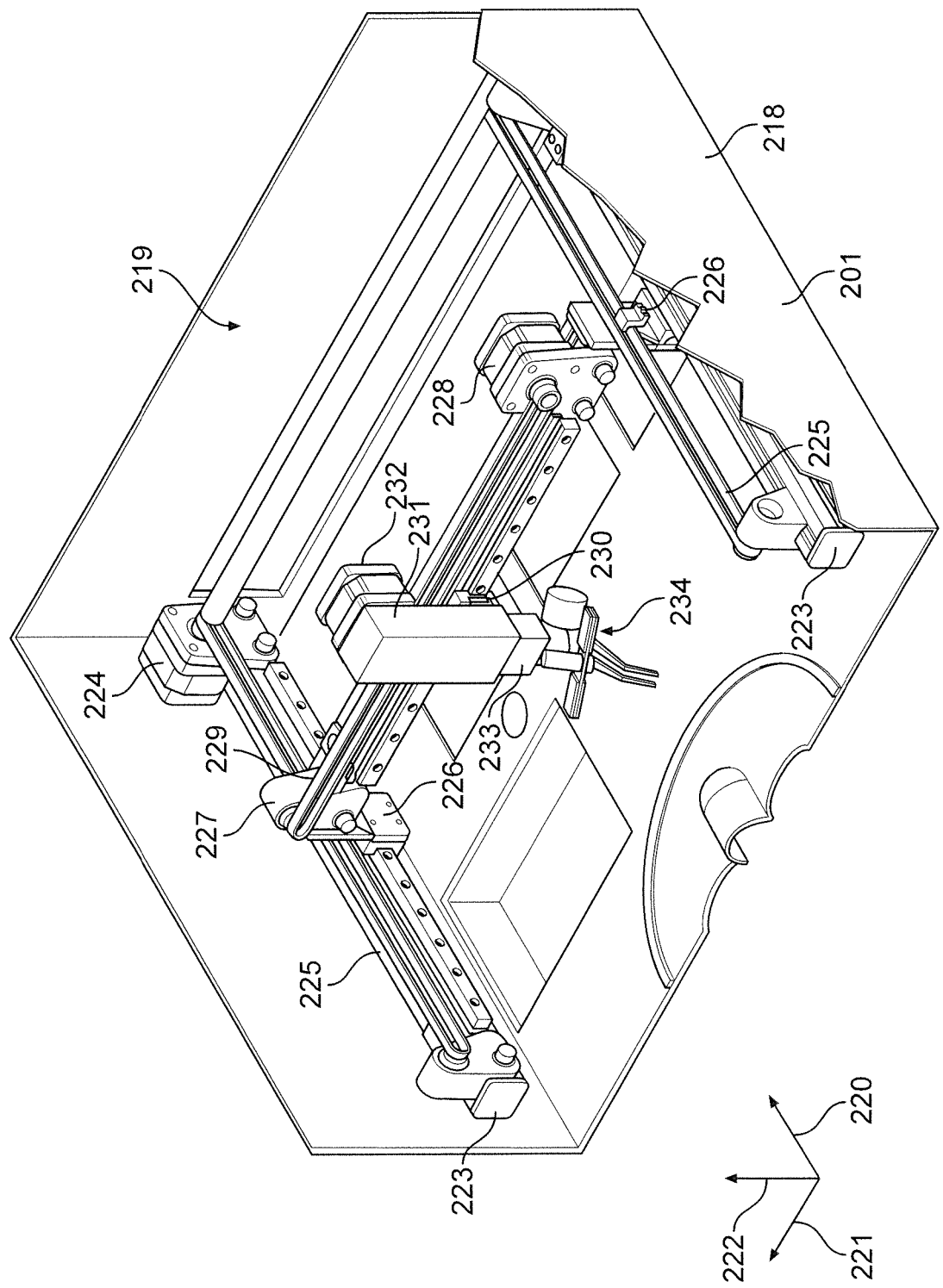
FIG. 3 shows the internal components of an enclosure.

In FIG. 3, a front face 216 and a roof 217 (see FIG. 1) of enclosure 201 have been omitted so that the inside of enclosure 201 can be seen. Also, a right side 218 of enclosure 201 has been cut away to add visibility. It can be seen that there is a robotic mechanism 219 inside enclosure 201. Mechanism 219 is of a type commonly referred to as a "Cartesian robot" or an "xyz stage." It is a combination of linear actuators (and some rotational axes on the head which will be discussed below) which move the mechanism linearly in various directions. In FIG. 3, the direction of the x-axis is shown by an arrow 220, the direction of the y-axis by an arrow 221, and the direction of the z-axis by an arrow 222. In FIG. 3, robotic mechanism 219 has two x-axis actuators 223 which are powered by an x-axis motor 224 which is connected to x-axis belts 225 which move x-axis carts 226 back and forth along the x-axis. The wiring and other details used to implement robotic mechanism 219 have been omitted for clarity.

Robotic mechanism 219 also has a y-axis actuator 227 which is mounted on x-axis carts 226. Y-axis actuator 227 is powered by a y-axis motor 228 which is connected to a y-axis belt 229 which moves a y-axis cart 230 back and forth along the y-axis. Robotic mechanism 219 also has a z-axis actuator 231 which is mounted on y-axis cart 230. Z-axis actuator 231 is powered by a z-axis motor 232 which is connected to a z-axis slide 233 by a belt which is not visible but which moves z-axis slide 233 up and down along the z-axis. A robotic head mechanism 234 is connected to z-axis slide 233.

Figure 4:
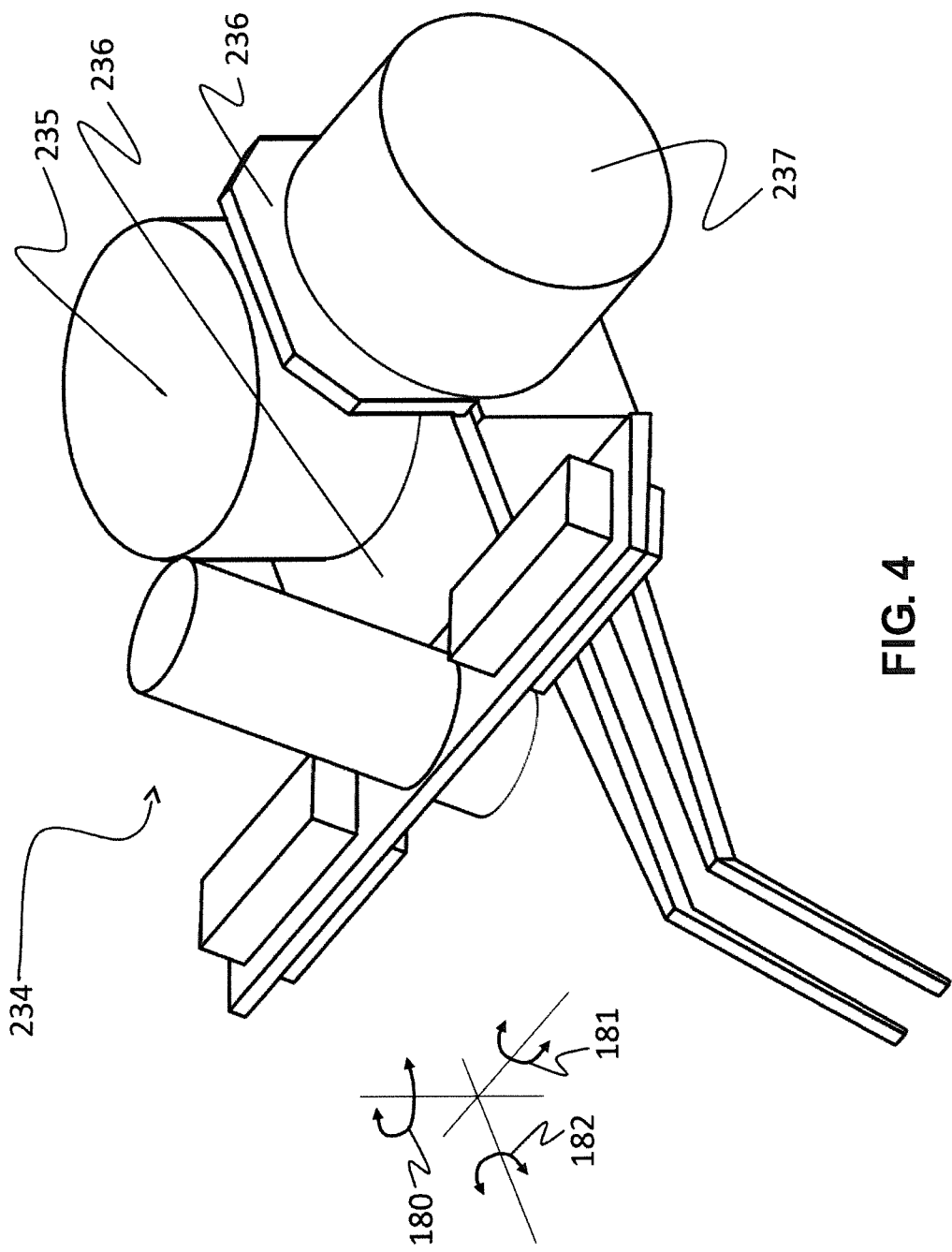
FIG. 4 is a detailed view of a robotic head mechanism.
Figure 5:
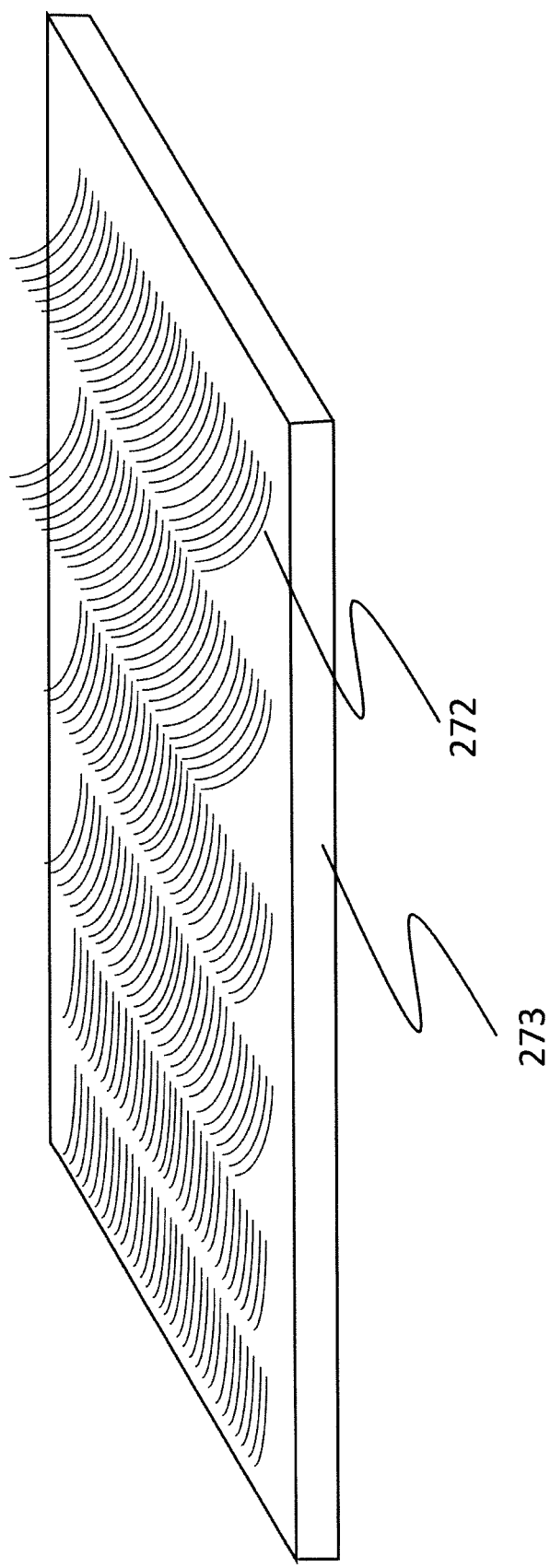
FIG. 5 shows a typical tray of eyelash extensions as provided by the manufacturer.

Robotic head mechanism 234 is shown in FIG. 4 with the other parts of robotic mechanism 219 omitted for clarity. In FIG. 4, the orientation terms are labeled as a tilt (or pitch) axis 181, a roll axis 182, and a twist (or yaw) axis 180. The first component of robotic head mechanism 234 is mounted to z-axis slide 233 and, in this embodiment, is a twist axis actuator 235. Actuator 235 uses an internal mechanism and motor to rotate the remainder of robotic head mechanism 234 about the z-axis. Below twist axis actuator 235 is a tilt actuator bracket 236 which connects the bottom of twist axis actuator 235 to a tilt axis actuator 237. Actuator 237 uses an internal mechanism and motor to rotate the remainder of robotic head mechanism 234 about an axis perpendicular to the z-axis but which rotates with twist axis actuator 235. In this embodiment, there are five axes which are actuated: x (actuators 223); y (actuator 227); z (actuator 231); twist (actuator 235); and tilt (actuator 237). One skilled in the art will note that in order to get a truly arbitrary position of the end effector, a robot must have at least six degrees of freedom. However, in this embodiment, the complication of an additional axis is avoided by ensuring that the extensions are presented to robotic mechanism 219 in a generally consistent orientation. This is possible because artificial eyelash extensions generally come in regular rows, such as the extensions shown in a row 272 of FIG. 5. Regardless, it is easy to see that a roll axis actuator can be added beside tilt axis actuator 237 to provide this axis if desired.

Figure 6:
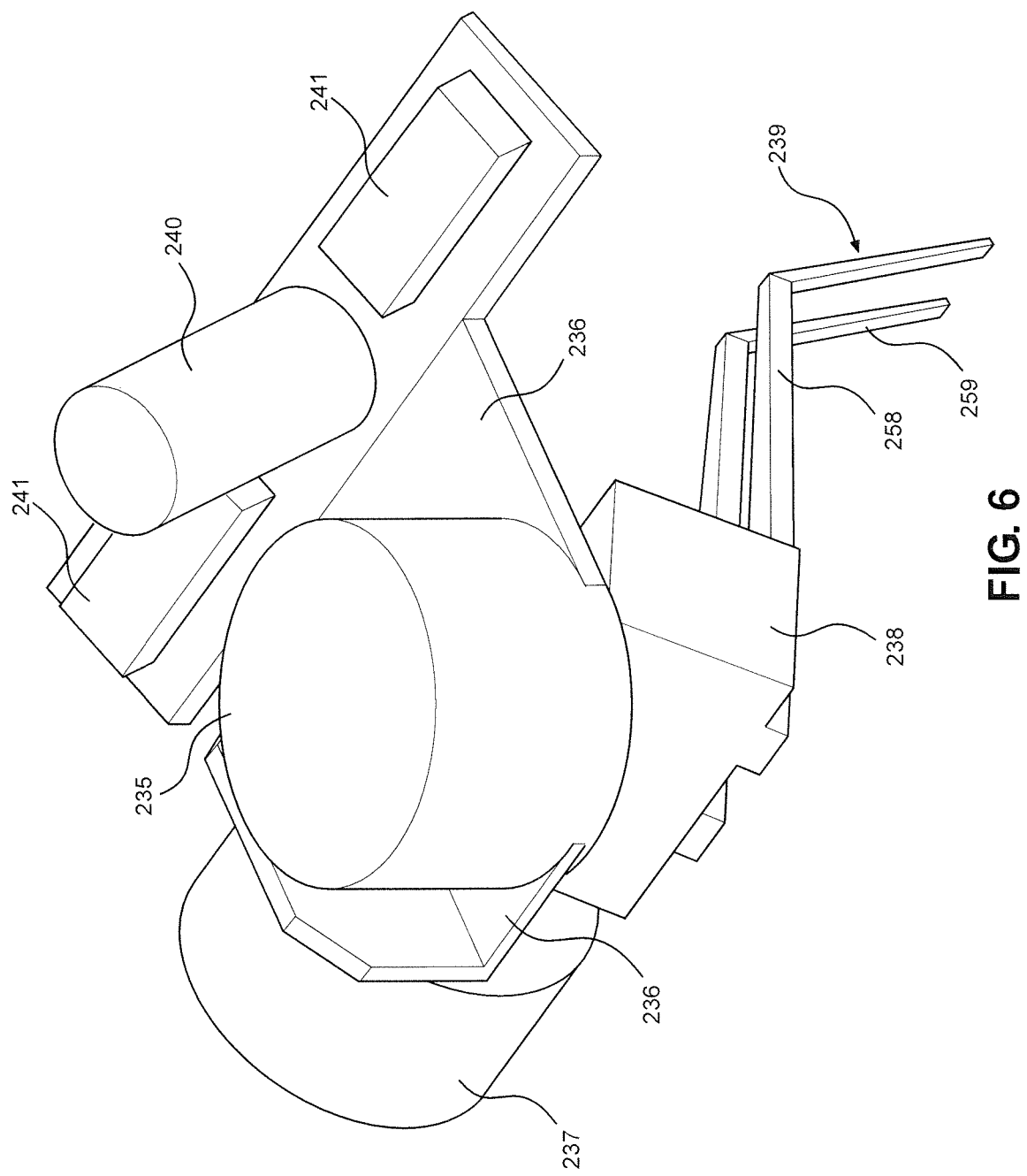
FIG. 6 is a detailed view of the robotic head mechanism from an alternate angle and with the tilt axis moved.
Figure 7:
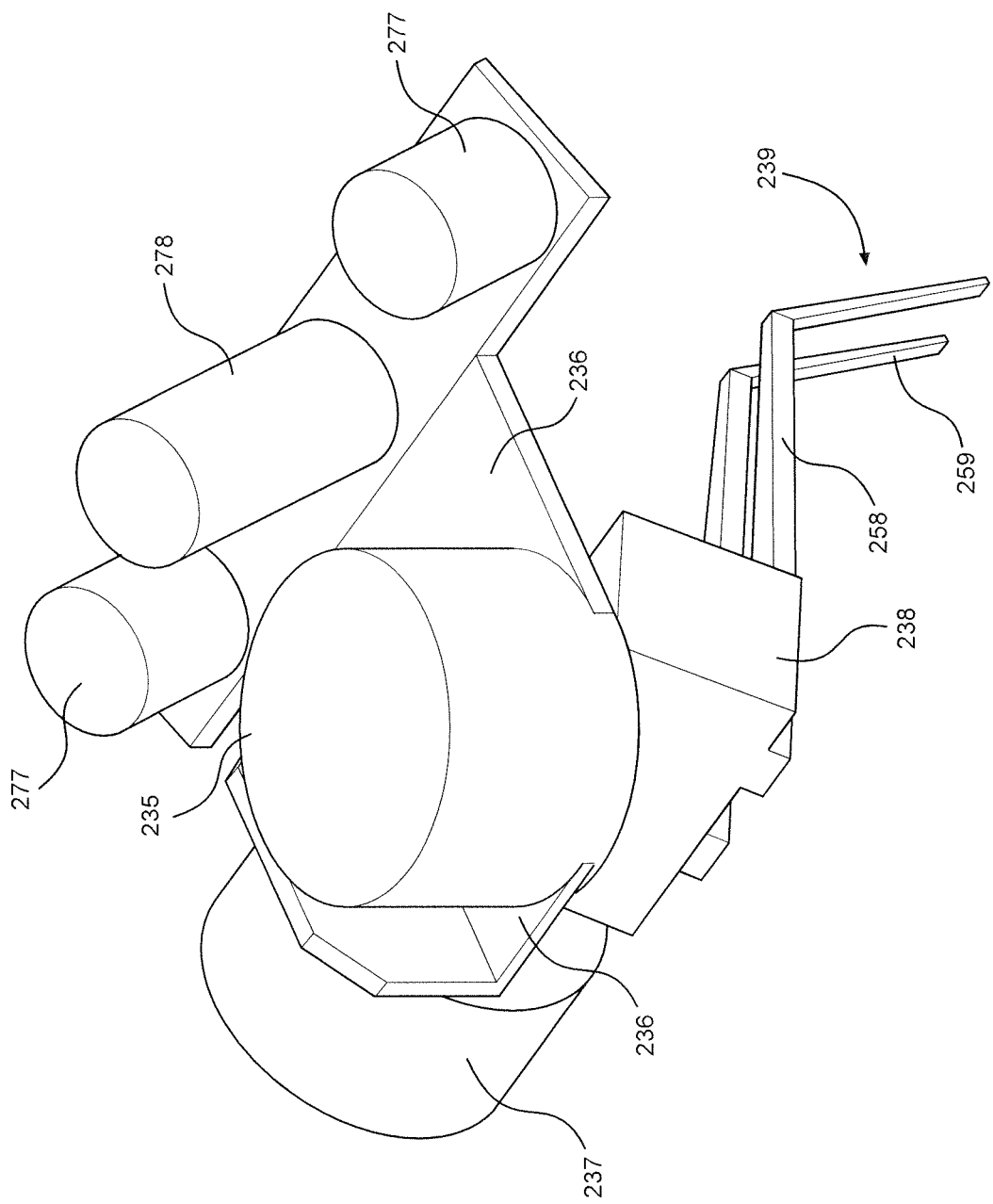
FIG. 7 is a detailed view of the robotic head mechanism with an alternate computer vision system.

FIG. 6 is a detailed view of robotic head mechanism 234 from an alternate angle and with the tilt axis moved. A gripping actuator 238 is mounted directly to the output of tilt axis actuator 237 and has a simple mechanism to grip and ungrip tweezers 239. Tweezers 239 have a stationary side 258 and a moving side 259. By "stationary", it is meant that side 258 of tweezers 239 does not move with respect to the rest of robotic head mechanism 234 when gripping actuator 238 is actuated but moving side 259 does. Gripping actuator 238 can be a simple pneumatic actuator, solenoid-type actuator, electric motor, or any number of gripping mechanisms commonly used. Of course, any of these types of actuators can be selectively actuated by a computer system or controller. Also mounted to tilt axis actuator bracket 236 (and therefore not moving with the tilt axis in this embodiment) are a camera 240 and LED light arrays 241. These are used by the robotic mechanism control system's controller to illuminate and locate both natural eyelashes and synthetic eyelash extensions. The control system can take the form of a controller using computer vision (also sometimes referred to as machine vision) techniques to try to estimate the position and orientation of the natural eyelashes and synthetic eyelash extensions. For example, the robotic mechanism control system can be a microprocessor running the ROS™ operating system and programmed using computer vision routines from the OpenCV™ library in order to perform the basic functions of processing images from camera 240 and estimating positions. Camera 240 is a digital camera in communication with a computer or controller. One skilled in the art will note that, for better capability of locating the natural eyelash fibers and synthetic eyelash extensions in three-dimensional space, two cameras can be used and substituted for camera 240 in a technique referred to as binocular or stereo computer vision. Such a configuration is shown in FIG. 7, with two stereo cameras 277 shown, one on either side of a single light 278. The importance of providing stereo cameras 277 in some embodiments is that it allows the computer vision system to compute the location and orientation of an object in all six (X, Y, Z, A, B, C) spatial dimensions provided that the object can be suitably recognized in images from both cameras. In some embodiments, a single camera can be used with a mirror and/or prism in order to produce a pair of stereoscopic images onto one camera. Alternatively, a structured light range finder or scanning AM or FM laser range finder can be used to locate the natural eyelash fibers and synthetic eyelash extensions in three-dimensional space. In fact, there are many solutions available today that can accomplish this task. Likewise, illumination can be provided by many sources other than LED, or illumination can be rendered unnecessary by using a device such as a structured light range finder to accomplish the task of determining the position and orientation of the fibers.

Figure 8:
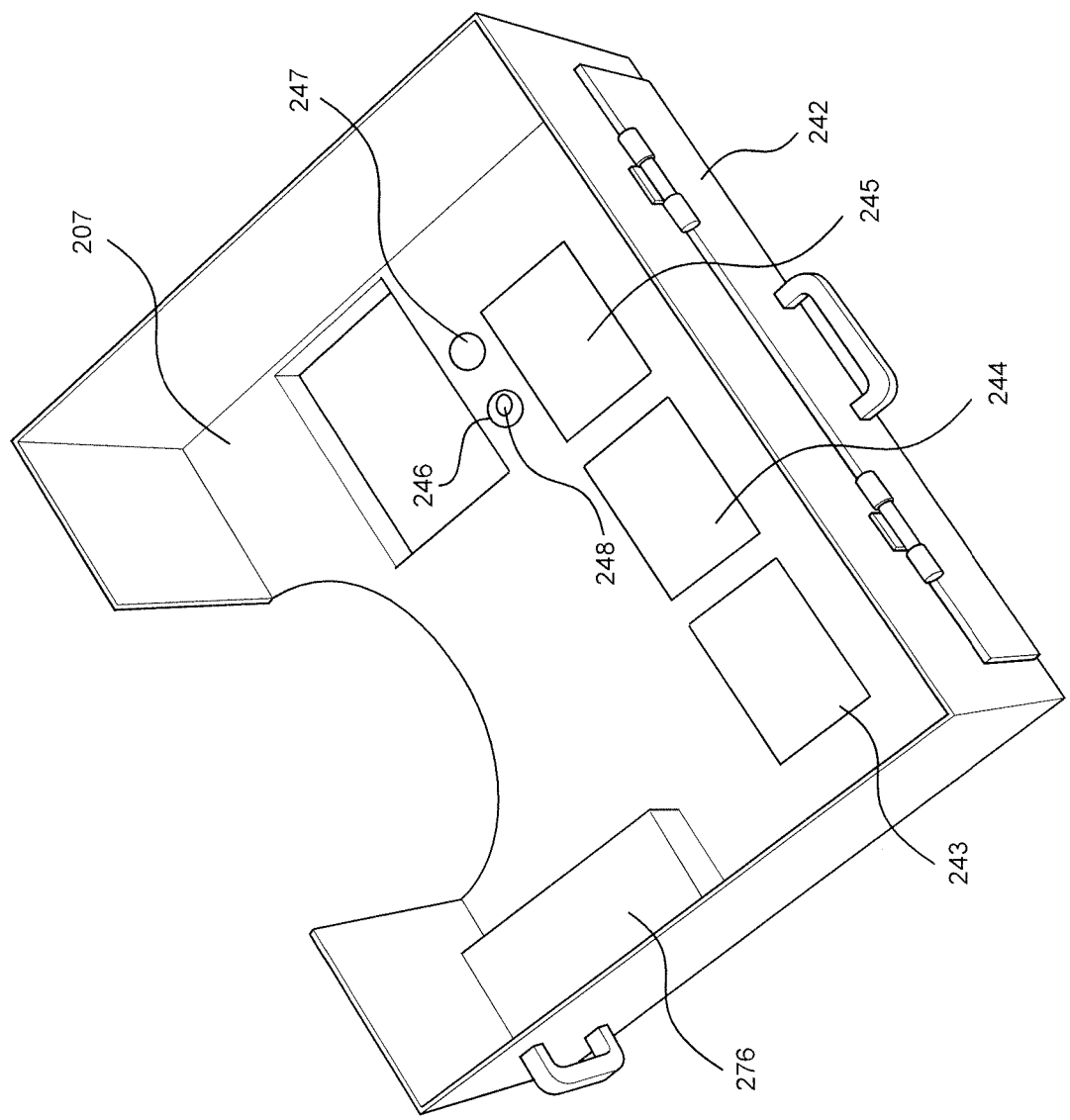
FIG. 8 is a view looking downward from the backside of the enclosure.

Looking at the backside of the machine in FIG. 8 (most internal elements have been removed for clarity), one can see that there is an access door 242 which can be opened to provide access to the inside of enclosure 201. Inside enclosure 201, there are target zones where the user can leave consumable materials to be used by the machine. In this embodiment, there are three rectangular zones indicated on a floor 207 of the machine. These are an extension A loading zone 243, an extension B loading zone 244, and an extension C loading zone 245. Zones 243-245 are where trays of eyelash extensions of various lengths and/or shapes can be placed for tweezers 239 to have access. Eyelash extensions typically come on trays, such as an eyelash extension tray 273 shown in FIG. 5, with various rows of extensions mounted to a sticky backing material. In this embodiment, the user can place one size of extension in extension A loading zone 243, a tray containing another size in extension B loading zone 244, and a tray containing yet another size in extension C loading zone 245. The control system can have a user interface (such as a touchscreen mounted to the outside of enclosure 201—not shown) which would allow the user to designate which region of the eye would use size A, which region would use size B, which region would use a mix of A and B, etc. Since robotic mechanism 219 is using a vision or other system to locate the extensions, the exact placement of the tray in the loading zone can be flexible so as to not cost the user much time in placing trays. In some embodiments, the trays can include an identifying tag such as a barcode or RFID tag that can be used to automatically identify the type of tray.

Also seen from the backside of the machine in FIG. 8 are two round zones designated on floor 207 of enclosure 201. These zones are meant to illustrate possible liquid loading zones: a liquid A loading zone 246 and a liquid B loading zone 247. In this embodiment, liquid A loading zone 246 is shown with an adhesive cup 248 placed in the zone. Adhesive cup 248 is a shallow cup in which the user places a few drops of the adhesive (usually cyanoacrylate, but it can be a special adhesive such as cyanoacrylate augmented with an anti-bacterial compound such as silver ions) which will be used to bond the synthetic extensions to the natural eyelash fibers. Liquid B loading zone 247 can be used for various other liquids. For example, a primer for the adhesive can be placed in liquid B loading zone 247 in a receptacle that includes a swab-like tool which tweezers 239 can grab in order to distribute primer to the eyelashes of subject 301. However, in practice, it can be easier to have the user apply primer to the eyelashes of subject 301 before starting. In some embodiments, the adhesive can be applied by an automatic applicator that dispenses adhesive on demand. In some embodiments, the adhesive can be cured at an accelerated rate by use of an applied accelerant that can be chemical, such as water, or energetic, such as UV light. The type of accelerant depends on the type of adhesive used.

Also seen in FIG. 8 is a controller 276 of robotic mechanism 219. As controllers for robotic mechanisms are well understood in the art, controller 276 is omitted from other views of robotic mechanism 219 and enclosure 201. However, it is understood that controller 276 represents, without loss of generality, the electronics and computing equipment used for the control of robotic mechanism 219. This includes the power electronics used for controlling motors 224, 228, and 232 and twist and tilt axis actuators 235 and 237, as well as any other motors and actuators of the robot. Furthermore, controller 276 is configured to communicate with camera 240 (or stereo cameras 277 in the event that a stereo computer vision system is used) and any sensors used by robotic mechanism 219. Controller 276 further includes a computing system that can be comprised, without limitation, of one or more of: a microcontroller, microcomputer, microprocessor, field programmable gate array (FPGA), graphics processing unit (GPU), or application specific integrated circuit (ASIC). Controller 276 includes the software used to coordinate the motion of robotic mechanism 219 with data received from the computer vision system and then to carry out the motions described during eyelash isolation and extension placement. In some embodiments, controller 276, together with camera 240 or stereo cameras 277, comprise the computer vision system. In other embodiments, camera 240 or stereo cameras 277 include sufficient processing to comprise the computer vision system. In general, the term "computer vision system" is used here broadly to mean any sensor or group of sensors configured to image the environment in 2D or 3D. The use of a computer vision system to visually coordinate the motion of a robot and/or an end effector is often referred to as visual servoing. In such a visual servo system, the robot uses information from the computer vision system to correct its internal positional model, which is otherwise typically created through joint positional sensors. The advantage is that the joint positional sensors add error at each joint, with additional error accumulating with each additional joint of the robot, where the computer vision system is an absolute measurement of output position. In some embodiments, one computing system can be used for computer vision and the robotic system, or specialized computing systems in communication can be used for each.

Generally, the device can include a user interface provided to allow the user to configure robotic mechanism 219 and controller 276 in accordance with the needs of a particular subject. This interface can allow for the specification of which extension type to be used in which area of the subject's natural eyelash. In some embodiments, robotic mechanism 219 and controller 276 can be provided with communication to a cloud computing platform in order to transmit data, usage statistics, diagnostics, and payment information.

Applying Extensions

This paragraph will summarize the main parts of the process of applying eyelash extensions using the invention. First, the user will discuss the look that subject 301 desires and select the type of eyelash extensions to be used. In this embodiment, the user would then put up to three trays of different lengths of extensions into loading zones 243-245. The user can then use the user interface to indicate in which zones around the eye to use which sizes of extensions (as previously discussed above). If the invention is not to be used to apply primer to the subject's eyelashes, the user can do that manually at this time. The user can then put a few drops of adhesive into adhesive cup 248, put adhesive cup 248 onto liquid A loading zone 246, and close access door 242. The user can then tape down the subject's lower eyelash (as is currently done when a beauty technician installs eyelash extensions) and position enclosure 201. At this time, the user can use the user interface to start the process. Robotic mechanism 219 will then (by moving itself to appropriate position using actuators 223, 227, 231, 235, and 237) use LED lights 241 and camera 240 to inspect the natural eyelashes and determine if they are positioned properly. The control system will do this using the output of camera 240 and computer vision techniques described previously. If the eyelashes are not positioned properly, robotic mechanism 219 will stop the process and prompt the user to correct the problem. Robotic mechanism 219 can then start the process by "preening" the subject's eyelashes using open tweezers 239, isolating the subject's eyelashes one by one to ensure that they are not stuck together (however, this may not normally be required—in any case, isolating eyelashes will be discussed at length below). In some cases, this isolating is referred to as separating. Robotic mechanism 219 will then proceed to one of loading zones 243-245, use camera 240 to locate the next extension in a row of extensions on the tray, and use gripping actuator 238 to grip tweezers 239 around the eyelash extension. It will do this in the proper orientation by using actuators 223, 227, 231, 235, and 237 to position itself properly with respect to the extension to be picked up. Robotic mechanism 219 will then proceed to liquid A loading zone 246. Robotic mechanism 219 will then use tilt axis actuator 237 to tilt the extension into a position so that the end to be bonded (from now on referred to as the proximal end) is more or less vertical in orientation. The system will then use output from camera 240 to locate the position of adhesive cup 248 and dip the proximal end of the extension into the cup to apply adhesive. Robotic mechanism 219 will then move the extension near the subject's natural eyelash. The system will then use output from camera 240 to determine the position of the first natural eyelash to be bonded to. At this point, robotic mechanism 219 can, if needed, separate the first eyelash from the others with techniques to be described below. When that is done, robotic mechanism 219 will use actuators 223, 227, 231, 235, and 237 to properly orient the extension to the natural eyelash and then to place the extension in contact with the natural eyelash, pausing briefly to let the adhesive bond, and then releasing tweezers 239. Robotic mechanism 219 can then return to the area of the appropriate extension loading zone to repeat the process with the next extension. As this cycle repeats, the system may determine that the next natural eyelash to be extended will be in a region for which a different extension length is prescribed and will therefore grab an extension from a different extension loading zone 243-245.

In some embodiments, it can be desirable to check that an appropriate quantity of adhesive is applied from adhesive cup 248 before robotic mechanism 219 moves the extension near the subject's natural eyelash. This can be done with output from camera 240, with the system determining the amount of adhesive applied based on the width of the extension and adhesive after application of the adhesive. If too much adhesive is present, some can be removed, either with a dedicated mechanism or by brushing the adhesive against a designated adhesive dump location. This is similar to the strategy used in manual extension where excess adhesive is wiped onto the tape below the eye or onto some other gauze.

In some embodiments, it may be desirable to attach one extension to multiple eyelashes. Doing so is generally avoided because natural eyelashes grow at different rates and gluing two together can result in a change in orientation of the extension over time. However, in some cases, it may be desired for specific aesthetic reasons. Therefore, if instructed, two or more eyelashes can be intentionally bonded together with a single extension.

In some embodiments, adhesives are not used, but instead a heat shrinkable plastic tube (heat shrink) or band can be used. In such embodiments, the process proceeds as described, but instead of applying adhesive, the robotic mechanism hooks the heat shrink band with the extension before threading the extension and heat shrink band over the natural eyelash. The heat shrink is then activated by a hot air source attached to the robotic mechanism.

Nail Polish Application

Figure 9:
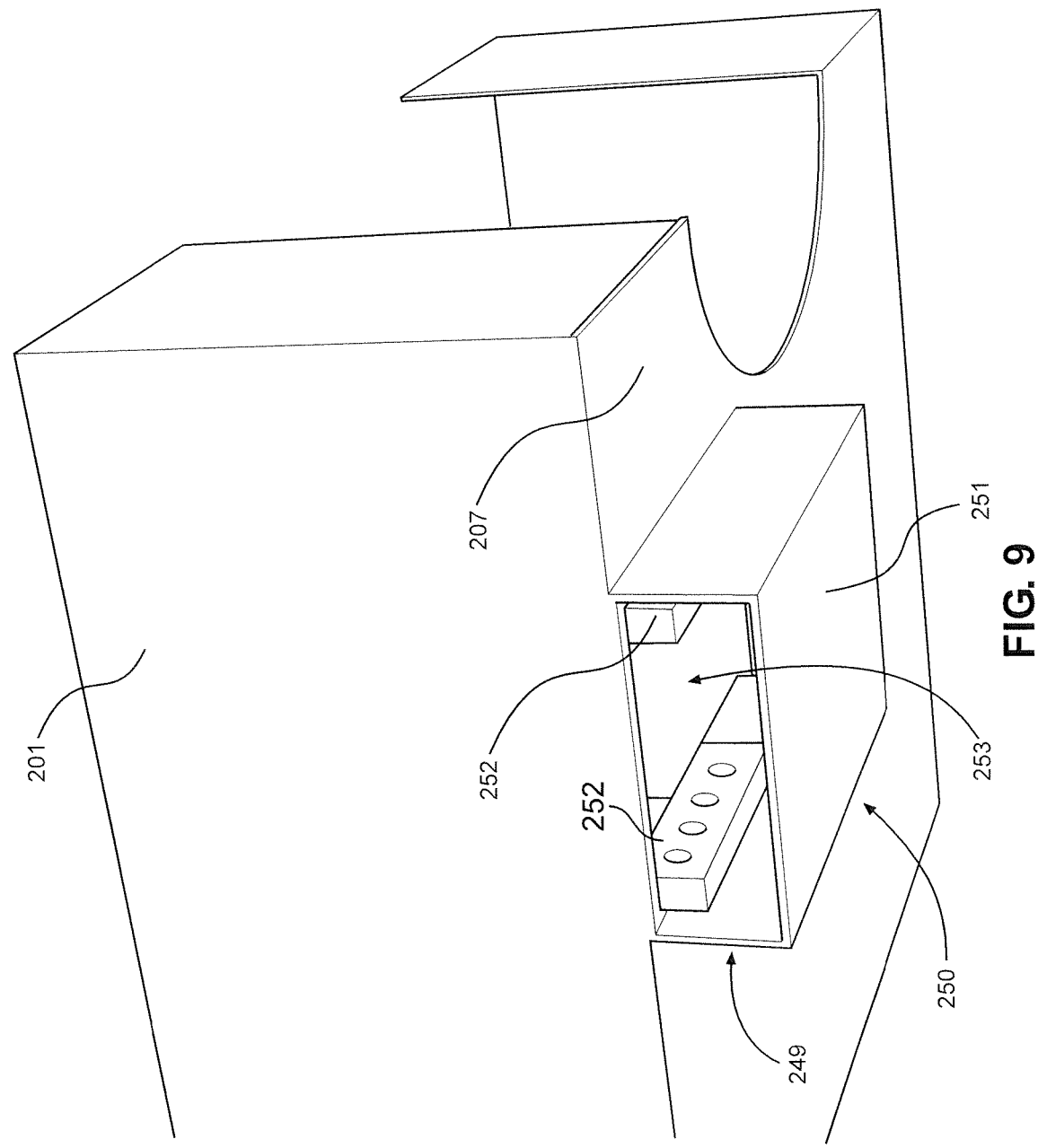
FIG. 9 is a view looking into a subenclosure.

FIG. 9 shows the left side of enclosure 201 where it can be seen that there is an additional access window 249, which does not include a door in this embodiment. Access window 249 is a window through which a subject's hand can be presented to have his or her nails painted. Access window 249 gives access to a subenclosure 250 which is shown protruding from enclosure floor 207. Subenclosure 250 has its own floor 251. Subenclosure 250 is located below the working area of robotic mechanism 219 (which is not visible within enclosure 201 in the view of FIG. 9) such that if robotic mechanism 219 were holding a tool such as a nail polish applicator in tweezers 239, the nail polish applicator could touch a hand lying on floor 251, but the remainder of robotic mechanism 219 could not touch the hand. This ensures the safety of a subject in the event of a malfunction of robotic mechanism 219, since it is unlikely that a person could be injured by being struck by a flexible nail polish applicator. The system confirms that the subject has not moved his or her hand into the working area of robotic mechanism 219 with a light curtain device 252 mounted at an opening 253 between subenclosure 250 and main enclosure 201. Light curtain 252 does not run the whole length of opening 253 such that the nail polish applicator held by tweezers 239 can access the subject's finger nails without breaking light curtain 252, which would stop the device. It can be seen, however, that it would be extremely difficult for a subject to gain access to main enclosure 201 with his or her hand without breaking light curtain 252 and stopping the device. In practice, the user can place nail polish in standard bottles with standard applicator type lids at liquid A loading zone 246 and liquid B loading zone 247 with the applicator caps loosened so that they can be grabbed by tweezers 239 (tweezers 239 can be created with special features to make this easier). The user can then instruct the subject to lay his or her hand on floor 251 of sub-enclosure 250 with his or her nails in the accessible zone for robotic mechanism 219. Then, robotic mechanism 219 can retract the applicator from the nail polish bottle, adjust the amount of liquid on the applicator by running it over the edge of the opening of the nail polish bottle just as a human would, proceed to opening 253, and apply polish to the subject's finger nails. One skilled in the art will note that robotic mechanism 219 can apply nail polish top coat over the nail polish and apply nail polish remover (to touch up nails). It is even possible that a textile pad can be provided to robotic mechanism 219 so that it can remove nail polish after applying nail polish remover all over a nail. However, removing nail polish is much easier for a human than applying it, so it may not make sense for robotic mechanism 219 to perform this task.

Isolating Lashes

For embodiments that are designed to produce a very high quality or a longer lasting eyelash extension job, a key part of the process of applying eyelash extensions is to isolate one natural eyelash from the others before a synthetic eyelash extension is applied. The reason for this is the generally accepted belief in the industry that attaching extensions to groups of eyelashes (though useful for the short term) causes problems as the natural eyelashes grow, because they grow at different rates. Therefore, in some embodiments, it is advantageous to isolate a single eyelash before bonding.

Figure 10:
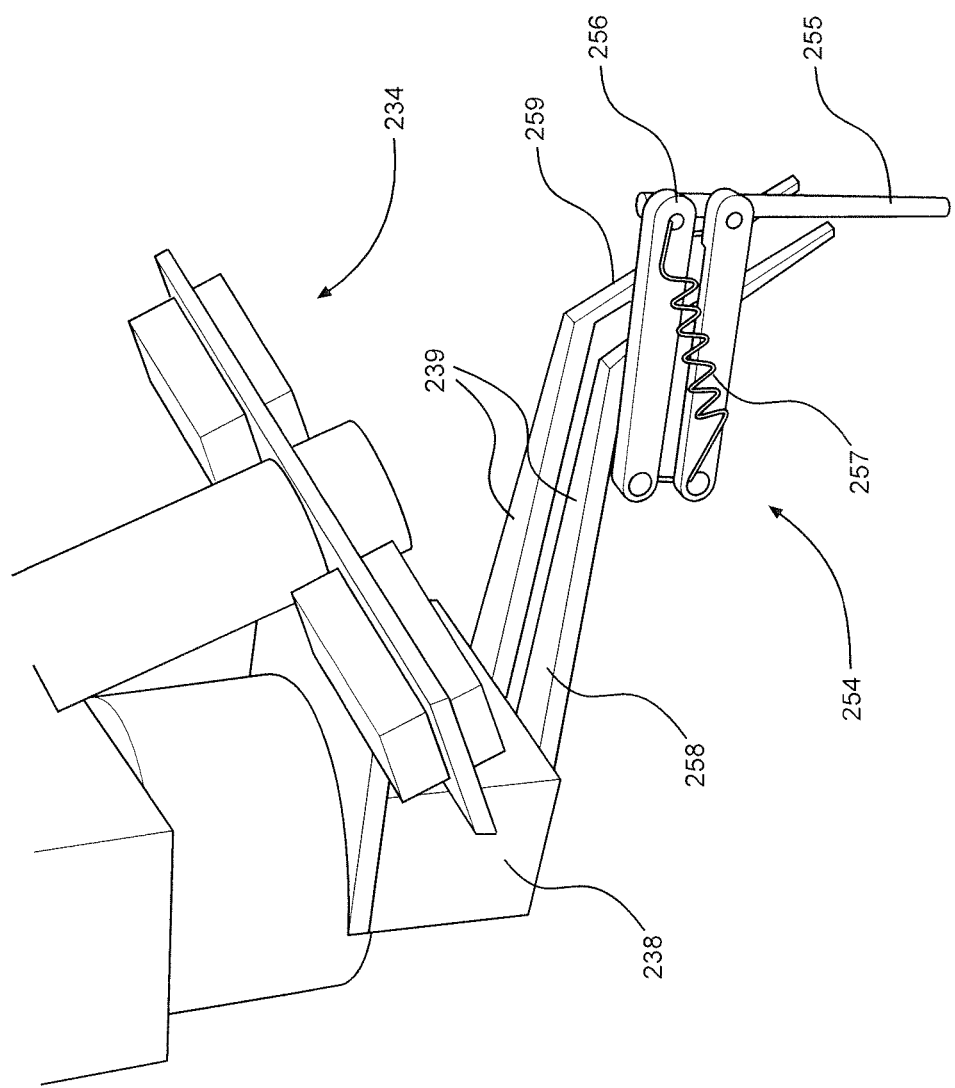
FIG. 10 shows the robotic head mechanism with an eyelash isolator mechanism.

There are many ways that this can be accomplished. FIG. 10 shows an augmented version of robotic head mechanism 234 which includes an eyelash isolator mechanism 254. Eyelash isolator mechanism 254 is here mounted to stationary side 258 of tweezers 239. By "stationary", it is meant that that side 258 of tweezers 239 does not move with respect to the rest of robotic head mechanism 234 when gripping actuator 238 is actuated but moving side 259 does. It is also important to note that the distance between sides 258 and 259 of tweezers 239 is shown here much larger than would be required to pick up an eyelash extension. This has been shown in order to illustrate a mechanism that can pick up other objects, for example, the applicator lid of a common nail polish bottle. In some embodiments, tweezers 239 are much smaller and have a much smaller gap between sides 258 and 259. Eyelash isolator mechanism 254 has a probe 255 which is intended to contact the natural eyelashes of subject 301 and is made of a material that is not compatible with the adhesive used in order to ensure that probe 255 will not bond to the eyelashes of subject 301. In this embodiment, eyelash isolator mechanism probe 255 is mounted on a spring mechanism 256 which is here illustrated as a four-bar linkage with a spring 257. The intent of spring mechanism 256 is to ensure that probe 255 extends slightly below (meaning in the direction along z-axis 222 towards enclosure floor 207) stationary side 258 of tweezers 239 whenever probe 255 is not in contact with a surface.

Figure 11:
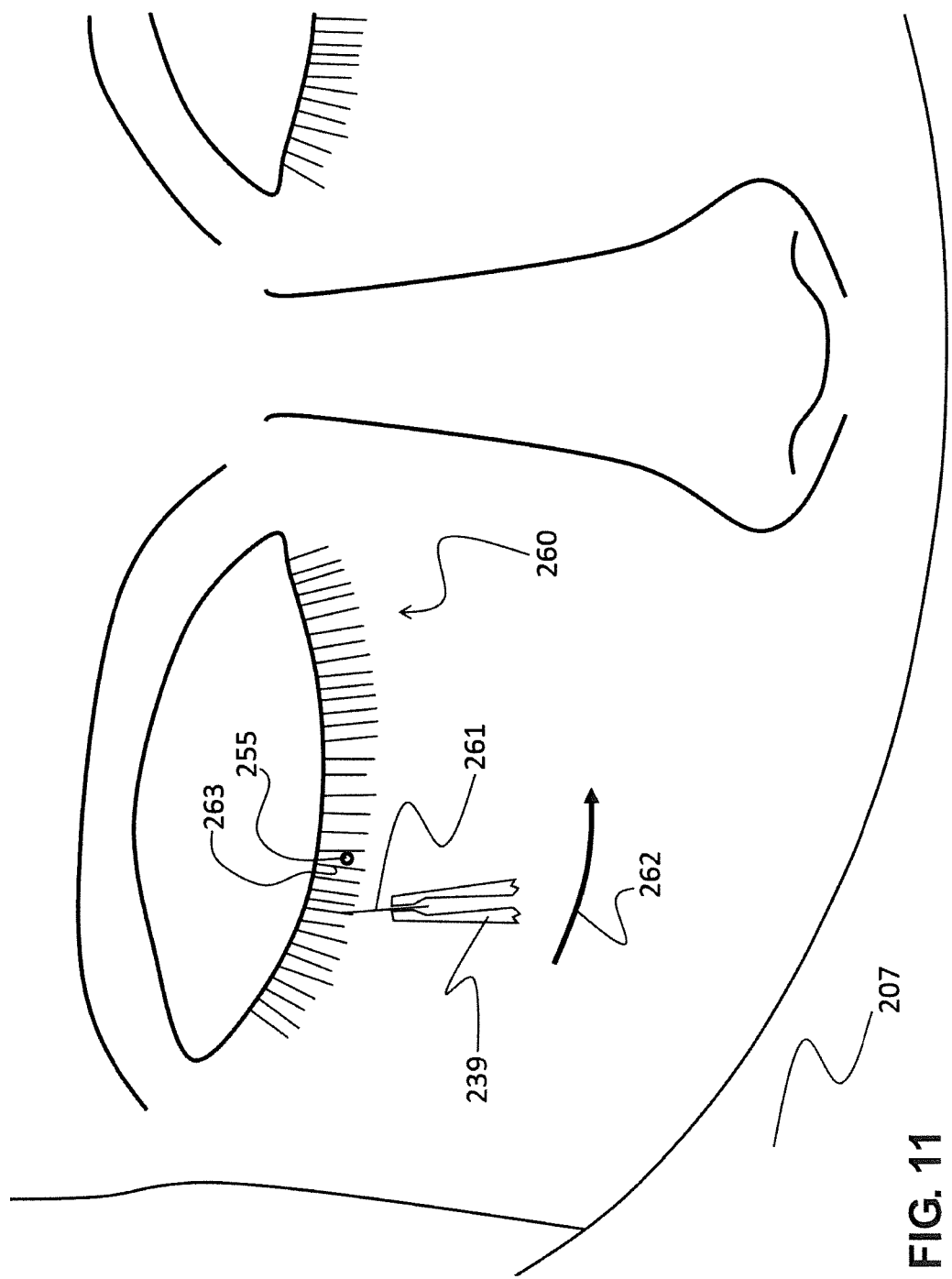
FIG. 11 shows a view looking down upon the face of a subject during the isolation process.
Figure 12:
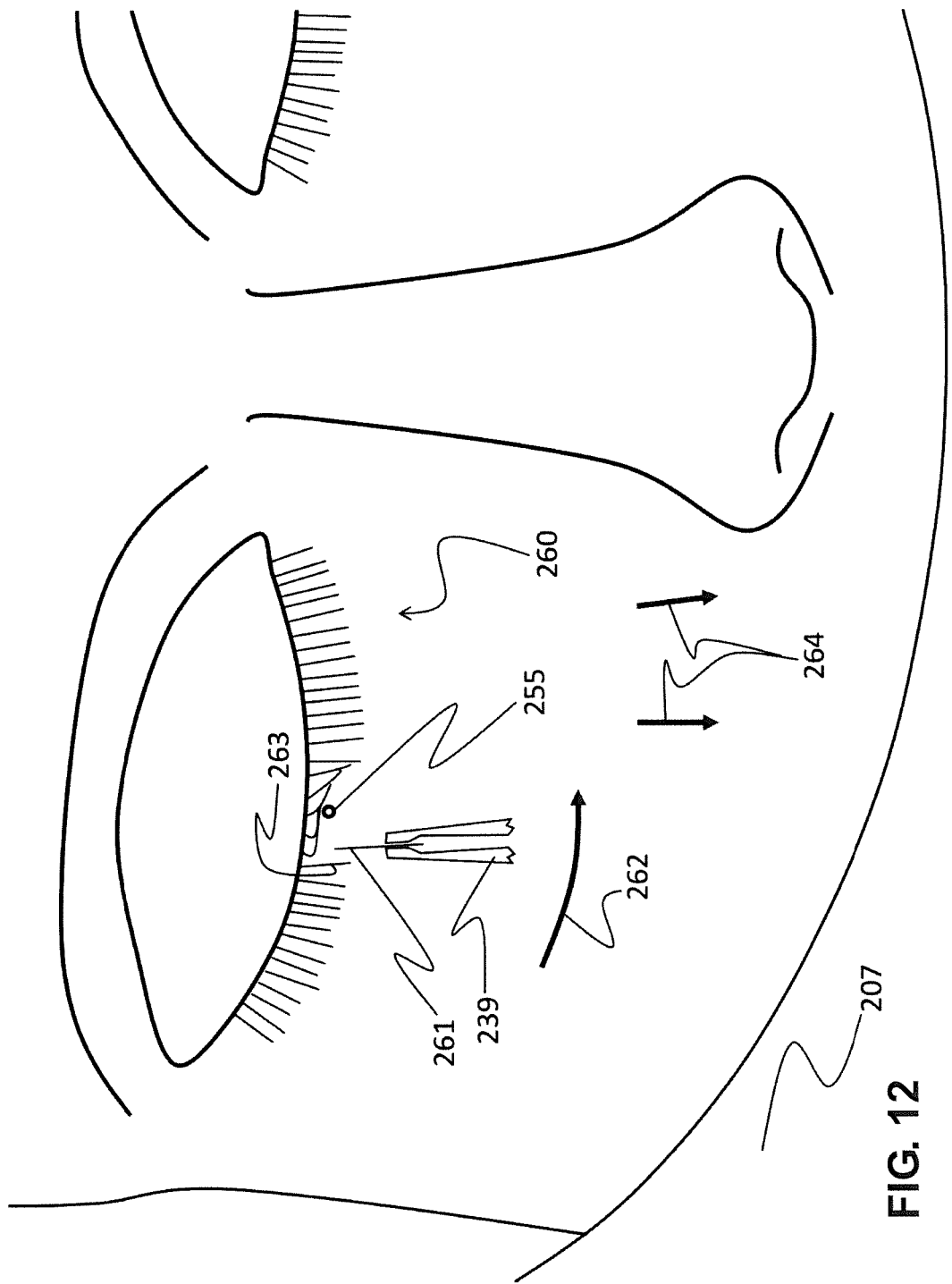
FIG. 12 shows the same view as FIG. 11 after an eyelash isolator mechanism probe has moved.

FIG. 11 shows a view looking down upon enclosure floor 207 and window 269 with subject 301's natural upper lid eyelashes 260 protruding into enclosure 201. Probe 255 is shown in cross section. In practice, probe 255 can be brought very close to subject 301's cheek and can even contact it because spring mechanism 256 does not allow probe 255 to generate much force against any object it encounters. This would typically be done when robotic mechanism 219 arrives with an eyelash extension 261 in tweezers 239 to which adhesive has just been applied and is ready to be bonded. In fact, probe 255 can land right on top of one or two of the natural eyelash fibers. Camera 240 can determine when probe 255 has been lowered through natural upper lid eyelash 260. Or, probe 255 can contact the cheek of subject 301, causing eyelash isolator mechanism 254 to deflect a small amount (this can be sensed using a sensor on mechanism 254 or using camera 240). In some embodiments, probe 255 can include a circuit measuring conductance between subject 301 and probe 255, thereby determining that contact is made when the conductance greatly increases. Then, z-axis actuator 231 is stopped, and actuators 223, 227, and 235 (perhaps others in some embodiments) are used in concert to move probe 255 in the direction shown by an arrow 262, moving eyelashes in the process. The length of probe 255 is such that, while doing so, there is no risk of eyelash extension 261 accidentally contacting any natural eyelash fibers (and therefore bonding to the wrong eyelash) because eyelash extension 261 is at a higher location (measured in z-axis 222) than the tip of probe 255. Movement proceeds until a target natural eyelash fiber 263 is isolated in a position where the bond can be made, as shown in FIG. 12. Tweezers 239 can then be moved into position to perform the bond, putting the proximal end of eyelash extension 261 in contact with target natural eyelash fiber 263, and while doing so, eyelash isolator mechanism 254 will deflect more, allowing tweezers 239 to approach without probe 255 moving appreciably with respect to natural upper lid eyelash 260.

This isolation procedure may not always result in isolation of target natural eyelash fiber 263 if target natural eyelash fiber 263 is stuck to an adjacent natural eyelash fiber for some reason. If so, a procedure, which is often called "preening" in the art, can be used to separate natural eyelash fiber 263 from others. In preening, probe 255 can be brought into natural upper lid eyelash 260 as above. This time, however, probe 255 preferably lands right on top of target natural eyelash fiber 263 or adjacent to it, and probe 255 preferably lands as close to the proximal end of target natural eyelash fiber 263 as possible. When probe 255 has moved into natural upper lid eyelash 260 or touched subject 301's cheek and eyelash isolator mechanism 254 has deflected a small amount, which can be sensed using a sensor on mechanism 254 or using camera 240, z-axis actuator 231 is stopped, and then actuators 223, 227, and 235 (perhaps others in some embodiments) are used in concert to move probe 255 in the radial direction shown by arrows 264. Again, the length of probe 255 is such that while doing so, there is no risk of eyelash extension 261 accidentally contacting any natural eyelash fibers (and therefore bonding to the wrong eyelash fiber) because eyelash extension 261 is at a higher location (measured in z-axis 222) than the tip of probe 255. Movement proceeds until probe 255 has exited natural upper lid eyelash 260. This process is repeated in multiple starting positions, and its intent is to get probe 255 between target natural eyelash fiber 263 and the natural eyelash fiber to which it is stuck, therefore pulling them apart as the motion proceeds in a radial direction. If target natural eyelash fiber 263 is well adhered to an adjacent eyelash, the effect of the preening motion can be to "pluck" one or both of the stuck eyelashes from the eyelid of subject 301 which can cause discomfort and be undesirable. For that reason, the mounting of eyelash isolator mechanism 254 can be instrumented in a way to detect force on probe 255 which can tell the system to stop the motion. At that point, the system can try again, and if target natural eyelash fiber 263 cannot be isolated from others, the user can be notified and prompted to fix the problem manually or to skip target natural eyelash fiber 263. It is also relevant to note that, as indicated above, the computer vision system can locate both probe 255 and potentially tweezers 239 as well. This has several advantages including that the computer vision location can help correct for error in robotic mechanism 219. Furthermore, the relative position between probe 255 and target natural eyelash fiber 263 is more important than the absolute position of either. That is, the device does not need to know the absolute position of target natural eyelash fiber 263, but it does preferably know the relative position of target natural eyelash fiber 263 with respect to probe 255 and eyelash extension 261. Indeed, the relative position of the rest of the human eyelashes and the cheek of subject 301 with respect to these same items are also relevant and can be recorded by the computer vision system.

Two sensors have been mentioned with respect to eyelash isolator mechanism 254. One is a sensor used to determine that probe 255 has been pushed upward and therefore spring 257 has been deflected somewhat, and another is a sensor used to detect lateral force on probe 255. The deflection sensor can be implemented in a number of ways. For example, if eyelash isolator mechanism 254 is implemented as a four-bar linkage as shown here, an optical or magnetic encoder can be put on one of the joints of the linkage to detect motion continuously. If it is only desired to detect that movement has started, a flag can be affixed to one of the bars which blocks the beam of an optical sensor when the desired amount of deflection has been reached. Likewise, a magnetic or inductive proximity sensor can be used to detect the approach of the bars as the mechanism is moved. One skilled in the art of automated equipment design will note that there are many ways in which this can be accomplished. In any event, such sensors can communicate these readings back to controller 276.

Likewise, creating a sensor to sense a lateral load on probe 255 can be effected in many ways. For example, a strain gauge can be affixed to the mounting of eyelash isolator mechanism 254 to produce an output proportional to the lateral load on probe 255. Or, the mount for eyelash isolator mechanism 254 can be made compliant enough so that eyelash isolator mechanism 254 moves laterally under lateral load appreciably so that the techniques to measure motion mentioned in the preceding paragraph can be used to detect a load that was out of bounds. Also, it is possible that the torque of the actuator motors used in the motion can be monitored to detect if mechanism 254 has encountered some resistance. One skilled in the art of automated equipment design will note that there are many ways in which this can be accomplished.

Related to the preening of target natural eyelash fiber 263 mentioned above is bulk preening. Bulk preening can be carried out the same way. However, it is possible that both sides of tweezers 239 can be used at the same time as probe 255 to separate many eyelashes at once (assuming tweezers 239 are not holding an extension during bulk preening). Tweezers 239 can be moved into position, putting probe 255 in contact with the cheek of subject 301, and then continuing to move towards the cheek of subject 301 until the end of the tweezers 239 is within the fibers of natural upper lid eyelash 260 and just above the cheek of subject 301. Then, the process of moving tweezers 239 and probe 255 radially outward from the subject's eyelid will proceed as before, when only probe 255 was used for preening. In some embodiments, preening can be achieved with a brush. In this embodiment, probe 255 can be replaced by a brush, or tweezers 239 can pick up a brush.

One skilled in the art of designing automated equipment will note that there are many ways to implement a mechanism to accomplish eyelash isolation. For example, a completely independent robotic mechanism from robotic mechanism 219 can be used to move a probe like that of probe 255 through the fan of the eyelashes. This mechanism can be a simple swinging mechanism which is attached to enclosure 201, and which moves a probe in a set path in the direction shown by arrow 262. Alternatively, robotic head mechanism 234 can be replaced with one that includes two small arms, one for preening and one for picking up and placing extensions. An example of such an alternative robotic head mechanism is the robot designed by Virtual Incision Corporation of Lincoln, Nebraska, which includes two small arms each with several degrees of freedom.

Figure 13:
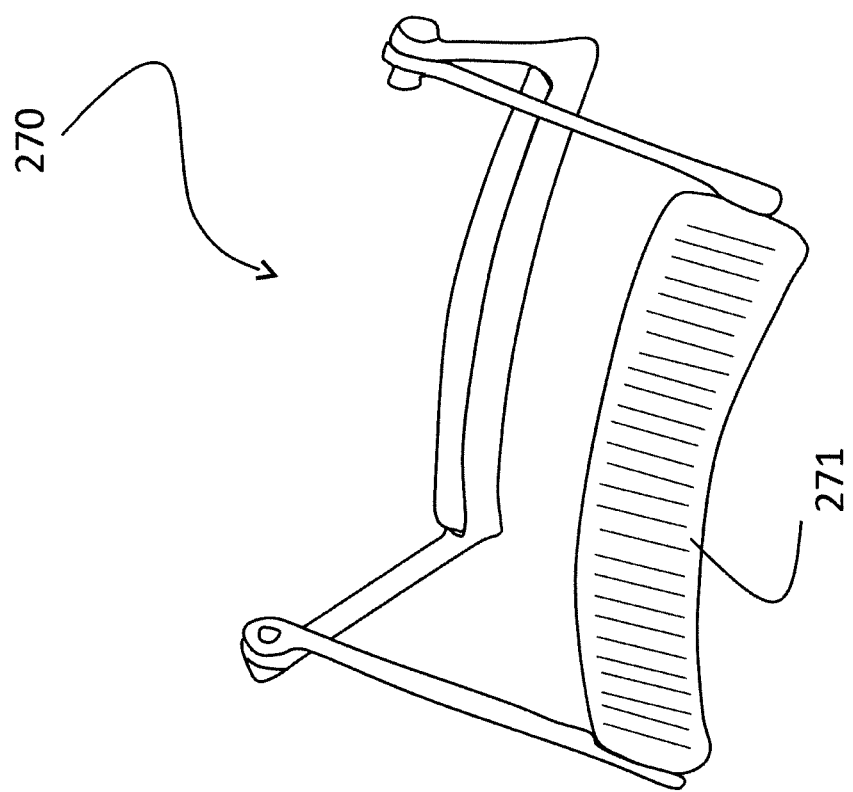
FIG. 13 shows a manual eyelash isolation tool.

One will also note that it is possible that some natural eyelashes can be isolated from the others by manually isolating a subset of eyelashes before the machine is used. To do this, the user can use a manual eyelash isolation tool such as Speed Eye Link™ manufactured by Isiswig Co., Ltd. of South Korea. An eyelash isolation tool 270 is shown in FIG. 13. To use this device in conjunction with the robotic system disclosed here, the user places tool 270 on cheek 210 of subject 301 (see FIG. 1). The user then works a corrugated surface 271 under a portion of the upper natural eyelashes of subject 301. Then, probes can be used manually to separate the natural eyelashes so that each corrugation contains only a single natural eyelash. The user then positions enclosure 201 over the face of subject 301 so that the robotic system can place extensions onto that subset of the natural eyelashes of subject 301. This process can then be repeated in order to get more subsets of natural eyelashes extended, eventually producing a full high-quality eyelash extension job without the robotic system needing to isolate natural eyelashes. In a related embodiment, a comb-type structure can be used to isolate individual natural eyelashes, similar to the purpose of corrugated surface 271.

Other Robotic Configurations

The embodiments shown have utilized a Cartesian robot to illustrate robotic mechanism 219. However, one skilled in the art will note that the same thing can be accomplished by a SCARA-type robot, a delta robot, or even a six-axis industrial style robot, and in fact many different mechanisms can be used to create robotic mechanism 219, with some of these mechanisms looking more like dedicated automated equipment rather than any robot style in particular. The Cartesian robot design shown here is portrayed only for easy disclosure of the invention.

Figure 14:
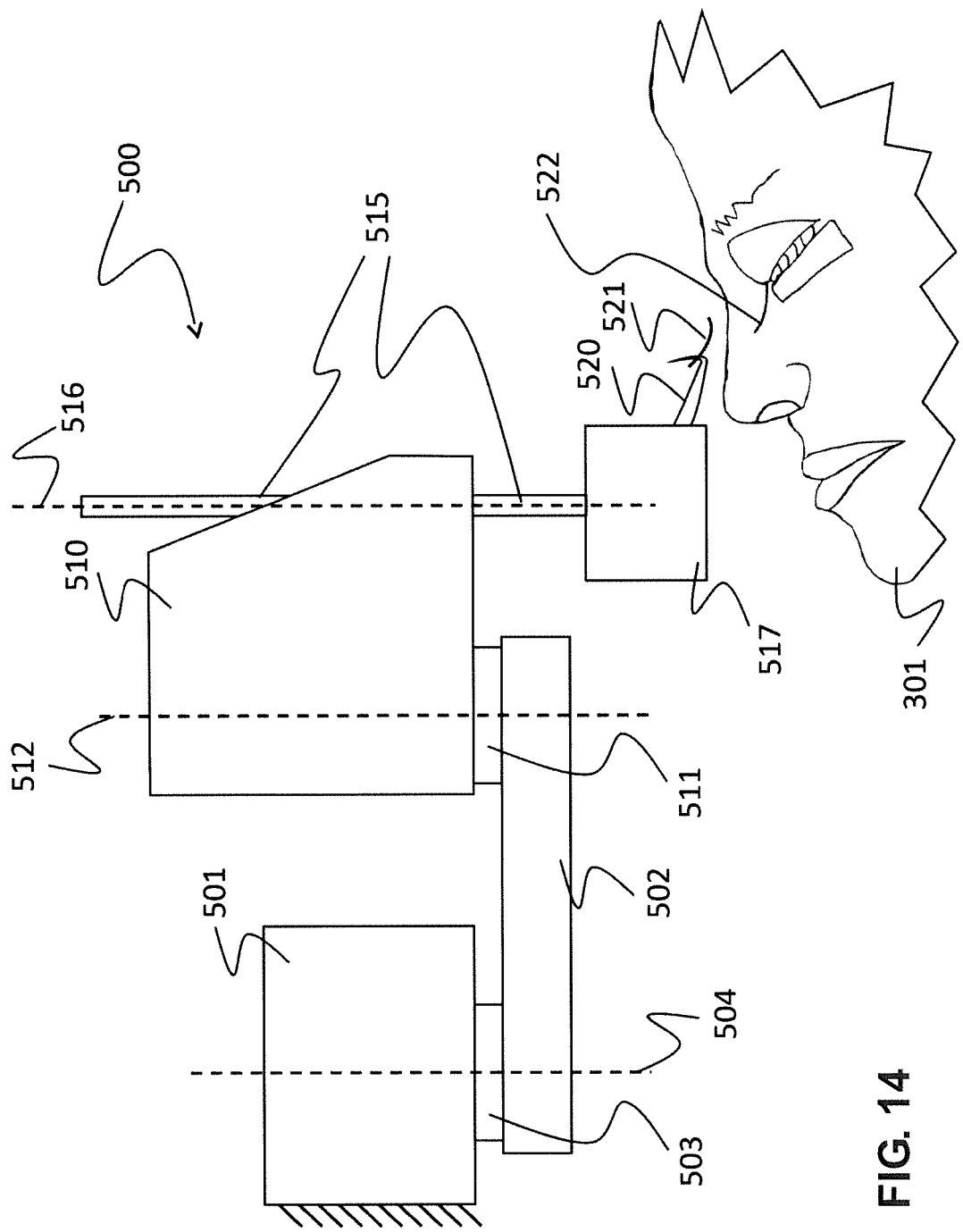
FIG. 14 shows an alternate embodiment using a SCARA robot.

For example, in another embodiment of the invention, consider FIG. 14, showing a SCARA robot 500 operating over the head of subject 301. SCARA robot 500 includes a base link 501, which is coupled to an arm 502 through a first powered joint 503 that allows arm 502 to be controllably moved about a first powered joint axis 504. Arm 502 is further coupled to a link 510 through a second powered joint 511 that allows link 510 to be controllably moved about a second powered joint axis 512. Finally, an output link 515 is connected to link 510 though a powered joint that is not shown but is internal to link 510. Output link 515 can be controllably moved about and along an axis 516. That is, output link 515 is able to translate along axis 516 and rotate about axis 516, with both motions being controllable. This arrangement of three rotational axes, 504, 512, and 516, and a fourth translational axis along axis 516 is a classic SCARA arrangement. It will be clear to one skilled in the art of robotics that this arrangement will provide the ability to position a robotic head mechanism 517 in three dimensions, X, Y, and Z, similar to the Cartesian robot used above, with the additional ability to rotate robotic head mechanism 517 about Z-axis 516. Indeed, SCARA and Cartesian robots are used for various similar industrial applications, with small considerations in performance and cost driving the use of one over another. Robotic head mechanism 517 can be similar to robotic head mechanism 234 of FIG. 4, including a camera and one or more tilt actuators to allow for fine positioning of tweezers 520. The fine positioning of tweezers 520 then allows for correct alignment of an extension 521 with a target eyelash 522 of subject 301.

Figure 15:
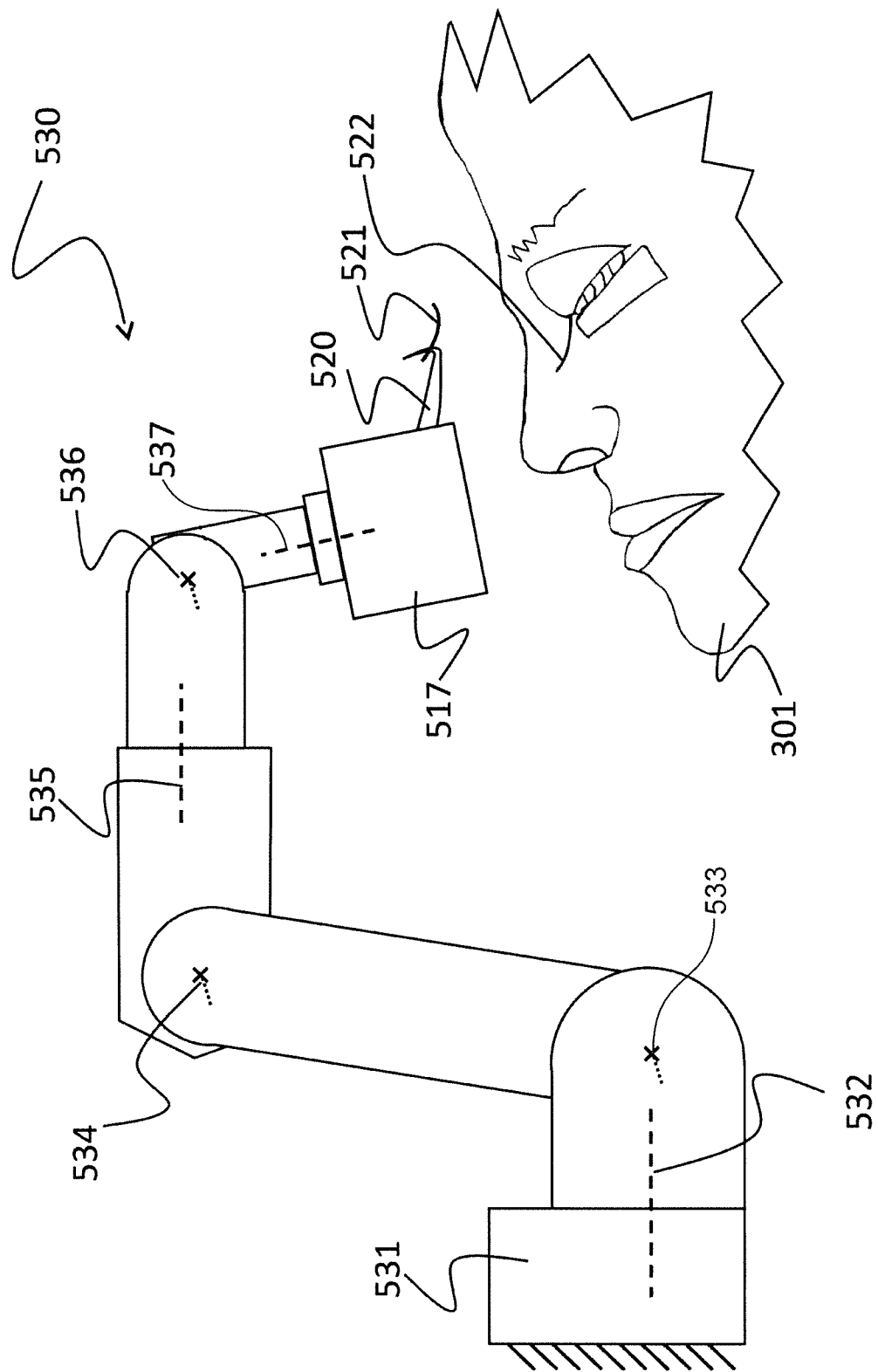
FIG. 15 shows an alternate embodiment using a six-axis robot.

Of course, an even more capable robot arm widely used in industrial applications is a six-axis arm 530, as shown in FIG. 15. Here, a base link 531 is coupled to robotic head mechanism 517 through a series six rotational joints that rotate about rotational axes 532-537. Many robot manufacturers make six-axis robotic arms with geometries generally along the lines of those shown in FIG. 15. Indeed, six-axis robotic arms date to the 1960s and Victor Scheinman's work on the Stanford Arm (although that design included five rotational and one translational axis). The use of two more degrees of freedom in six-axis arm 530, as compared to SCARA robot 500, allows for fine control of the orientation of robotic head mechanism 517, obviating the need for additional tilt actuators. In this case, robotic head mechanism 517 can simply include tweezers 520 and an actuator to open and close tweezers 520. Of course, a camera and lighting are preferably also provided, as in previous embodiments, and can be placed on robotic head mechanism 517, as shown previously, or be attached to another link of six-axis arm 530 or to enclosure 201.

In some embodiments, it can be desirable to provide two robots, one orienting a first set of tweezers for isolating an eyelash and the second robot orienting a second set of tweezers for placing an extension. In the case where the two robots are both six axis arms, the arrangement is roughly analogous to a human doing eyelash extension with each of their two arms controlling a set of tweezers. This embodiment is roughly equivalent to having two copies of the robot shown in FIG. 15 with very simple robotic head mechanisms. In some embodiments, the robotic head mechanism of each robot can simply comprise actuated tweezers. This embodiment is seen to be less preferred simply because of the cost and complexity associated with having two robotic arms but is feasible for performing an extension job.

Other Robotic Head Mechanisms

Figure 16A:
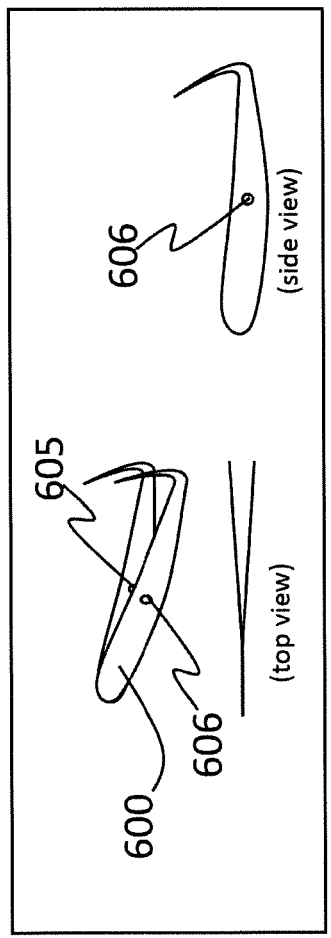
FIG. 16A shows an alternative robotic head mechanism arrangement using curved tweezers.
Figure 16C:
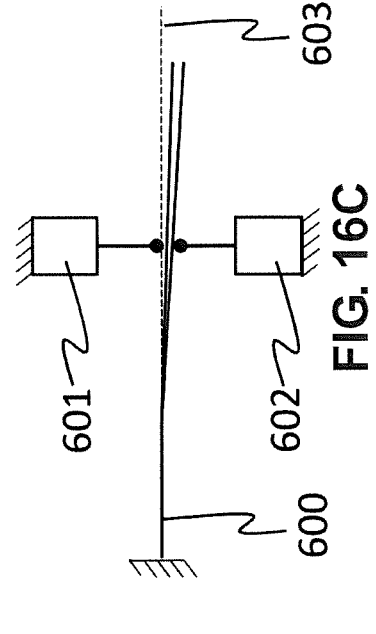
FIG. 16C is a schematic top view of the operation of the alternative robotic head mechanism.
Figure 16E:
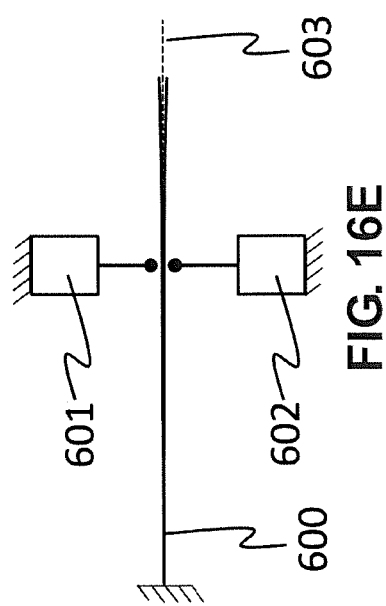
FIG. 16E is a schematic top view of the operation of the alternative robotic head mechanism.
Figure 16B:
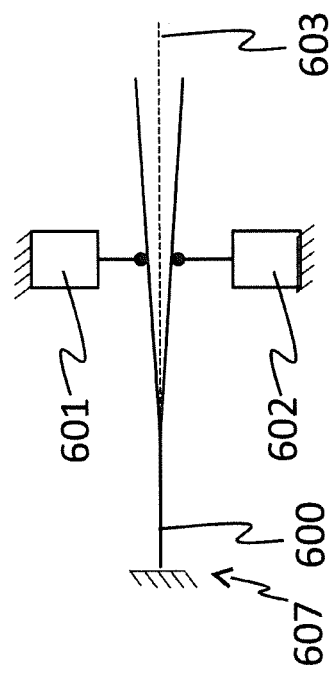
FIG. 16B is a schematic top view of the operation of the alternative robotic head mechanism.

In another embodiment of the invention, robotic head mechanism 234 is replaced with a more complex robotic head mechanism. This can be useful to achieve greater precision in extension placement than would be possible with the previously discussed embodiments, and therefore allows greater speed. Consider FIG. 16A, which shows bent tweezers 600 in perspective, top and side views. Bent tweezers 600 include a left hole 605 and a right hole 606. FIG. 16B then shows bent tweezers 600 with left and right motors 601 and 602 respectively, each of left and right motors 601 and 602 having a plunger extending to left and right holes 605 and 606. Motors 601 and 602 can be any small linear actuators having enough force to actuate tweezers (typically in the single digit newtons of force). Without limitation, this includes voice coil motors, linear servo motor, piezoelectric motors, and rotary motors having gearing that converts the rotary motion to linear motion, such as ball screw assemblies, rack and pinion assemblies, or even cam or linkage mechanisms. In other words, the exact type of actuator that allows motors 601 and 602 to actuate their plungers is not important as long as motors 601 and 602 are capable of actuating tweezers 600. Further, it is important to note that a proximal tweezer end 607 and the bodies of both motors 601 and 602 are assumed to be grounded by structure not shown in this view.

Figure 16D:
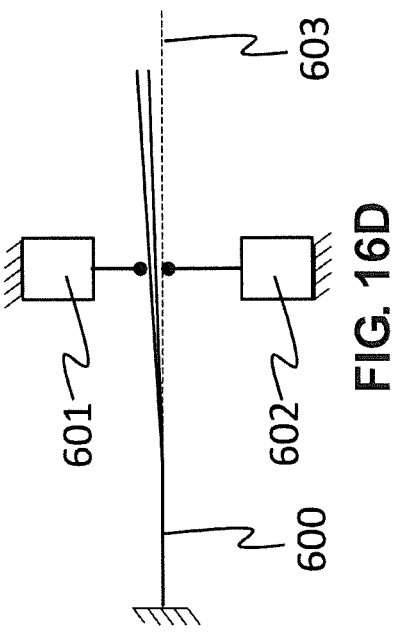
FIG. 16D is a schematic top view of the operation of the alternative robotic head mechanism.

By actuating neither motor, in FIG. 16B, tweezers 600 remain in their unactuated, spread configuration, with equal spacing off a neutral line 603. By actuating just left motor 601, in FIG. 16C, tweezers 600 close to the right of neutral line 603 to a small gap, suitable for grasping a small object such as an eyelash extension. Conversely, by actuating just right motor 602, in FIG. 16D, tweezers 600 close to the left of neutral line 603 to a small gap, suitable for grasping a small object such as an eyelash extension. By actuating both motors 601 and 602, in FIG. 16E, tweezers 600 close just around neutral line 603 to a small gap, suitable for grasping a small object such as an eyelash extension. Thus, by selectively actuating motors 601 and 602, it is possible to grasp a small object in any of these positions, and then by transitioning between two of these positions by relaxing one motor while pushing with the other, it is possible to position the small object in a new position before releasing it.

FIGS. 17A and B show a simple robotic head mechanism that makes use of this arrangement of paired left and right motors. Bearings and support surfaces have been omitted in FIGS. 17A and B to preserve clarity. Here, there are two tweezers, isolation tweezers 600A and placement tweezers 600B, each with their own left motors (601A and 601B) and right motors (602A and 602B). Tweezers 600A and 600B are nested one within the other. In FIG. 17A, it can be clearly seen that isolation tweezers 600A are outside placement tweezers 600B. Left and right motors 601A and 602A of isolation tweezers 600A are not actuated, allowing isolation tweezers 600A to be fully open. Isolation tweezers 600A separate human eyelashes 612, while placement tweezers 600B hold an eyelash extension 611. In order to hold eyelash extension 611, placement tweezers 600B are closed, with both left and right motors 601B and 602B partially actuated. However, in order to hold extension 611 slightly to the right of center, left motor 601B is more actuated than right motor 602B. It should be clear that very slight motions of extension 611 are possible through very small actuation of the motors controlling placement tweezers 600B. This is advantageous in the operation of the isolation and extension placement systems because very small motions can be used for manipulation of eyelashes and eyelash extensions that are on the order of 50-100 microns in diameter. Of course, robotic mechanism 219 can provide gross motion in the same direction (the direction of motion described here would be roughly along y-direction arrow 221), but this fine motion can provide desired additional resolution in the final positioning (since both robotic mechanism 219 and placement tweezers 600B can actuate in either positive and negative directions along arrow 221 it should be understood that the important point is that axes of the motion are coaxial even though the sense of the sign could be different).

An additional thrusting motor 610 is further provided to create relative linear motion between isolation tweezers 600A and placement tweezers 600B along the direction of an arrow 613. Again, as the entire robotic head mechanism is mounted to robotic mechanism 219 (or another robotic mechanism such as the SCARA or 6 axis robots discussed above), the motion along arrow 613 is somewhat redundant with x-direction arrow 220 in FIG. 3. This means that, through combination of gross movements of the robotic mechanism and thrusting motor 610, it is possible to produce differential thrusting motion along the direction of arrow 613 between isolation tweezers 600A and placement tweezers 600B. This differential thrusting motion allows for isolation tweezers 600A, for example, to remain stationary along the direction of arrow 613, while placement tweezers 600B move along the direction of arrow 613 in order to place extension 611 on the natural human eyelash. Furthermore, because thrusting motor 610 need not provide the entire range of motion, it can have a greater resolution, allowing for very small and precise motions.

If the robotic mechanism that is used has many degrees of freedom, such as a six-axis arm, this robotic head mechanism can be sufficient for the isolation and placement steps. However, in the case of the Cartesian or SCARA robots, there may not be enough degrees of freedom to orient extension 611 (i.e., to align extension 611 angularly with the natural eyelash so that they are collinear rather than crossing). In the previous embodiments, this was solved with twist axis actuator 235 and tilt axis actuator 237, which provided two more angular degrees of freedom. Here, a similar strategy can be used, providing these degrees of freedom to the placement tweezers 600B. That is, it is possible to insert the twist and tilt actuators between the two sets of tweezers just as in the case of thrusting motor 610. It is generally sufficient to provide fewer degrees of freedom to isolation tweezers 600A as it can be seen that there are many orientations of isolation tweezers 600A that will provide sufficient separation of the natural human eyelashes to permit access but only a few tightly clustered orientations that are sufficiently collinear to allow the adhesive to bond extension 611 to the target natural eyelash.

Figure 18:
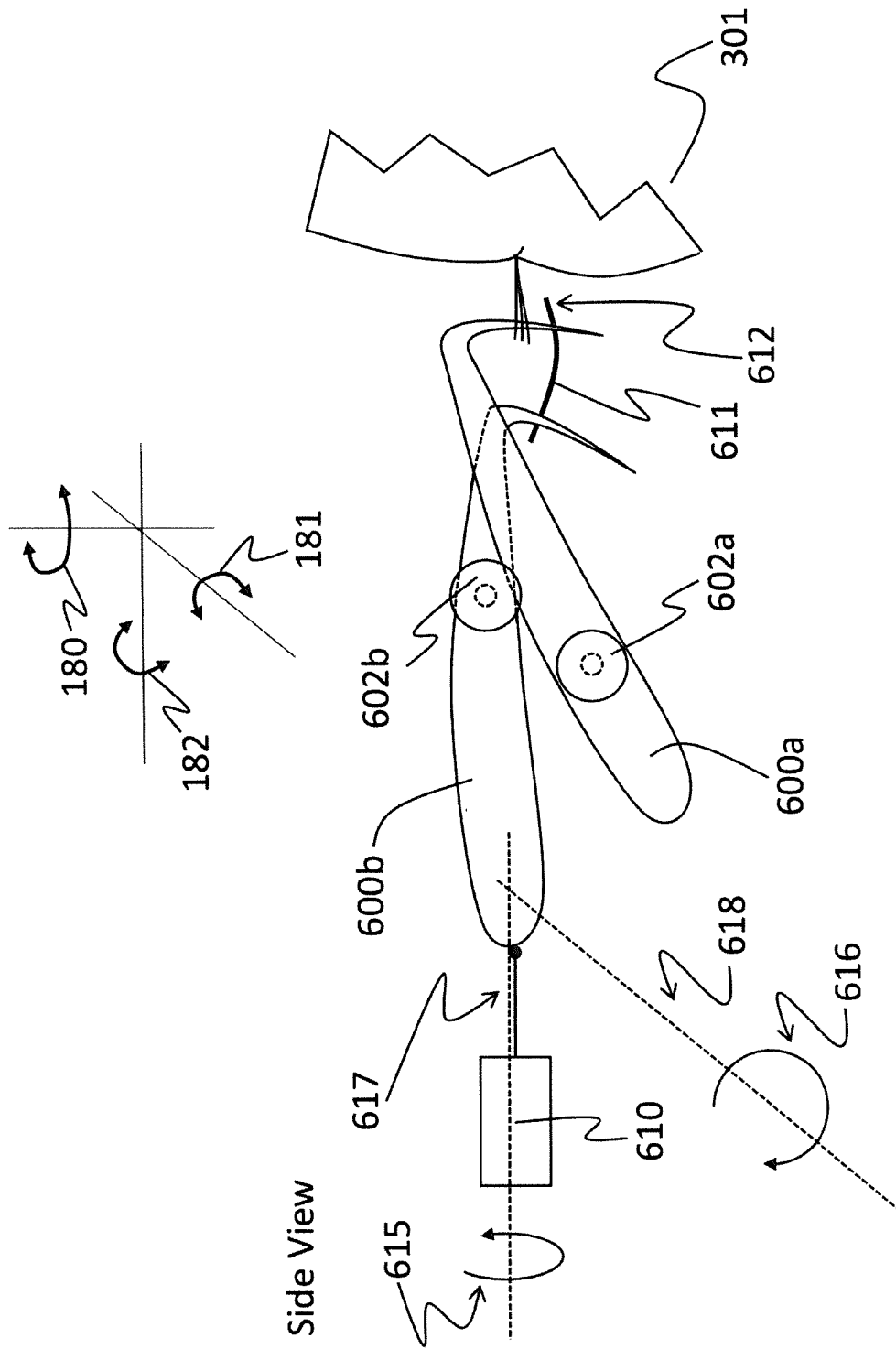
FIG. 18 shows an alternative robotic head mechanism similar to that of FIGS. 17A and B, including two additional degrees of freedom.

This is illustrated schematically in FIG. 18, which is principally comprised of the side view of FIG. 17B, with the addition of a roll arrow 615, indicating the direction of roll of placement tweezers 600B about a roll axis 617, and the addition of a pitch arrow 616, indicating the direction of pitch of placement tweezers 600A about a pitch axis 618. In FIG. 18, the orientation terms are labeled as pitch (or tilt) axis 181, roll axis 182, and yaw (or twist) axis 180. Although shown on the rear side of placement tweezers 600B, the center of rotation of pitch axis 618 can be further toward the tip of tweezers 600B. Of course, there are many ways known in the art to control the pitch and roll of a set of tweezers, such as, without loss of generality, electric motors, brushed motors, brushless motors, gear motors, and stepper motors. Because placement tweezers 600A are generally light (on the order of 50-100 grams is common for tweezers), the amount of torque required is very low, and there are many readily available options.

Figure 19A:
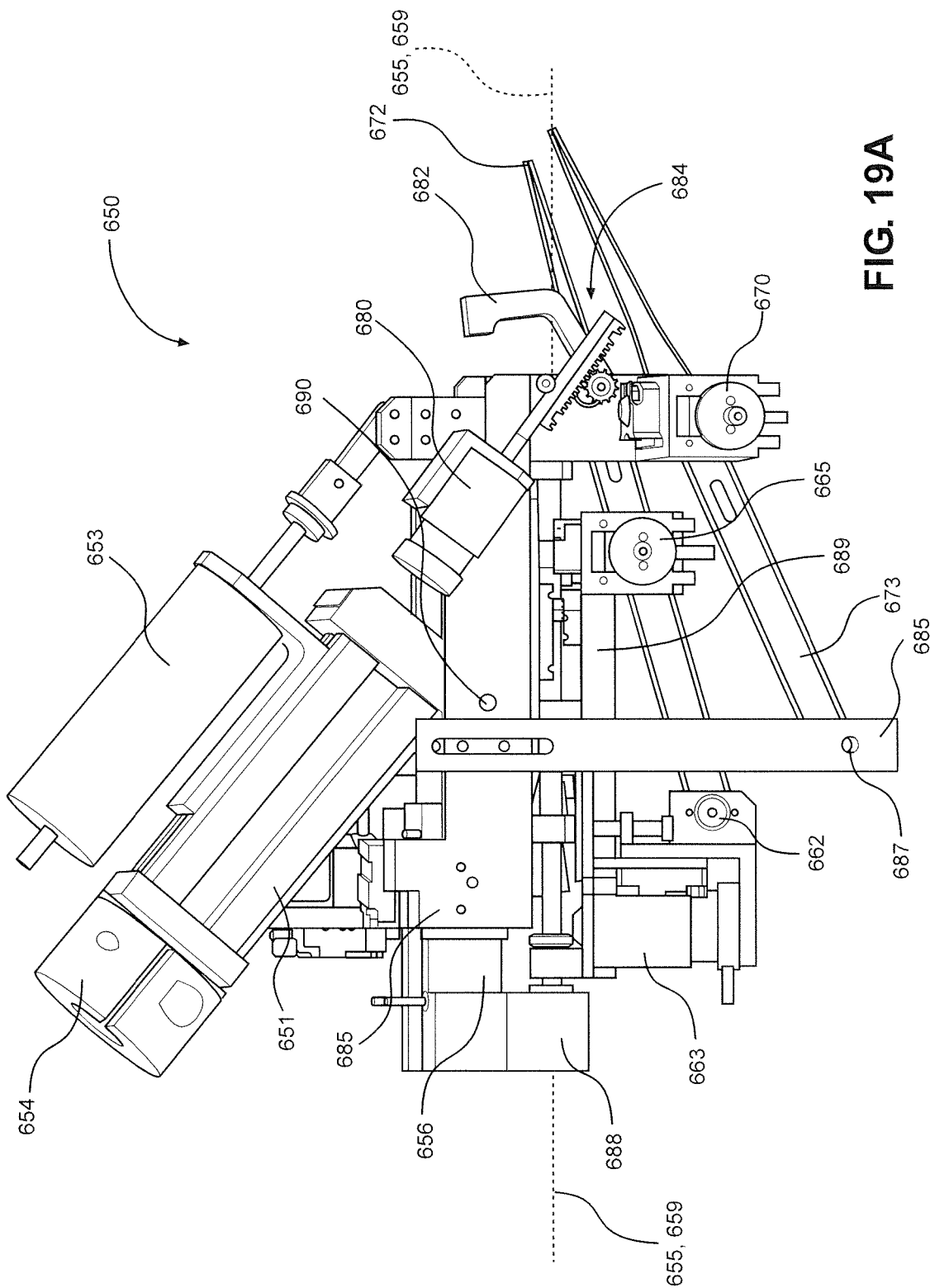
FIG. 19A is a first view of a robotic head mechanism.
Figure 19B:
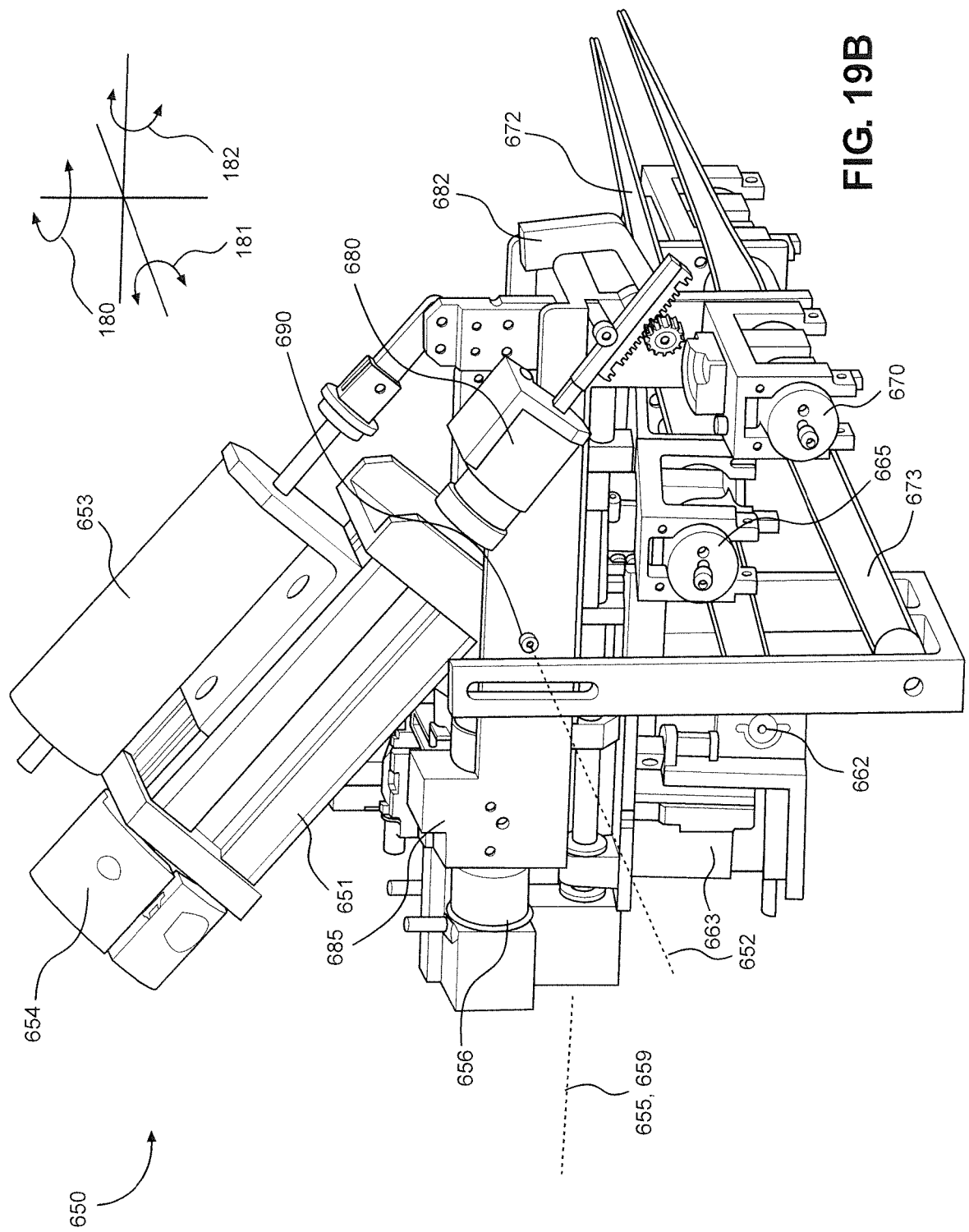
FIG. 19B is a second view of the robotic head mechanism of FIG. 19A.
Figure 19C:
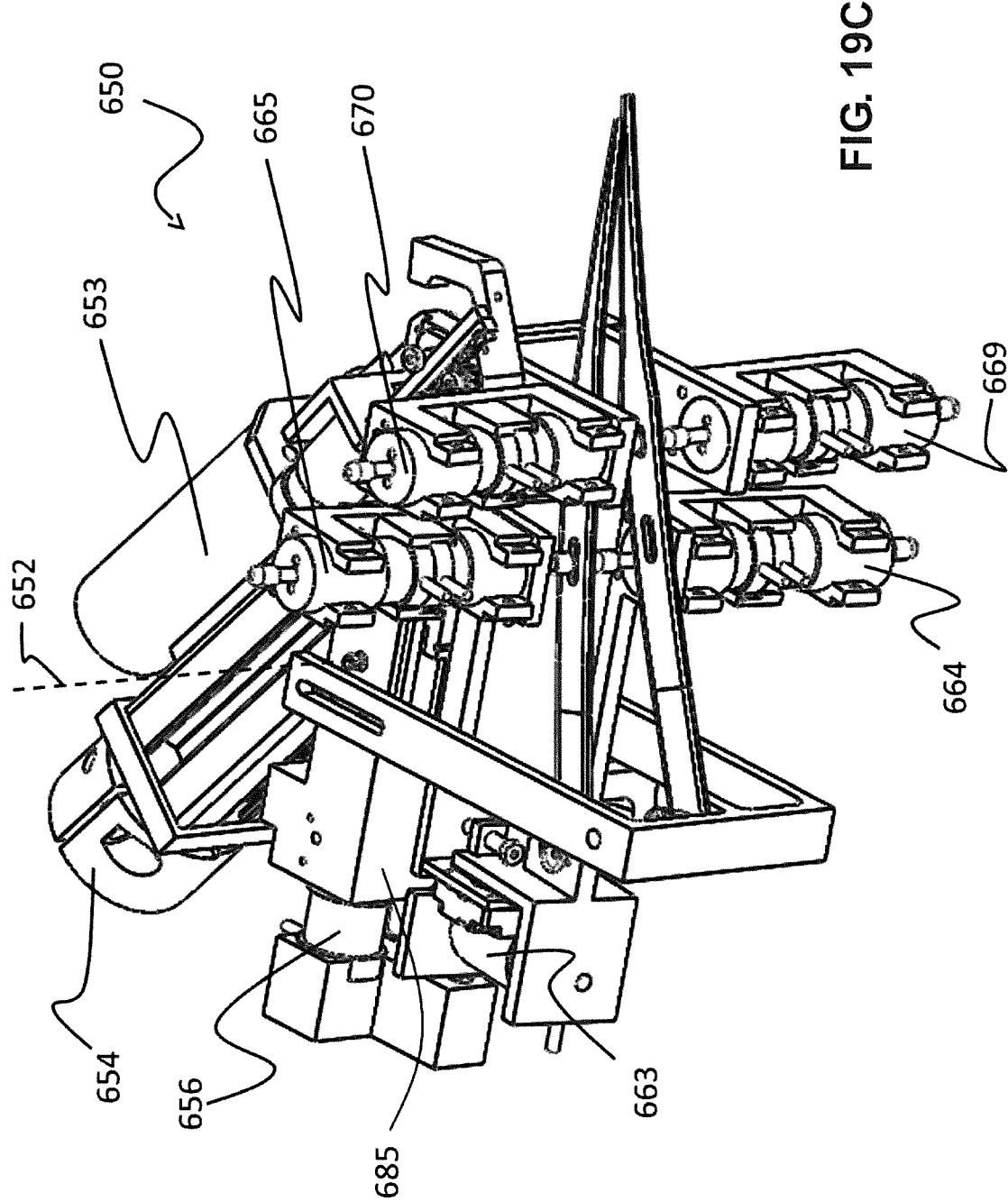
FIG. 19C is a third view of the robotic head mechanism of FIG. 19A.

A fully realized embodiment of such a robotic head mechanism is shown in FIGS. 19A-D, which show different views of a robotic head mechanism 650. In FIG. 19B, the orientation terms are labeled as pitch (or tilt) axis 181, roll axis 182, and yaw (or twist) axis 180. Initially, attention is drawn to a mounting stub 651 which includes a collar clamp 654. Collar clamp 654 is configured to be attached to a robot, for example SCARA robot 500, six-axis robot 530, or robotic mechanism 219 if robotic head mechanism 234 is not used. Robotic head mechanism 650 includes nine actuators, each controlling motion about or along a single axis. Each actuator and axis shall now be described in turn. It should be understood that various bearings, mounting hardware, and wires will not be described for sake of clarity as such elements for these actuators are well understood by one skilled in the art of robotic design. The actuators are all comprised of linear motors including linear bearings; some actuators are comprised of two linear motors for convenience of design, but the two linear motors simply act in unison as if they were one larger motor. Without limitation, the linear motors are intended to include brushless linear motors, brushed linear motors, voice coil motors, rotary motors with their output converted by mechanism to be linear, or even piezoelectric motors.

Mounting stub 651 is connected to a distal axes mounting bracket 685 by a distal axes pivot shaft 690, and motion about a distal axes pitch axis 652 is controlled by a distal axes pitch actuator 653. Both straight placement tweezers 672 and straight isolation tweezers 673 are attached downstream of the motion about distal axes pitch axis 652. Therefore, distal axes pitch actuator 653 generates a pitch motion on both tweezers 672 and 673.

Straight isolation tweezers 673 are mounted directly to distal axes mounting bracket 685 at their tail end by an isolation tweezers mounting pivot 687. Many actuators for additional motions are also mounted directly to distal axes mounting bracket 685. Distal axes mounting bracket 685 mounts a placement tweezer thrust actuator 656, a right isolation tweezer actuator 670, a left isolation tweezer actuator 669, and an auxiliary brush actuator 680 (the latter three items will be described later).

Placement tweezer thrust actuator 656 controls thrust motion along a placement tweezer thrust axis 655 by pushing on a placement tweezer thrust carriage 688. Because straight isolation tweezers 673 are mounted upstream of motion about placement tweezer thrust axis 655, they are not thrusted by placement tweezer thrust actuator 656. However, straight placement tweezers 672 are mounted downstream of the motion about placement tweezer thrust axis 655. As a result, placement tweezer thrust actuator 656 produces relative thrust between straight placement tweezers 672 and straight isolation tweezers 673. This is similar to the action of thrusting motor 610 described above.

Placement tweezer thrust carriage 688 mounts a placement tweezer roll actuator 660 (see FIG. 19D), which pivots a placement tweezer roll carriage 689 about a placement tweezer roll axis 659, which is coincident with placement tweezer thrust axis 655. Again, this roll motion is applied only to straight placement tweezers 672, thereby producing relative roll between straight placement tweezers 672 and isolation tweezers 673.

Placement tweezer roll carriage 689 mounts a placement tweezer pitch actuator 663. Straight placement tweezers 672 have their pitch controlled by placement tweezer pitch actuator 663. To do this, placement tweezer pitch actuator 663 moves a placement tweezers mounting pivot 662 up and down (using the orientation of FIG. 19A to define up and down in this case). Straight placement tweezers 672 pivot about a placement grip axis 666. Again, this pitch motion is applied only to straight placement tweezers 672, thereby producing relative pitch between straight placement tweezers 672 and straight isolation tweezers 673.

Both straight placement tweezers 672 and straight isolation tweezers 673 include two sets of motors controlling their respective closing. For clarity, only one of two prongs of each set of tweezers is shown, but it should be understood that the tweezers are typical straight tweezers having two identical prongs. This action is the same as described above in connection with FIGS. 17A and B, allowing for the closing of the tweezers about a variable point and effectively allowing for a gripper with lateral control of its grip point. For straight placement tweezers 672, this motion occurs along placement grip axis 666 with a left placement tweezer actuator 664 and a right placement tweezer actuator 665. For straight isolation tweezers 673, this motion occurs along an isolation grip axis 671 with left isolation tweezer actuator 669 and right isolation tweezer actuator 670. Of course, either set of tweezers can be constructed with a non-straight geometry and can be curved tweezers as above.

It is important to note that placement grip axis 666 and isolation grip axis 671 are not parallel as drawn. This is because placement tweezer roll carriage 689 is shown slightly displaced about placement tweezer roll axis 659. Because straight placement tweezers 672 are mounted downstream of placement tweezer roll carriage 689 and straight isolation tweezers 673 are not, this slight displacement produces the misalignment of placement grip axis 666 and isolation grip axis 671.

In practice, the position of straight isolation tweezers 673 is controlled by any robot attached to collar clamp 654, as well as distal axes pitch actuator 653, left isolation tweezer actuator 669, and right isolation tweezer actuator 670. This means straight isolation tweezers 673 have two degrees of freedom, plus tweezer grip, in addition to the degrees of freedom of the robot. Conversely, the position of straight placement tweezers 672 is controlled by any robot attached to collar clamp 654, as well as distal axes pitch actuator 653, and additionally by placement tweezer thrust actuator 656, placement tweezer roll actuator 660, placement tweezer pitch actuator 663, left placement tweezer actuator 664 and right placement tweezer actuator 665. This means straight placement tweezers 672 have five degrees of freedom, plus tweezer grip, in addition to the degrees of freedom of the robot. Therefore, it should be clear to one skilled in the art of robotics that, with a sufficiently dexterous robot such as SCARA robot 500 or six axis robot 530, robotic head mechanism 650 possesses plenty of degrees of freedom to isolate a single natural eyelash of the person while placing an eyelash extension.

Finally, auxiliary brush actuator 680 controls the motion of an auxiliary brush arm 682 through a rack and pinion assembly 684. This assembly allows for the selective deployment of a brush or probe (not shown) attached to auxiliary brush arm 682. By choosing a brush or probe that is long enough to reach past the tips of tweezers 672 and 673, the brush or probe can be used to clean, brush, or jostle the natural eyelash of the human when deployed but not interfere with tweezers 672 and 673 when retracted.

Eyelash Recognition Issues and Relation to Acceptance Criteria

Having discussed various robotic systems in detail, attention will now turn to identification of eyelashes using computer vision, and, in the following section, how this interacts with isolation.

In general, it is difficult to use computer vision to identify an eyelash because (1) the eyelashes are relatively small, with diameters on the order of 100 microns ($100 \times 10^{-6}$ meters), because (2) the eyelashes may be overlapped, stuck together, or in front of one another, because (3) the human subject may slightly move, and because (4) the human subject cannot be subjected to excessive light or radiation. There are many computer vision techniques known to the art that are intended to identify very small objects. For example, a surface mount 0402 resistor used in manufacture of printed circuit assemblies is 400×200 microns, and computer vision systems of various types are widely used in industry to assemble and verify correct assembly of printed circuit assemblies. However, these systems often use laser scanners or structured light arrays that work only when the subject is motionless (violating 3 above) and are often too bright to be used near the eyes of a human (violating 4 above). Of course, new technology is constantly being developed in this area, and these systems may eventually be useable with human eyelashes. However, in a preferred embodiment, cameras with high magnification (e.g., using macro lenses) can resolve details easily into the tens of microns, small enough for a human eyelash to be many pixels wide. Such cameras do not require excessively bright light and can have short shutter times of less than 50 milliseconds, preventing motion artifacts from being an issue. However, issue (2) above remains: many eyelashes may be overlapping, obscured, or stuck together.

Figure 20:
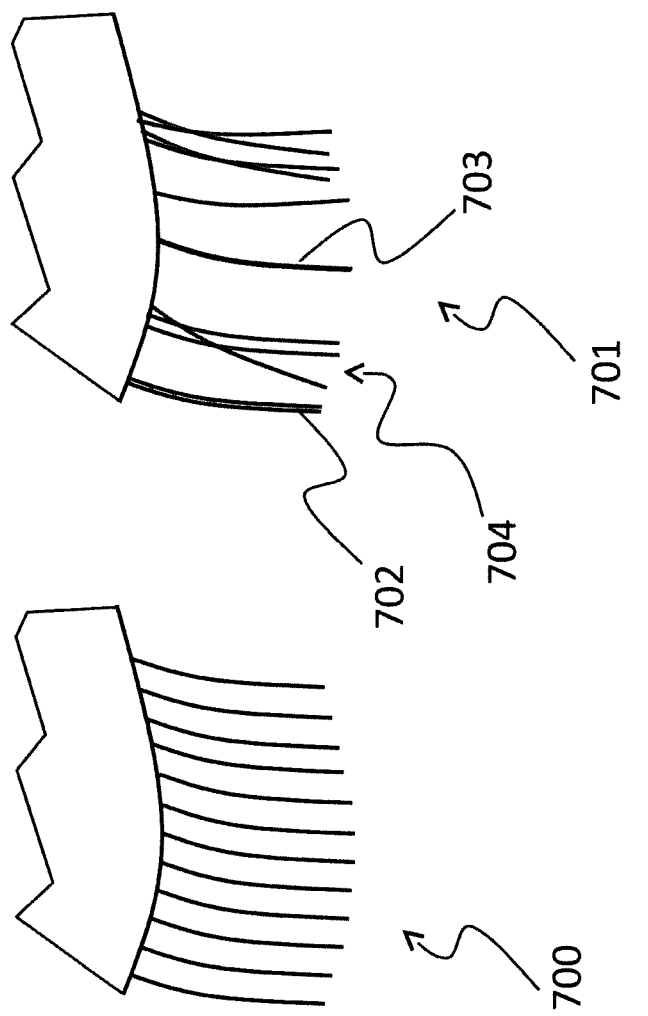
FIG. 20 is a schematic view of an idealized eyelash and a more realistic eyelash.

FIG. 20 shows a simplified schematic representation of a short section of human eyelash that illustrates issue (2) above. Idealized eyelash section 700 is an idealized version, with uniformly distributed eyelashes. This is not representative of a typical human eyelash section. Realistic eyelash section 701, on the other hand, is more representative of a typical human eyelash section. Realistic eyelash section 701 includes parallel doubled eyelash 702 (parallel to the field of view), stacked double eyelash 703 (two eyelashes stacked into the field of view), and crossing eyelash 704. It is clear from this schematic that it is not simple to determine that an eyelash is single or clustered. Furthermore, the problem is important in eyelash extension because eyelashes should, in general, not be glued together.

The problem of identifying if an eyelash is a singleton or a cluster (i.e., two or more stacked or crossing eyelashes) is particularly important because a person's eyelashes may not grow at uniform rates. That is, it is widely held in the art of manual eyelash extension that two adjacent natural eyelashes may grow at different rates. If the adjacent eyelashes are bonded together during the placement process, as might happen if the eyelashes are crossing or just so close that the adhesive used on an extension bridges the gap, then it is easy to see that the three-eyelash group (two natural, growing at different rates, and one artificial, bonded to the first two), may start to bend in the direction of the slower growing natural eyelash. As this direction is effectively random, the extension will point in a direction not intended, ruining the aesthetics of the overall eyelash extension. This is known to practitioners of manual eyelash extension but poses a particular problem for robotic eyelash extension because the computer vision system should recognize any doubled eyelash.

Figure 21:
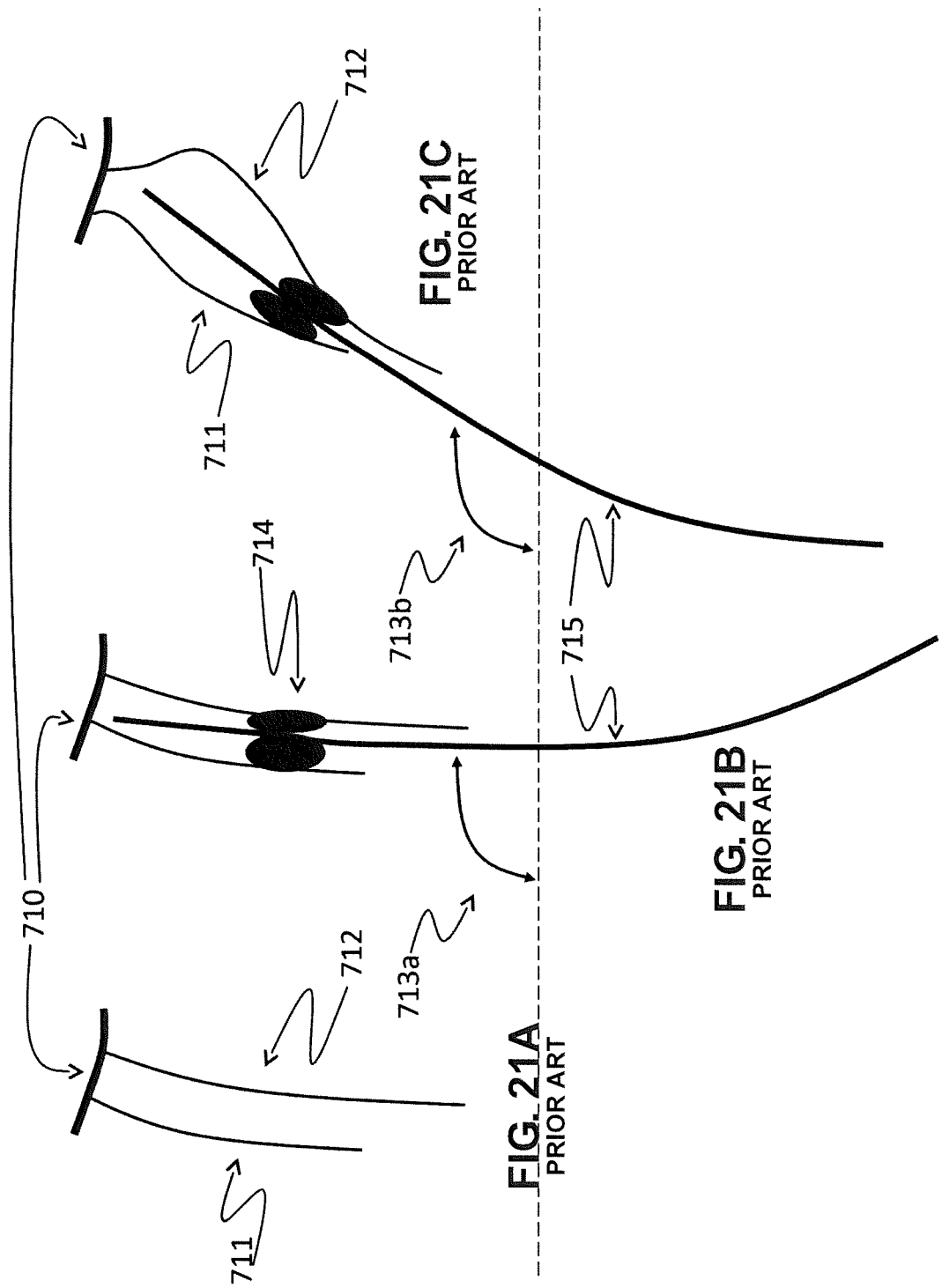
FIG. 21A shows two eyelashes.
FIG. 21B shows the two eyelashes of FIG. 21A inadvertently bonded together.
FIG. 21C shows the irregular growth pattern resulting from the bonding of FIG. 21B.

As an illustration of this problem, consider FIGS. 21A-C. In FIG. 21A, slow growing eyelash 711 and fast-growing eyelash 712 are shown along with eyelid edge 710. Here, the entire figure is a blown-up view of just two of the eyelashes in FIG. 20. In FIG. 21B, extension 715 has been improperly applied to both slow growing eyelash 711 and fast-growing eyelash 712, perhaps because they were too close for the computer vision system to distinguish them. Glue 714 is shown schematically as a drop between each eyelash and extension 715, which is at a proper extension angle 713A. In FIG. 21C, some days have passed, and fast-growing eyelash 712 has pushed the extension to one side. As a result, improper extension angle 713B is much greater than proper extension angle 713A.

Figure 22:
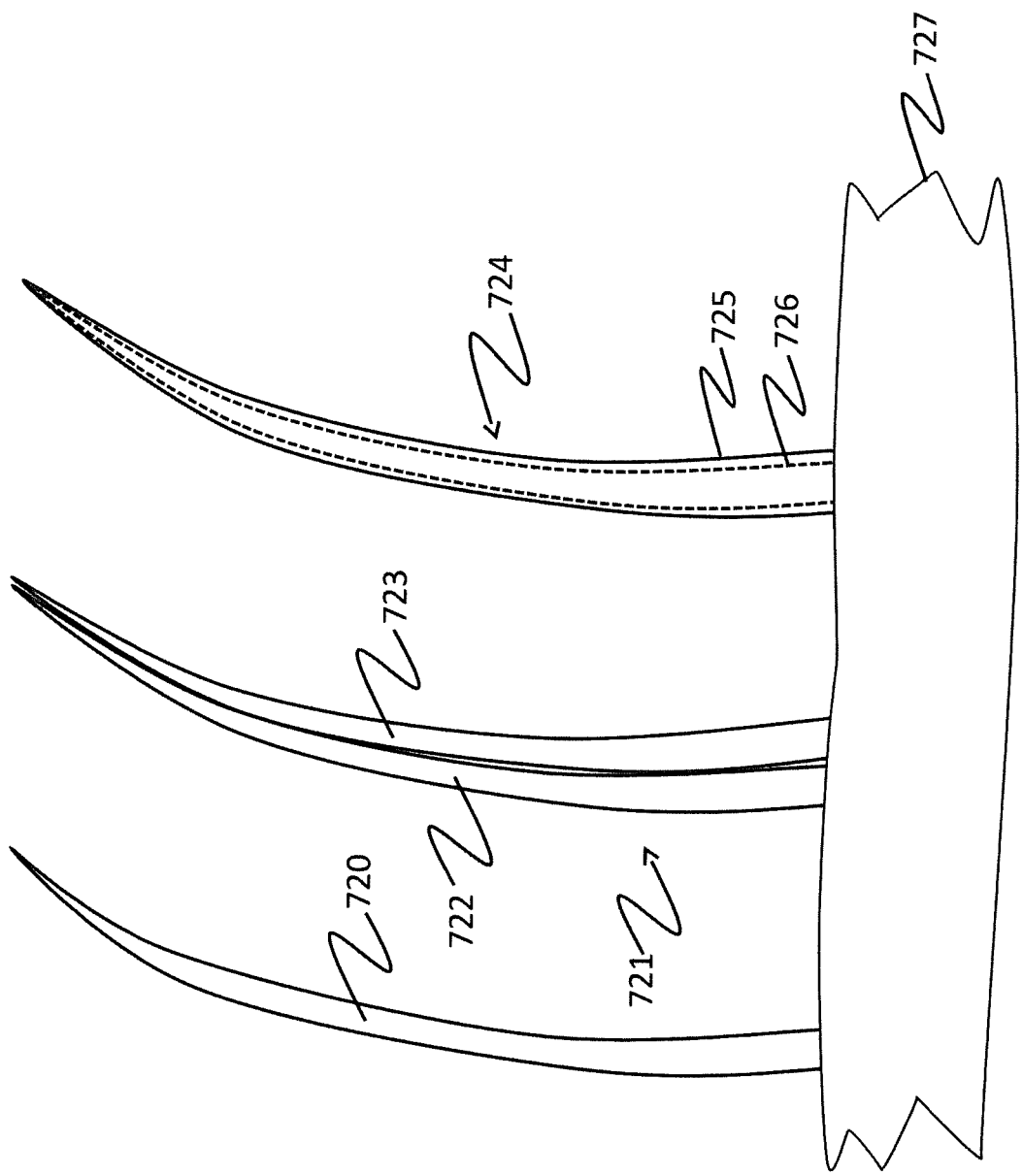
FIG. 22 shows natural human eyelashes at great magnification, schematically depicting different types of clustering.

Recognizing that an eyelash is doubled can be achieved by measuring its dimensions and comparing them to typical measurements for people in general and against the other eyelashes of that client. To do this, one can take advantage of two properties of natural human eyelashes: 1) disregarding the tapered tip of the eyelash, natural human eyelashes tend to be of constant diameter, and 2) disregarding the tapered tip (and therefore short eyelashes), diameters of individual eyelashes on the same subject tend to be very consistent. The tapered tips of eyelashes are produced during the first days of the eyelash growth cycle and are the first part of the eyelash to be seen outside of the skin surface. Eyelashes in this phase will be tapered and short. After this phase, the eyelash shaft that is increasingly exposed at the root as the exposed eyelash lengthens (either by eyelash growth or by the follicle pushing the eyelash outward) is generally of constant diameter. FIG. 22 depicts a series of eyelashes on human eyelid 727. Single eyelash 720 is of generally consistent diameter until near its tip. The diameter of a typical eyelash like single eyelash 720 is around 100 microns. First and second eyelash 722 and 723 forming cluster 721 could be seen as a single eyelash measuring 200 microns wide, but this would easily be recognized as being suspect. Measuring the diameter of an eyelash can be done by measuring its width in pixels with a single camera in the computer vision system and then converting the pixel width into a diameter based on the known camera geometry. Of course, this geometry depends on the distance from the camera to the eyelash, but this will be approximately known, or can be measured accurately, as will be discussed later, allowing for easy disambiguation in a case such as cluster 721. Furthermore, it can be sufficient to simply observe a number of eyelashes to establish a "typical" diameter in pixels and flag as clusters any objects of substantially greater width (i.e., it may not even be necessary to convert into standard units of measure).

Nevertheless, in some cases, the eyelashes may be stacked on top of each other from the perspective of the camera, rather than being side by side. This is shown in stacked cluster 724, with front eyelash 725 obscuring back eyelash 726. Or, indeed, the eyelashes may be stacked at some angle between side-by-side and stacked, resulting in an apparent projected width that may be within the normal range. In some embodiments, it is possible to identify that two eyelashes are overlapping based on the texture of eyelashes (in the same way that we might identify that two pieces of pipe are overlapping at a human scale because we see the texture and shading of light on the pipe change at any point where some overlap is visible). Nevertheless, eyelashes have little texture, and it may not always be possible to recognize their shape.

As a solution to this problem, it is possible to use two cameras, and, based on the apparent disparity between the images, calculate the depth of the object in question. Then, the acceptance criteria can be based on any geometric parameter—the depth and width, or diameter, length, shape, curvature, cross section, and thickness or any other set of dimensional criteria applied to the cross section of the eyelash or eyelash pair. In some cases, the eyelashes may only cross for a small section of their length, forming an "X". In such a case, it can be advantageous to apply the acceptance criteria over the length of each eyelash, so that an isolated crossing can be identified. In the limit, this approach amounts to creating a three-dimensional model of each candidate eyelash and checking that it meets acceptable geometric ranges for an eyelash. In this embodiment, the acceptance criteria become distributed parameters; that is, the parameter being used as a criterion for a suitable eyelash for extension is not a criterion at a single point but a parameter distributed along the length of the eyelash. Such an approach will also help in identifying and excluding juvenile eyelashes that may not yet be suitable for extension.

Figure 23:
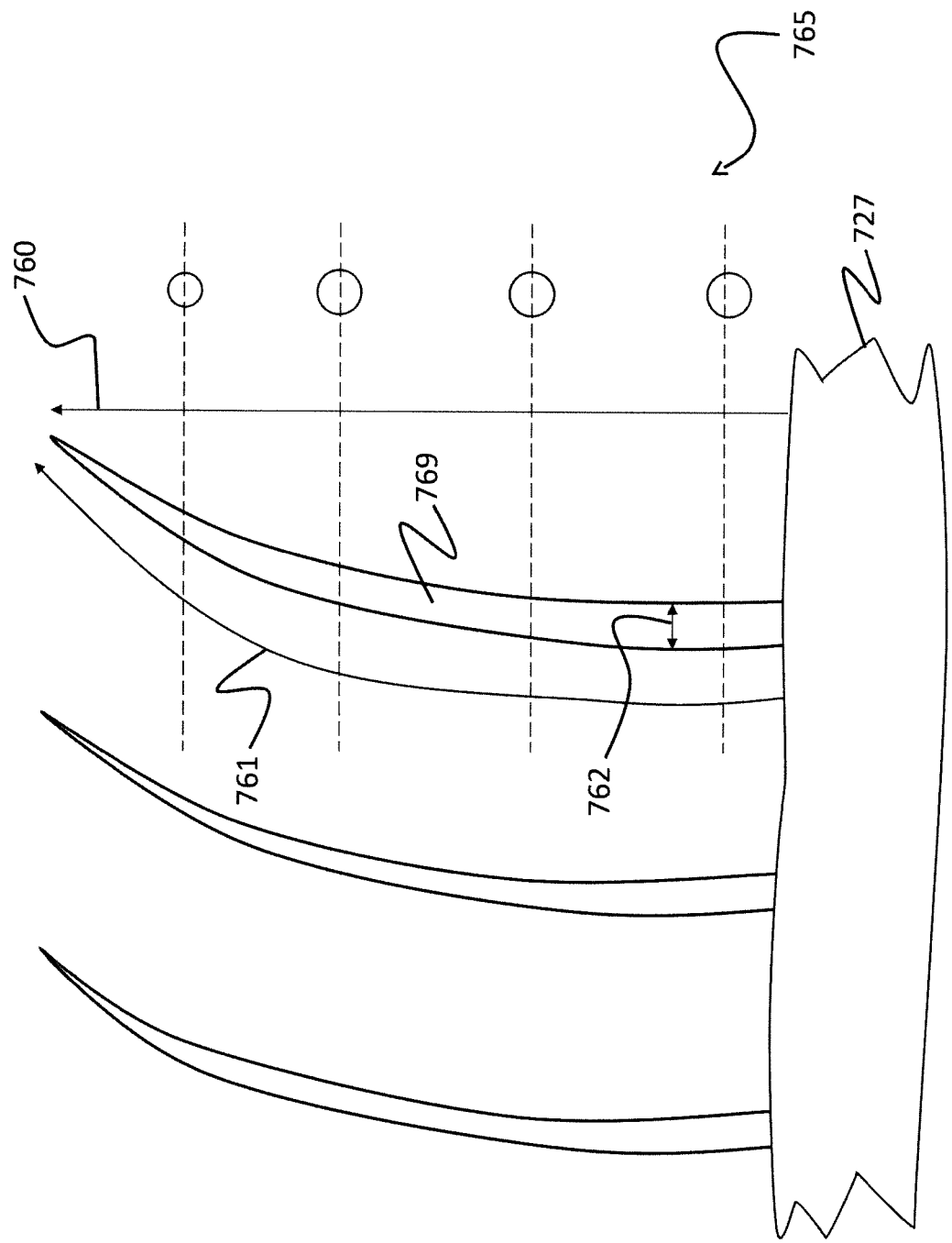
FIG. 23 shows various geometric acceptance criteria for evaluation of a singleton eyelash.

FIG. 23 shows some of the basic criteria of eyelash 769 on eyelid 727. Here, eyelash length is measured along the normal from the eyelid as normal length 760, or along the length of the eyelash as path length 761, or even the curvature of path length 761. Furthermore, eyelash diameter 762 can be used as a criterion, or so can be the distributed diameter or cross-sectional area as indicated by distributed cross-sections 765. Indeed, the complete three-dimensional model of eyelash 769 can be compared as the bases for acceptance criteria. The intention of showing these criteria is not to limit the scope of the invention but to illustrate several geometric criteria that can be used.

As a further example of the utility of using two cameras for estimation of eyelash parameters, consider FIGS. 24A-C, which show several eyelash situations in cross section, with the cross section of each eyelash shown schematically as a circle. Here, FIGS. 24A-C show stacked cluster 724, left angled cluster 732, and right-angled cluster 733. Also shown are left camera 730L and right camera 730R. In FIG. 24B, right camera 730R cannot see both eyelashes, and in FIG. 24C, left camera 730L cannot see both eyelashes. However, it is trivial to see that in all arrangements, at least one of camera 730L and 730R can see both eyelashes and therefore ascertain that the eyelash cluster is too deep in the direction generally along arrow 735 to be a single eyelash. Indeed, it is trivial to see that very large angle 737 is greater than large angle 736 which is greater than single angle 738. Since single angle 738 is what would be expected for a single eyelash, it is evident that very large and large angles 737 and 736 are too large to represent a single eyelash. However, the major difficulty in applying this result in practice is how to solve the stereo correspondence problem—how to match the objects that appear in the two cameras when many such objects may be in the field of view. That is, in the more general situation than the one shown in FIGS. 24A-C, where many eyelashes are present, how is it possible to match an eyelash seen with one camera to an eyelash seen with the other camera so that we may infer that both camera 730L and 730R are seeing the same eyelash or eyelash cluster? This is a class of problems in stereo computer vision that cannot be solved in general. Typical strategies involve matching key points in the left and right cameras, but this is not generally possible when the field of view contains many identical objects with little distinct texture. The particular solution that is advantageous here will be addressed below.

Relation to Isolation

Of course, simply knowing that a pair of eyelashes is crossing is not sufficient. While it is possible to simply avoid any eyelashes that do not meet the criteria for extension (i.e., that are immature or doubled), doing so would result in voids, ruining the aesthetics of the overall eyelash extension job, as discussed above. Therefore, it can be desirable to physically jostle and isolate eyelashes. In the simplest embodiment, this can involve brushing up against an eyelash with an end effector. Indeed, this can even be achieved by the robotic system used for manipulating the extensions, even while it is holding an extension. This has the obvious advantage of simplicity since no additional robotic system is needed. In an exemplary embodiment, this approach can be combined with the acceptance criteria discussed above in alternation in order to first establish that an eyelash is potentially not a singleton, then probe the eyelash with the robotic system, then check it against the acceptance criteria again in order to see if the eyelash is now clearly a singleton.

However, even this solution may be insufficient. While in some cases, two eyelashes may simply be stuck together and probing them with the robotic system can cause them to separate, in other cases, they may be pressed against each other so that simply disturbing them does not cause them to separate, or, if it does, they simply come back together once the robotic system is removed. Therefore, in some embodiments, a second robotic system, or a second appendage from the same robotic system is used to keep an eyelash isolated. For example, as discussed above, a first tweezer can be used to perform eyelash extension placement, with a second tweezer is used for isolation. In the case of the isolation tweezer, it is closed to a very small gap, then pushed through the fan of the eyelashes, then opened (methods for determining the location of the natural human eyelash are described below). In some percentage of the time, this will result in a single eyelash remaining between the prongs of the second tweezer.

Figure 25A:
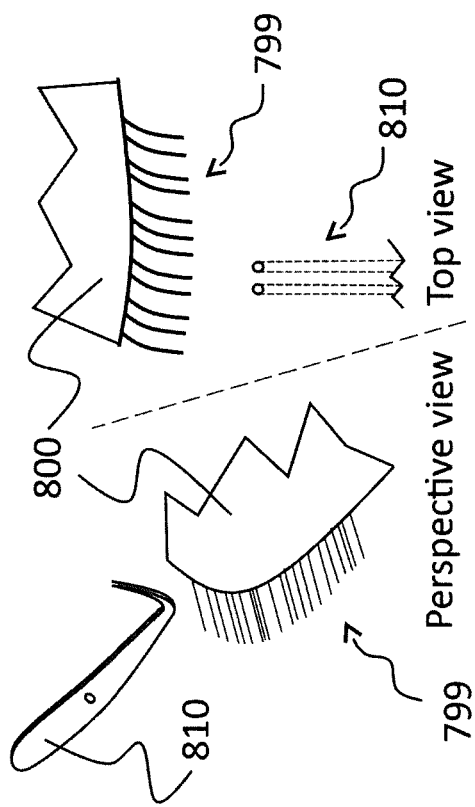
FIG. 25A shows a first portion of a method of isolation involving tweezers and not requiring good a priori knowledge of the eyelash location.
Figure 25B:
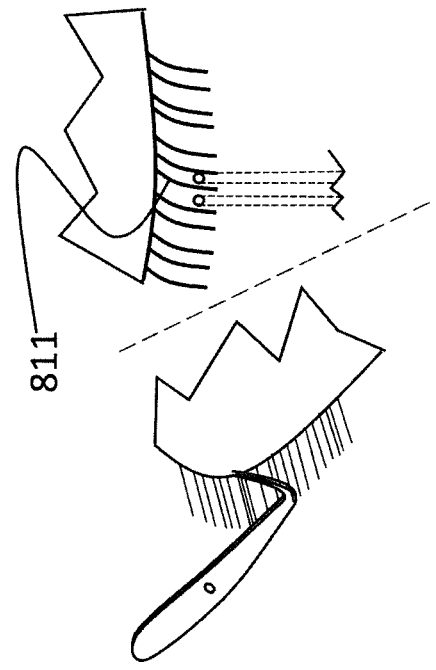
FIG. 25B shows a second portion of the method of FIG. 25A.
Figure 25C:
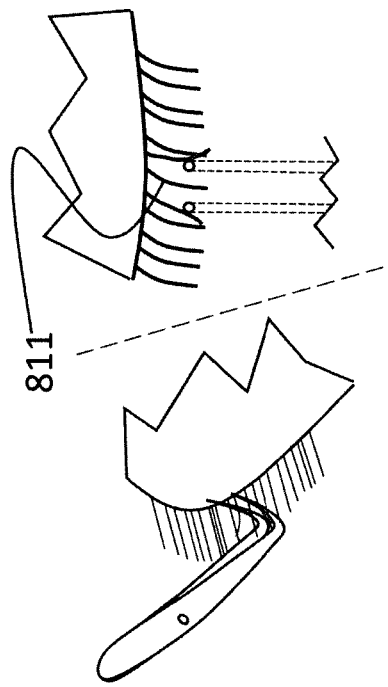
FIG. 25C shows a third portion of the method of FIG. 25A.
Figure 25D:
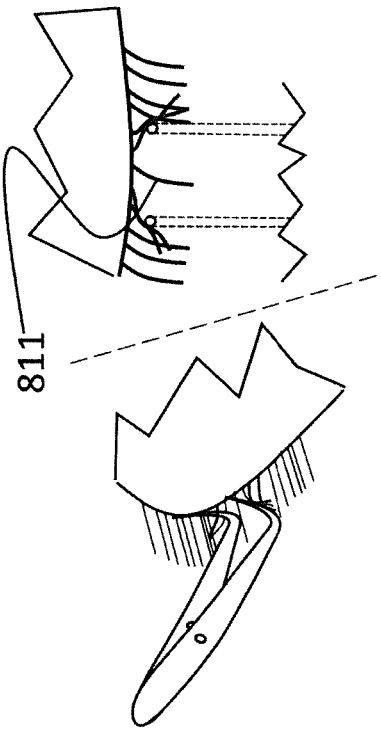
FIG. 25D shows a fourth portion of the method of FIG. 25A.

This isolation technique is illustrated in more detail in FIGS. 25A-D. Here, eyelashes 799 and eyelid section 800 are shown in two views, in perspective and from above. In FIG. 25A, tweezers 810 approach eyelid section 800; tweezers 810 are nearly, but not quite, closed. In FIG. 25B, tweezers 810 are inserted into eyelashes 799, with only general knowledge of the position of each eyelash. In some instances, the two prongs of tweezers 810 may not successfully straddle an eyelash, but in this case, they straddle isolated eyelash 811. In FIG. 25C, tweezers 810 begin to open, pushing aside other eyelashes, before, finally, in FIG. 25D, the tweezers are fully open and isolated eyelash 811 is fully isolated.

This embodiment—using the robotic mechanism to perform isolation in conjunction with acceptance criteria—has a secondary advantage. Even with the best stereo computer vision systems that use apparent differences in a pair of images of the same object, it can be difficult to match multiple objects in order to create the stereo measurements, as discussed above. This is particularly true when there are multiple sets of identical objects, such as an insect screen, bars on a window, or human eyelashes. The problem is that in absence of other information, it can be difficult to determine which object that is present in a first image is the same object that is present in a second image. Sometimes other information is available, for example the edge of the window in the example of bars on a window. If the same window edge is visible in both images, it is possible to count from that reference to each bar and match corresponding bars. With, however, over 100 eyelashes on a typical human eye, this strategy is difficult. Another option is to provide fiducial markers placed on the person to provide references to the computer vision system, but this may not have enough resolution to be foolproof, and the markers will not be the same depth from the camera as the eyelashes, limiting their utility. This is where isolation driven by the robotic mechanism can be useful. Once the isolation tweezers have opened (as in FIG. 25D, above), there is a much lower effective linear density of eyelashes between the prongs, and, in most cases, an easily countable number. Furthermore, the prongs of the tweezers can easily be identified, and fiducial markers can trivially be added to them, allowing for a known marker location in the midst of the isolated eyelash(es). In some embodiments, the tweezers can include fiducial markers well clear of the eyelash area, allowing for easy identification of the tweezers, and then the tip location of the tweezers can be inferred based on the fiducial position and tweezer geometry. Isolating one or several eyelashes between the tweezers allows for effective and robust stereo matching and therefore accurate estimation of the geometry of the eyelash. And, accurate estimation of the geometry of the eyelash further allows for more accurate application of the acceptance criteria discussed above.

Figure 26:
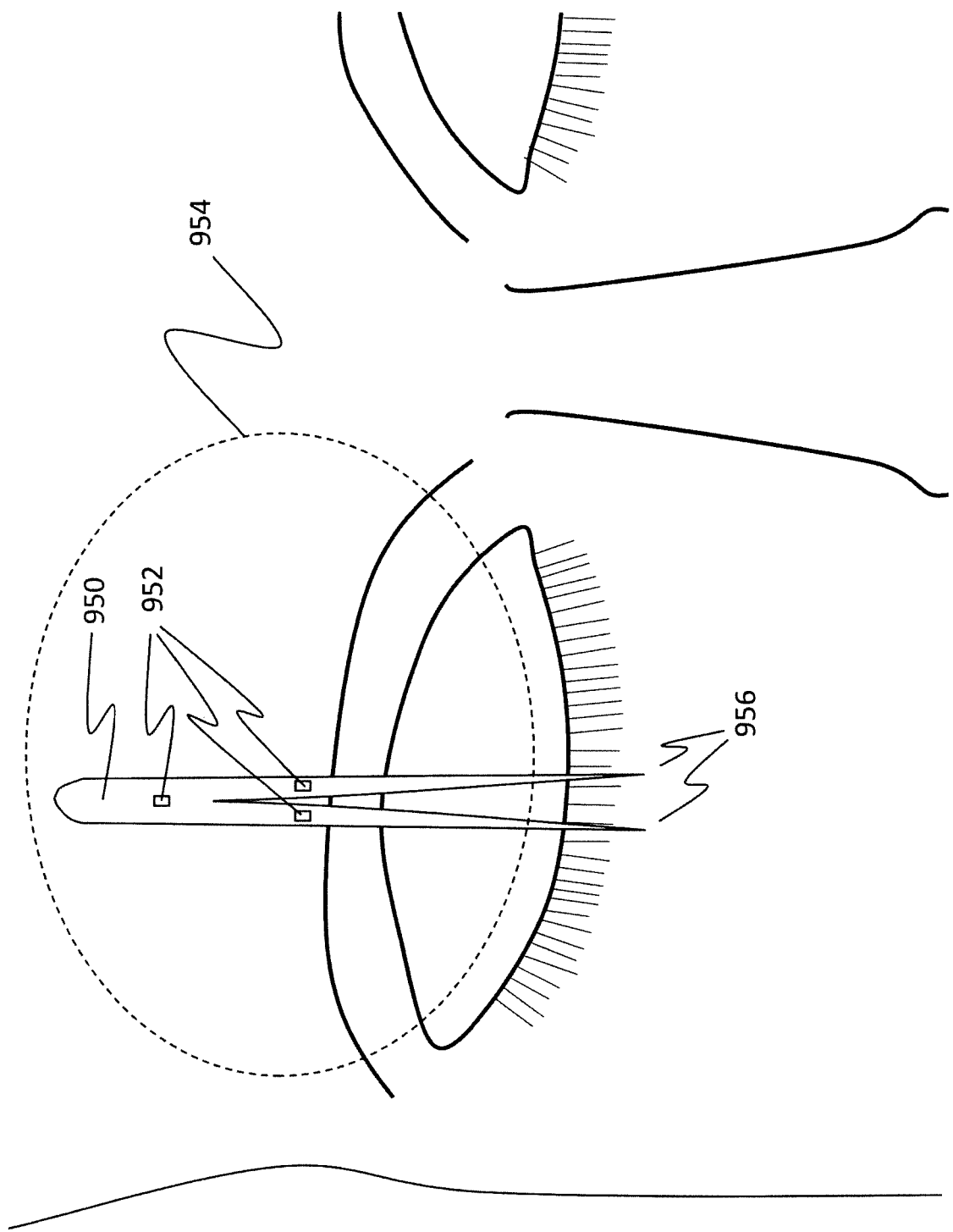
FIG. 26 depicts tweezers operating in the eyelashes of a subject and having fiducial markers clear of the working area.

As an example of tweezers having fiducial markers outside of the region of the eyelashes, consider FIG. 26. Here, tweezers 950 extend well above the eyelash of the subject and contains three fiducial makers 952. Because fiducial markers 952 are in an area outside of the eyelash region, generally indicated by dashed line 954, there is no difficulty in identifying the orientation of tweezers 950, and, based on a predefined geometric model of the tweezers, inferring the position of tweezer tips 956. In some embodiments, such as the curved tweezers above, this model will be three dimensional, and the tip location into the page will be estimated from the tweezer orientation as well.

Figure 27:
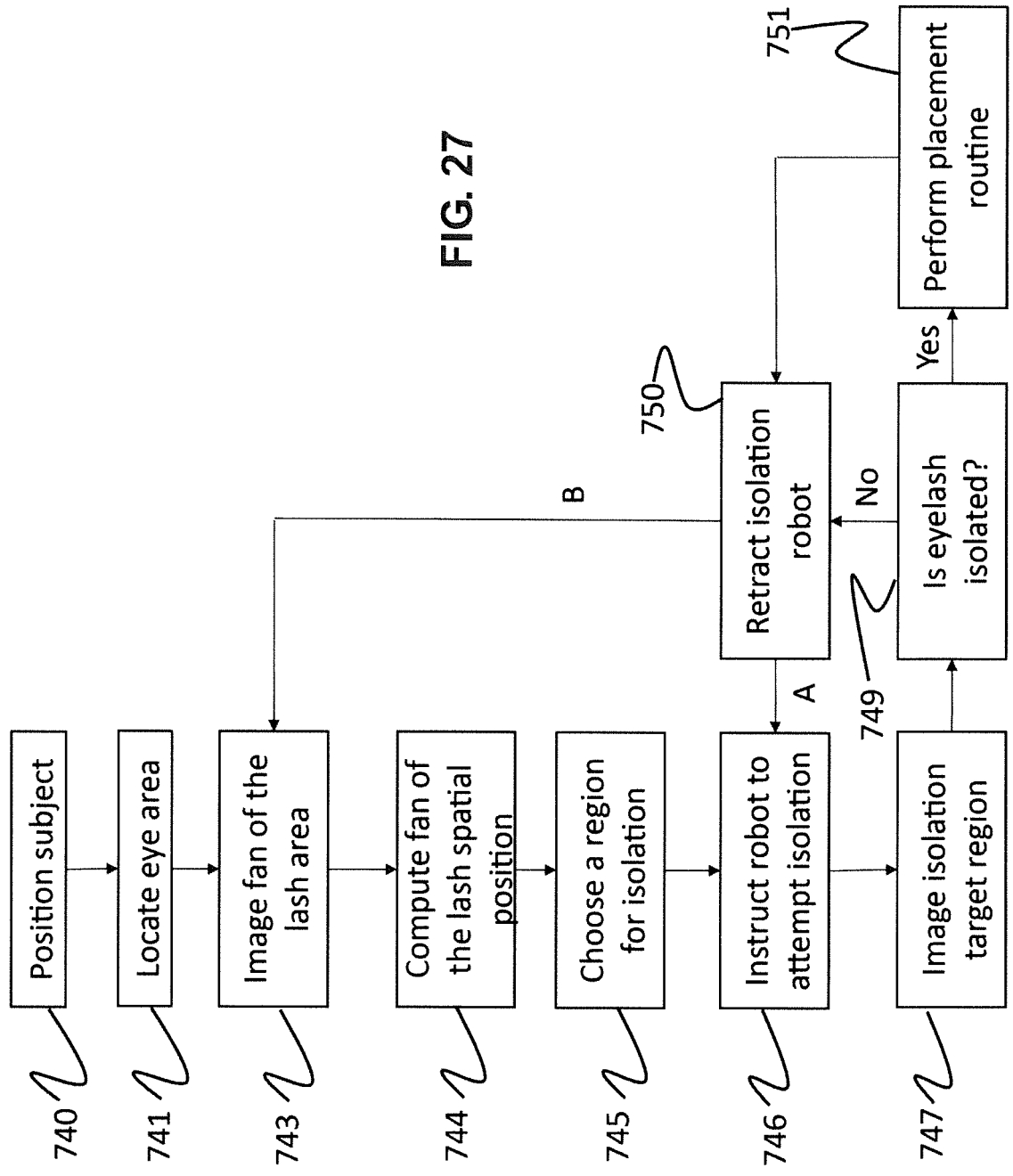
FIG. 27 is a process diagram for iteratively isolating eyelashes and checking them against acceptance criteria.

As a summary of the interlocking imaging and isolation techniques discussed here, consider FIG. 27. Initially, on positioning step 740, the subject is positioned into the robotic and computer vision system. Then the eye area is located in eye locating step 741. In some embodiments, this can be achieved automatically by the computer vision system recognizing the shape of a closed human eye. However, in some embodiments, it is preferable for a human operator of the robotic and computer vision system to manually align the head of the subject and/or the robotic system so that the eye of the subject is in the field of view of the camera. This can be used as an extra safety step to ensure that the computer vision system is looking at the expected type of object.

Next, in imaging step 743, the computer vision system images the fan of the eyelashes. In some embodiments, this can be the entire fan of the eyelashes for an eye of the human, but in other embodiments, it can be a smaller region that is only a subset of the entire fan of the eyelashes. Using the data from the computer vision system, the computer will calculate the position of the fan of the eyelashes with respect to the robotic system. Then the computer will choose a region within the fan of the eyelashes for isolation and extension placement in choose region step 745. Then, the computer will instruct the robotic system to attempt an isolation of an eyelash in attempt isolation step 746. This maneuver can be performed open loop (i.e., without use of the computer vision system) or closed loop (in which case the area is imaged multiple times within attempt isolation step 746 while the isolation is being performed). After this step, the computer vision system will image at least the target isolation area in post isolation imaging step 747, and then check whether the eyelash isolation was successful in check step 749. This can be achieved though the various parameters and acceptance criteria discussed above, including distributed parameters along the length of the eyelash.

If the eyelash is determined to have been successfully isolated, the computer will instruct the robot to perform the placement routine in placement step 751. Because the eyelash was carefully imaged in post isolation imaging step 747 and many geometric characteristics of the eyelash were established in check step 749, the computer can feed detailed information about the eyelash geometry to the robotic system. In at least a preferred embodiment, this geometric characteristic comprises a three-dimensional model of the eyelash. Once placement step 751 is complete, the computer will instruct the robotic system to retract the isolation robot in retraction step 750. This is also performed in the event that the eyelash isolation was not successful in step 749. After the isolation robot is successful, the computer can return along path "A" to step 746 or path "B" to imaging step 743. In the preferred embodiment, the computer heuristically chooses one path over the other at a certain interval. For example, it can be desirable to attempt isolation a number of times in one place along the fan of the eyelashes, choosing path "A" repeatedly, but then choose path "B" if the isolation is, or becomes, unsuccessful. By choosing path "B", the system can reset (in a manner of speaking), reimage a larger area of the fan of the eyelashes, and choose a new area in which to work.

In a variation on this process, the geometry of an individual eyelash of a specific person can be evaluated in order to better check the geometry of each isolated eyelash or cluster. For example, consider the flow chart of FIG. 28. Dashed box 922 indicates the process of evaluating the typical geometry, which might only be performed once during a session, while the portion of the flow chart outside dashed box 922 is performed on every isolation and placement cycle. Starting on imaging step 920, the entire fan the eyelashes, or a large portion of the fan of the eyelashes, is imaged. Then, naturally occurring singleton eyelashes are identified in natural isolation step 921. This can be achieved because, typically, at least some eyelashes will be isolated, and it is simple to determine that they are isolated by looking for highly isolated eyelash tips. In some embodiments, and especially for specific subjects where an isolated eyelash cannot be automatically identified with certainty, the system can prompt the user (that is, the person operating the system, not subject 301) to identify isolated eyelashes visually in user identification step 927. Once known good individual eyelashes are established, the geometric parameter and distributed parameters are established in estimate geometric parameters step 923. As a final check, these parameters are then stored and compared against known good ranges in verification step 924, and any deviation from these ranges is indicated as an error to the user in error step 926. The user can then choose to reestablish the parameters with greater visual identification. Once the parameters are established, the parameters are stored in store step 925. This storage can be local to the individual system, or it can include storage on a remote computer or cloud storage system with a reference to that subject so that the parameters can be used in future sessions with other systems.

Figure 28:
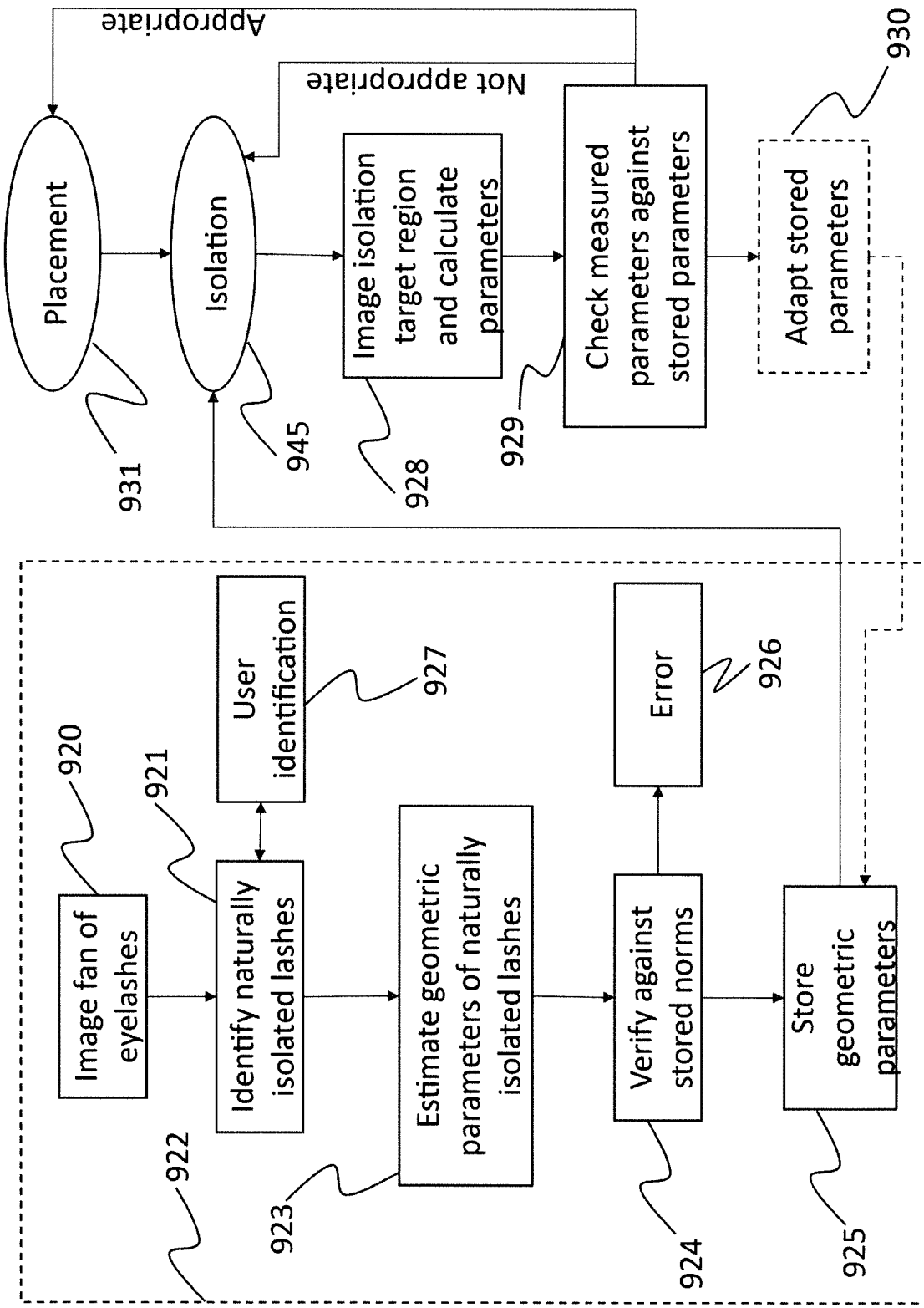
FIG. 28 is a process diagram for evaluating eyelashes based on various geometric criteria and parameters.

With further reference to FIG. 28, placement and isolation steps 931 and 945 refer to the previously discussed steps of placing an extension on a currently isolated eyelash and then isolating a new eyelash. Once the next eyelash is isolated in step 945, the isolated region is imaged in image isolation region step 928, which further includes calculating the geometric parameters from the image. Then in step 929, the newly calculated geometric parameters are compared to the stored parameters which were either generated at the start of that session or recalled from local or remote memory. Then placement step 931 can proceed if the newly calculated parameters are within acceptable ranges (i.e., the isolated eyelash is appropriate for extension), or a new isolation can be attempted if they are not. In some embodiments, as more eyelashes are successfully isolated, the stored parameters can be adapted and refined based on the additional data in adaptation step 930.

Figure 29:
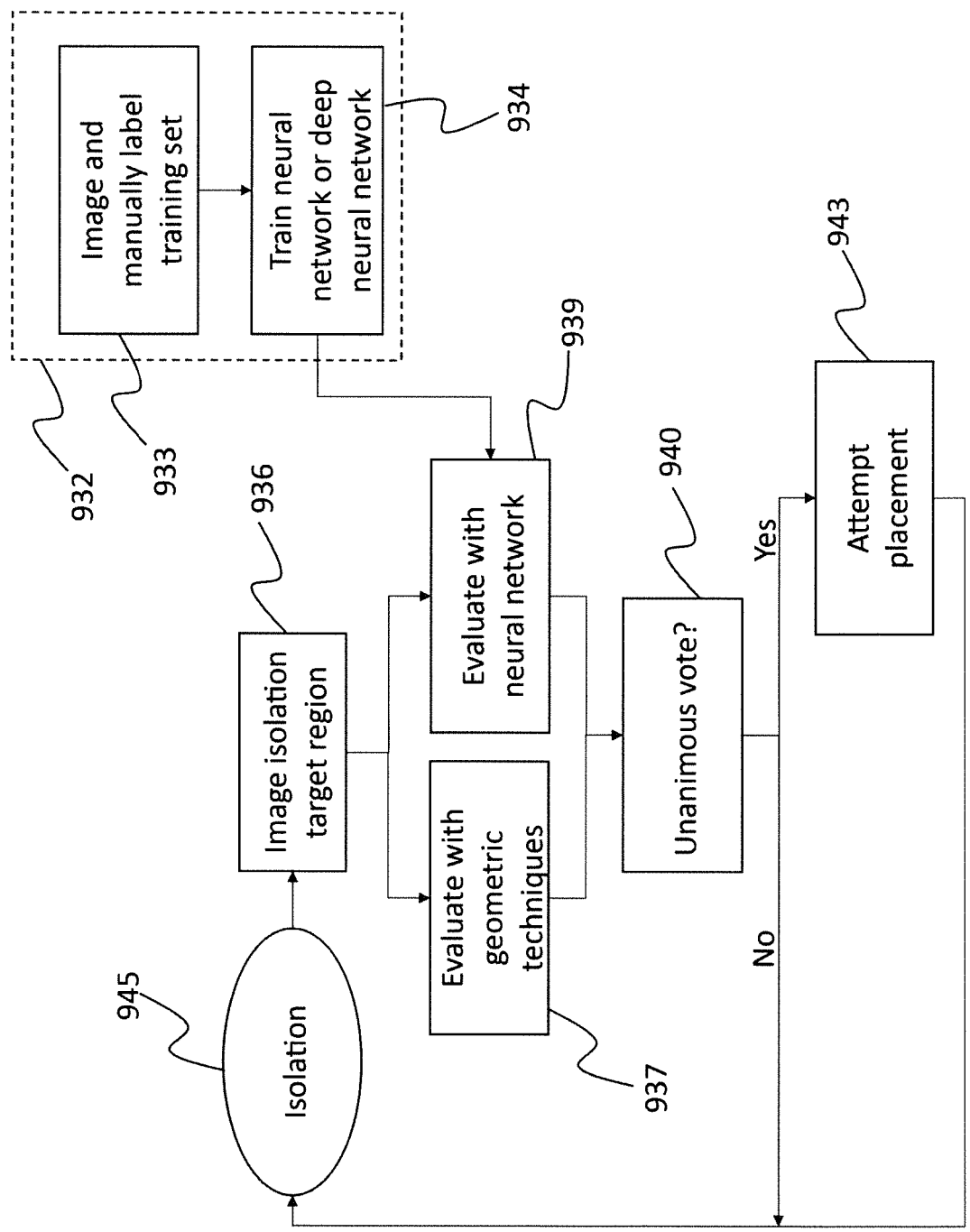
FIG. 29 is a process diagram for the evaluation of eyelashes using both geometric and neural network processes.

In another embodiment, shown in FIG. 29, neural networks, a type of machine learning, are used. Neural networks can be trained to recognize various types of objects in various images (among many other applications). Initially, this is shown in neural network initialization in box 932, which is performed in advance. First, a training set should be gathered and manually labeled, in training set step 933. This can be rather painstaking as various orientations and colors of eyelashes should be imaged and manually labeled. However, the problem is somewhat simplified by consistent lighting and textures in the controlled environment of the system. The set of images used should include both non-singleton eyelashes (such as images of crossed eyelashes and stacked eyelashes) as well as properly isolated eyelashes, with both sets properly labeled. Next is training step 934. During this step, the neural network is trained on the labeled data, and tested against a reserved portion of that data. Then, this resultant neural network can be loaded for use into the software of any number of systems.

One skilled in the art will note that this is not the only way to train a neural network, and in fact, methods for unsupervised learning (that which would not require manual labeling of data) are rapidly developing at this time. For example, rather than create real images of isolated, crossed, and stacked eyelashes, a deep generator network can be used to create synthetic images that would better train the neural network. Also, one skilled in the art will note that there are many types of neural networks, such as deep convolutional neural networks and others, that can be taught to recognize objects. Any or all of these processes and types of neural networks can be used in place of box 932.

After the neural network is trained, this neural network can be used in practice. First is isolation step 945, which refers to the previously discussed steps isolating a new eyelash. Once the eyelash is isolated, the isolated region is imaged in image isolation region step 936, which further includes calculating the geometric parameters from the image. The geometric parameters are then evaluated in evaluation step 937 as in the previous embodiment. In parallel, raw or conditioned image data is input into the neural network, in neural network evaluation step 939. Both the geometric methods and neural network methods output a yes/no signal indicating whether an isolated eyelash is present. Voting step 940 looks for agreement between the techniques, requiring that they both vote yes. Such a scheme helps to ensure that the isolated eyelash is indeed isolated. In some embodiments, rather than producing a simple yes/no signal, one or both of the methods produces a score, and voting step 940 heuristically evaluates the two scores. If voting step 940 returns that the eyelash is isolated (or is a cluster of the desired size), then placement can be attempted in placement step 943. If voting step 940 returns that the eyelash is not isolated, then isolation is reattempted in isolation step 945.

It is important to note that the neural network is shown here as an additional check on the geometric techniques previously described. This might make sense because currently the output of neural networks is very unpredictable when they are input images that for some reason differ appreciably from those on which the neural network was trained. However, it is possible that a neural network can be created that would inspire enough confidence to be used on its own. In that case, a system like that shown in FIG. 29 is used, however, evaluation step 937 is not performed, and the output of step 939 is solely used to determine whether to attempt placement.

Alternate Isolation Techniques

In yet another embodiment, the isolation can be performed by two independent probes rather than by a pair of tweezers. FIGS. 30A-D show human eyelid section 800 with associated eyelashes 799 from above. In FIG. 30A, first probe 801, which would be part of a robotic system and is shown in cross section as a circle, is pushed in between two of the eyelashes. In general, this can be done in any of the middle regions of the fan of the eyelashes, and the robotic system driving first probe 801 need not know the orientation of associated eyelashes 799. The robotic system need not know the orientation of associated eyelashes 799 because probe 801 is of small diameter and any individual eyelash will slide to one side or the other of it as it is pushed generally in direction 798. In FIG. 30B, first probe 801 has approached close to eyelid section 800 along first direction 798, stopped, and then been moved generally along second direction 797. This has allowed the upper portion of associated eyelashes 799 to be moved up, creating clear space 802 above isolated eyelash 803.

Next, isolated eyelash 803 is examined by the computer vision system, which uses stereo vision as described above to estimate the position of isolated eyelash 803. This is possible because it is now simple for the computer vision system to solve the stereo correspondence problem because the position of isolated eyelash 803 will be clear in both of the stereo cameras. That is, it will be simple to match isolated eyelash 803 between the cameras. Furthermore, because the view of isolated eyelash 803 is generally not occluded on at least one side, the computer vision system will be better able to estimate its geometry. Because of this, second probe 804 can be accurately positioned just below the tip of isolated eyelash 803. Then, by moving second probe 804 along first direction 798, second probe 804 can be reliably inserted between isolated eyelash 803 and its lower neighbors. Then, by moving second probe 804 generally opposite second direction 797, the eyelashes below isolated eyelash 803 are moved down, and clear space 802 grows to include both sides of isolated eyelash 803, which is now truly isolated. It should be noted that either this method of isolation or the tweezer method of isolation discussed above can be used in conjunction with the procedures shown in FIG. 27. That is, FIG. 27 is agnostic to the type of isolation strategy used.

It should be noted that both isolation strategies have a similar underlying geometry of two probes closely spaced isolating eyelashes—in a sense, tweezers are simply two joined probes. It also should be noted that the direction 798 can be modified to perform essentially the same procedure in a different way. For example, in FIG. 30A, if first probe 801 were above the eyelashes 799 with height being measured on an axis which points out of the page (not shown), then probe 801 can proceed in direction 798 without entering the field of eyelashes 799 until it reached a point near eyelid 800 at which time it can be plunged into eyelashes 799 by moving into the page. Such a strategy can produce a slightly different result than simply moving into the eyelashes in direction 798 (e.g., such a strategy can be helpful in the case of two eyelashes that cross near their tips).

From this point, the procedure can proceed as described above in the flow chart of FIG. 27. Because isolated eyelash 803 is now truly isolated, it can be inspected to ensure that it meets the criteria and parameters of a single isolated eyelash. If it is found to be doubled, it is possible to then repeat just the latter steps with second probe 804 to see if it is possible to dislodge the doubled eyelashes. This embodiment is advantageous because it will produce an isolated eyelash even in very dense eyelashes where it may not be possible to simply push tweezers through the fan of the eyelashes in order to isolate eyelashes, yet it still does not require that the position of the eyelashes be individually known a priori.

In yet another variation, it is possible to accomplish isolation by brushing the eyelash region with a brush much like those which are referred to as mascara brushes. Furthermore, there are many other ways that fibers can be isolated from surrounding fibers that can be applied here.
Determining the Location of the Fan of the Eyelashes In many of the above embodiments, even if the position of every eyelash is not known, it is helpful to know the approximate position of the fan of the eyelashes. That is, it is helpful to know the approximate geometric position of the collection natural eyelashes so that, for example, tweezers 810 or first and second probe 801 and 804 can be inserted through the eyelashes and stop without relying on a force measurement when they touch subject 301. This can be achieved through a different solution of the stereo correspondence problem than above. In this embodiment, individual eyelashes are ignored by applying bandpass filter tuned to the coarse structure formed by groups of neighboring eyelashes rather than individual eyelashes. In one embodiment, the bandpass filtered images are binary sign of Laplacian of Gaussian filtered images. Signed Laplacian of Gaussian filters are well understood in the art of computer vision as a way to filter images. However, in this embodiment, the bandpass filter is tuned to be sensitive to features on the order of 5 to 20 eyelash diameters, which tends to find clusters of eyelashes. Once images from both the left and right cameras are filtered, an area correlation is performed to find the measured disparity that best matches the images. In practice, this technique has been found to accurately measure the position and orientation of the fan of the eyelashes.

Figure 31:
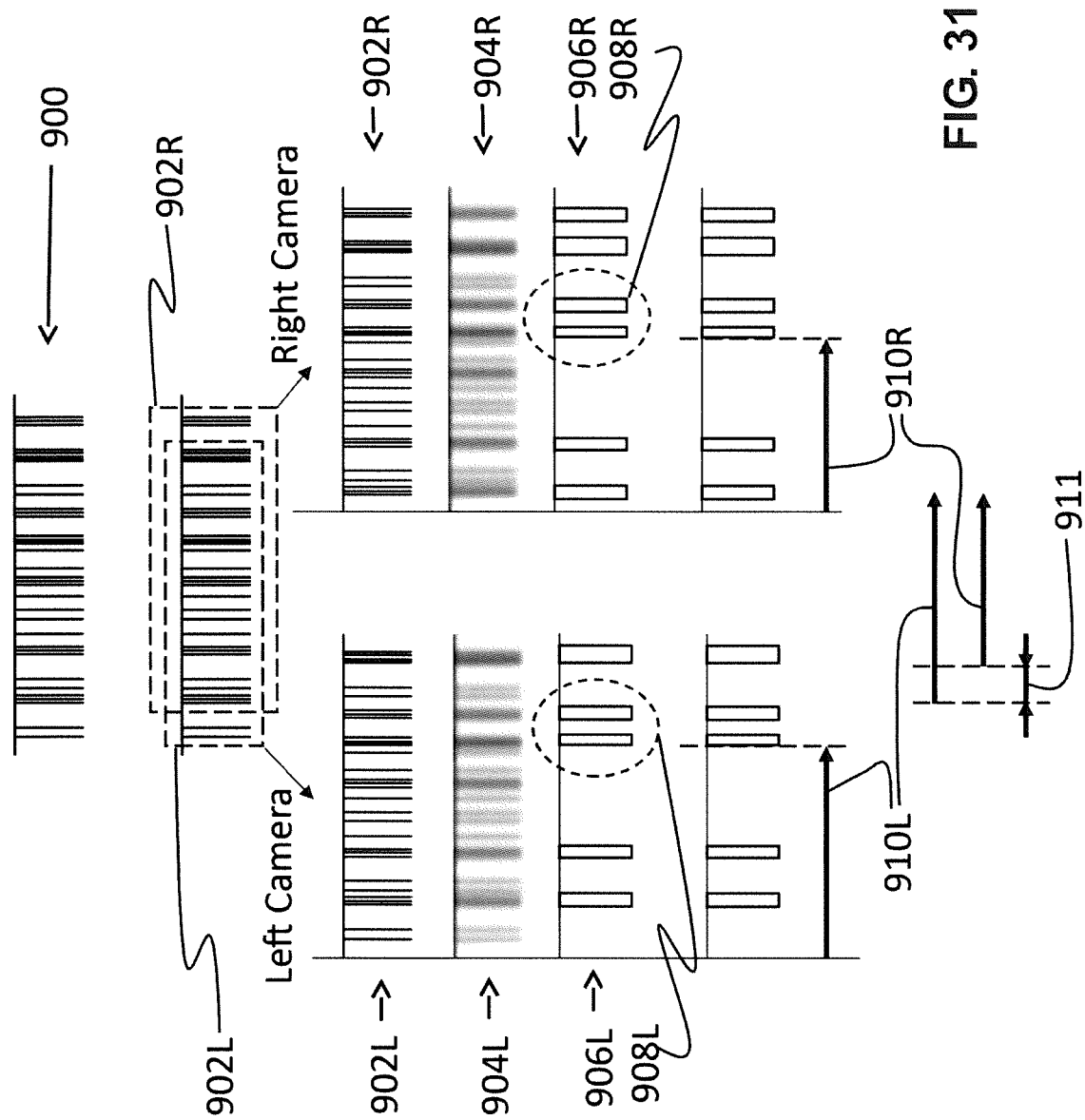
FIG. 31 shows how a general location of the natural human eyelash can be found using stereo computer vision.

This process can be elucidated with a simple schematic process. Consider FIG. 31, which shows rectilinear eyelash 900. It should be understood that this process applies just as well to eyelashes that are not perfectly rectilinear and that the eyelash is shown as rectilinear eyelash 900 simply for clarity of illustration. Rectilinear eyelash 900 is imaged with both right and left cameras, producing right raw image 902R and left raw image 902L. Note that right and left raw images 902R and 902L capture slightly different portions of rectilinear eyelash 900. Next, the right and left raw images 902R and 902L are filtered with a Gaussian filter, producing right and left blurred images 904R and 904L. Then a Laplacian operator is applied, which tends to emphasize edges found in the input images, resulting in right and left edge images 906R and 906L. Then, a correlation technique is applied, finding right and left matched portions 908R and 908L. By measuring the pixel displacement of each of right and left matched portions 908R and 908L, right and left image displacements 910R and 910L are produced. From the difference of these measurements, apparent stereo disparity 911 is produced, it is a straightforward question of trigonometry to then derive the displacement between the cameras and rectilinear eyelash 900 based on apparent stereo disparity 911 given the relative spacing and orientation of the right and left cameras (which is generally known in advance). In some embodiments, many clusters of eyelashes over the entire natural fan of the eyelashes are measured, producing a number of stereo disparity measurements. In some embodiments, these can simply be averaged in order to produce a single displacement to the natural human eyelash, in others a higher order model representing the curvature of the eyelash can be produced.

Other Variations on Isolation

For aesthetic reasons, it is sometimes desired to attach one eyelash extension to more than one eyelash, despite the issues associated with differential growth rates. In this case, the robot can be configured to glue some extensions specifically in clusters. However, the previous discussion on identifying single and grouped eyelashes still applies, since the device should identify appropriately doubled or grouped eyelashes for such a process. And, furthermore, some groups will be unsuitable for grouped extensions (e.g., if there are too many eyelashes in the group or if the constituent eyelashes are unacceptably crossing), and it will be desirable to identify these situations. Of course, the same types of criteria and parameters discussed above can apply to these situations as well, with different thresholds than for individual eyelashes.

In some cases, it can be possible to know the position of many of the eyelashes in the natural fan of the eyelashes. This can be the case if the person has sparse eyelashes, if the camera resolution is high relative to the number of eyelashes, or if fiducial references exist that provide an accurate way to solve the stereo correspondence problem. Indeed, it has been found that examining the distal ends of the eyelashes is the most accurate way to identify individual eyelash positions because there is good contrast and most eyelashes terminate singly even if they are proximally crossing or occluded. This technique can also be used to count the total number of eyelashes present. Still, even in this case, it can be difficult to know the position of every eyelash exactly. If a single eyelash is thought to be in a known location, however, either tweezers or a double probe as described above can be positioned exactly around this single eyelash and then used to isolate that eyelash. Doing so can simplify the isolation process and speed the isolation process. Because the isolated eyelash can then be accurately judged against acceptance criteria and parameters, it will not be catastrophic if the isolated eyelash turns out to have been incorrectly identified.

It can therefore be understood, from the foregoing examples, that it is of great importance to be able to determine if an isolated eyelash is indeed a singleton appropriate for extension, regardless of how much may be known about all the human eyelashes present. It is this interlocking interaction between isolation and determination if an eyelash is a singleton that is important to many embodiments of automatic eyelash extension.

It is important to note that while the previous discussion assumes a stereo camera pair for measurement of depth, there are other technologies that are available, such as lidar and laser scanning, that can produce depth data. Furthermore, in some embodiments, the camera is mounted to the robotic system and can be moved, simulating a stereo camera pair by changing its orientation. In some embodiments, the camera can be moved from a top view of an eyelash to a side view of the eyelash. But whatever technique is used, it is advantageous to isolate the eyelash in order to improve its measurement.

Other Options

Figure 32:
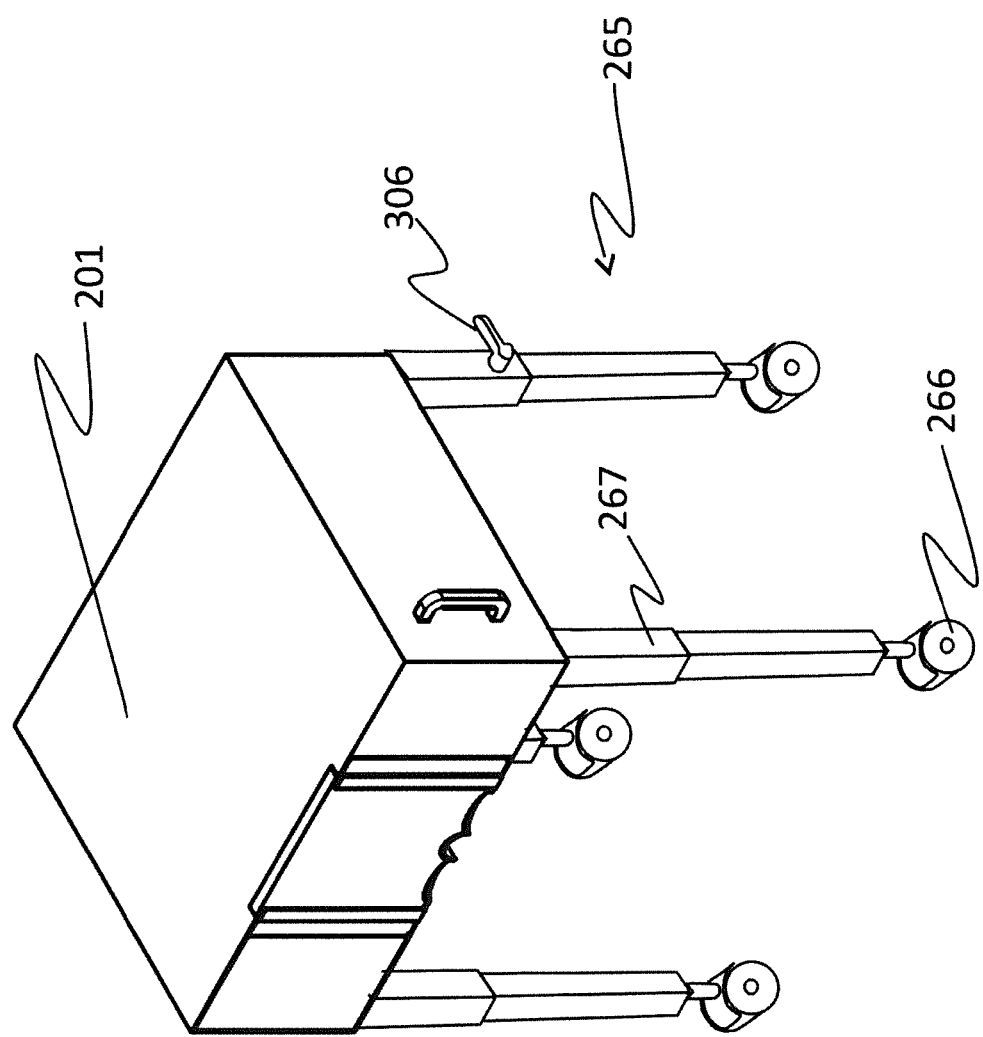
FIG. 32 shows a cart-type mount for the enclosure.

FIG. 32 shows a cart-based approach for mounting enclosure 201. In FIG. 32, instead of being mounted on arm 103, enclosure 201 is mounted on cart mechanism 265 which rolls on casters 266. Cart mechanism 265 includes a telescoping mechanism 267 on each leg (note that casters 266 and telescoping mechanism 267 are only labeled on one leg for clarity but are provided on each leg). Telescoping mechanisms 267 can be loaded with constant (or near constant) load springs which would provide enough upward force to cancel the weight of enclosure 201. The point of this is to make it very easy for the user to adjust the height of enclosure 201 properly. Once the proper height is attained, a lock 306 can be used to lock the telescoping mechanism 267 in place. Locks on the caster wheels can be provided as well. One skilled in the art will recognize that there are many ways to implement such a cart.

Some embodiments can take advantage of tape feeds to feed the extensions where extensions are mounted to tape which can be fed to the machine by reels such as in the typical machine used to install components onto circuit boards. In other embodiments, a continuous fiber can be fed to the device head which would be made into extensions of various lengths and curvatures during the process. The fiber can be fed to an end effector which would have a small tube or pinch rollers at its end where the fiber would be presented to the natural eyelash fiber. An automatic adhesive distribution device can then add a drop of adhesive. The system would then wait for the bond to take place, then feed an appropriate length of fiber out, and then cut the fiber to the appropriate length with an automatic cutting device. One can imagine in FIG. 10 that stationary tweezer side 258 can be a fiber feeder and moving side 259 can be the cutting mechanism. Those skilled in the art will note that this is much like the operation of a modern wire bonder. In fact, the fiber can be given various curvatures and tapers as it is fed out to get natural looks and styles. This can be accomplished by a system of rollers that may or may not use heat in addition to pressure to form the fed fiber into the desired shape.

Since robotic mechanism 219 is intended to move with high accelerations, it may cause undesirable motion of the enclosure 201. For this reason, it can be advisable to outfit some of the axes of motion (namely x and y which move the most) with counterweights. To explain how this is done, the y-axis will be discussed. Y-axis actuator 227 can be augmented with a counterweight by adding an additional cart (the y-axis counterweight cart) on the opposite side of y-axis actuator 227 from cart 230. This cart can be connected to the opposite side of the loop which y-axis belt 229 makes between the pulleys. For this reason, the y-axis counterweight cart would move whenever y-axis cart 230 moves, but in the opposite direction. If a weight was added to the y-axis counterweight cart which was of similar weight as everything attached to y-axis cart 230, then the loads on the system caused by accelerating the mass of the components traveling on y-axis cart 230 would tend to be canceled. A similar strategy can be employed on the x-axis as well.

In some embodiments, the inside of enclosure 201 is climate controlled to preserve the adhesive in cup 248. This avoids a classic problem of eyelash extension salons which is that the operators usually prefer to keep the salon at an ambient temperature which is too low for the subjects to be truly comfortable. In some embodiments, the climate local to the extension being placed is controlled so that the adhesive can be more rapidly cured. For example, the humidity can be momentarily raised after the extension is placed in order to accelerate the curing of the adhesive. It can be seen that a light mist of water can raise the humidity nearly instantly, and a small fan can later blow in dry room air to reduce the humidity. Such a system can preserve the workability of the adhesive and yet accelerate its curing, leading to a faster procedure time. In other embodiments, an accelerant is used other than water to accelerate the curing of the adhesive upon placement.

In some embodiments, the adhesive is provided in a dispenser, such as a bottle or a syringe that is actuated by the controller. In this embodiment, clean adhesive is supplied from the dispenser as needed. For example, the dispenser can be located in one of liquid loading zones 246 and 247, periodically dispensing adhesive into a cup like adhesive cup 248.

In some embodiments, the machine controller is connected to the internet so that it can charge a monetary sum to the machine operator/owner for each procedure. The system can use the internet connection to verify that the operator/owner has their account in good standing, and if so, it can perform the eyelash extension session and debit their account for each procedure. Or, it could ensure that the owner/operator has paid in accordance with some monthly, quarterly, or annual subscription for the right to operate the machine.

While some of the discussion above has focused on the use of tweezers or probes, it should be recognized that other "ends" can be used, if desired. For purposes of the present invention, the "end" or "ends" of a robot are the most distal point or points of the robot.

In some embodiments, the same device may be used for extending eyebrows rather than eyelashes, as eyebrows have rather similar properties to eyelashes.

Based on the above, it should be readily apparent that the present invention provides a way to more effectively install eyelash extensions, which reduces both the time and the cost of doing so. Although described with reference to preferred embodiments, it should be readily understood that various changes or modifications could be made to the invention without departing from the spirit thereof. In general, the invention is only intended to be limited by the scope of the following claims.

The invention claimed is:

1. A device configured to extend a natural eyelash of a plurality of natural eyelashes of a subject using an eyelash extension, the device comprising:
   a robotic mechanism configured to acquire the eyelash extension, manipulate the eyelash extension, and place the eyelash extension alongside the natural eyelash; and
   a computer vision system configured to communicate a position of the natural eyelash to the robotic mechanism.

2. The device of claim 1, wherein the robotic mechanism includes a Cartesian robot configured to provide linear motion along three mutually orthogonal axes.

3. The device of claim 2, wherein an additional two axes of motion are attached to an output of the Cartesian robot, the additional two axes of motion comprising a twist axis and a tilt axis.

4. The device of claim 3, wherein the robotic mechanism further includes a pair of tweezers attached to an output of the additional two axes of motion.

5. The device of claim 4, wherein the robotic mechanism further includes a selectively deployable probe connected alongside the pair of tweezers.

6. The device of claim 2, wherein an additional three axes of motion are attached to an output of the Cartesian robot, the additional three axes of motion comprising a twist axis, a tilt axis, and a roll axis.

7. The device of claim 6, wherein the robotic mechanism further includes a pair of tweezers attached to an output of the additional three axes of motion.

8. The device of claim 1, wherein the robotic mechanism includes a SCARA robot configured to provide:
   three parallel actuated joints of rotation in series, wherein each of the three parallel actuated joints of rotation has an axis of rotation aligned with the direction of gravity; and
   a fourth actuated joint of translation acting along an axis aligned with the direction of gravity.

9. The device of claim 8, wherein an additional two axes of motion are attached to an output of the SCARA robot, the additional two axes of motion comprising a twist axis and a tilt axis.

10. The device of claim 9, wherein the robotic mechanism further includes a first pair of tweezers attached to an output of the additional two axes of motion.

11. The device of claim 10, wherein the robotic mechanism further includes a second pair of tweezers configured to be separately actuatable from the first pair of tweezers, and at least one additional axis of motion is provided between the first and second pairs of tweezers.

12. The device of claim 10, wherein the robotic mechanism further includes a second pair of tweezers positioned around the first pair of tweezers, the robotic mechanism is configured to provide for relative and controlled translation between the first and second pairs of tweezers along the lengths of the first and second pairs of tweezers, and two additional axes of rotation are provided between the first and second pairs of tweezers.

13. The device of claim 8, wherein an additional three axes of motion are attached to an output of the SCARA robot, the additional three axes of motion comprising a twist axis, a tilt axis, and a roll axis.

14. The device of claim 13, wherein the robotic mechanism further includes a pair of tweezers attached to an output of the additional three axes of motion.

15. The device of claim 8, further comprising a controller in communication with the robotic mechanism, wherein the robotic mechanism further includes a robotic head mechanism mounted distal to the fourth actuated joint of translation, the robotic head mechanism including at least one pair of tweezers having an actuator that selectively opens and closes the at least one pair of tweezers, wherein the controller is configured to control the actuator, and a pair of tweezers of the at least one pair of tweezers is maximally distal to three rotational degrees of freedom of the robotic mechanism.

16. The device of claim 15, wherein each actuated joints of the robotic mechanism includes an electric motor.

17. The device of claim 1, wherein the robotic mechanism includes a six-axis robot configured to provide six axes of sequential rotation in series.

18. The device of claim 17, wherein the robotic mechanism further includes a first pair of tweezers attached to an output of the six-axis robot.

19. The device of claim 18, wherein the robotic mechanism further includes:
a second six-axis robot; and
a second pair of tweezers or sharp tipped probes attached to an output of the second six axis robot.

20. The device of claim 1, further comprising a controller configured to communicate with the robotic mechanism, wherein the computer vision system includes a camera configured to communicate with the controller.

21. The device of claim 20, wherein the computer vision system further includes at least one additional camera, and the computer vision system is configured to provide stereo computer vision.

22. The device of claim 1, wherein the computer vision system includes a laser range finder.

23. The device of claim 1, further comprising a controller, wherein the computer vision system is configured to monitor a position of the natural eyelash and a position of the eyelash extension and communicate the position of the natural eyelash and the position of the eyelash extension to the controller, and the controller is configured to use the position of the natural eyelash and the position of the eyelash extension to cause the robotic mechanism to manipulate the eyelash extension into an orientation substantially coaxial with the natural eyelash.

24. The device of claim 1, wherein the robotic mechanism includes redundant sensing and processing systems.

25. The device of claim 1, further comprising a liquid loading zone configured to store an adhesive, wherein the robotic mechanism is further configured to dip the eyelash extension into the adhesive.

26. The device of claim 1, further comprising a manual eyelash isolation tool configured to be used by a user to isolate the natural eyelash.

27. The device of claim 1, wherein the robotic mechanism includes a plurality of links coupled with actuators, a first end configured to grip the eyelash extension, and a second end configured to probe the plurality of natural eyelashes.

28. The device of claim 27, wherein the plurality of links coupled with actuators includes at least six links coupled through five actuated degrees of freedom.

29. The device of claim 27, wherein the robotic mechanism further includes a SCARA robot, a six-axis robot arm, or a Cartesian robot.

30. The device of claim 27, wherein the first end is further configured to grip a nail polish brush, and the robotic mechanism is further configured to apply nail polish to fingernails of the subject.

31. The device of claim 27, wherein the computer vision system is a stereo computer vision system including a camera having a mirror or a prism configured to produce a stereoscopic image pair onto the camera.

32. The device of claim 27, wherein the robotic mechanism further includes an actuator between the first and second ends, and the robotic mechanism is further configured to displace the first and second ends relative to one another.

33. The device of claim 32, wherein the actuator includes a twist axis and a tilt axis.

34. The device of claim 33, wherein the actuator further includes a thrust axis.

35. The device of claim 32, wherein the first and second ends are nested, and the first end is configured to place the eyelash extension onto the natural eyelash while the second end isolates the natural eyelash from the other eyelashes of the plurality of natural eyelashes.

36. The device of claim 27, wherein the first end includes a pair of tweezers.

37. The device of claim 27, wherein the second end includes a pair of tweezers.

38. The device of claim 27, wherein the second end includes a mechanism configured to manipulate two sharp tipped probes.

39. The device of claim 27, wherein each of the first and second ends is mounted on a respective robotic arm, and the robotic mechanism is configured to displace the first and second ends relative to one another.

40. The device of claim 27, wherein the computer vision system is further configured to communicate a position or a relative position of the first and second ends or a relative position of one of the first and second ends and the natural eyelash.

41. The device of claim 40, further comprising a controller configured to position the robotic mechanism based on the position or the relative position of the first and second ends or the relative position of one of the first and second ends and the natural eyelash.

42. A method of extending a natural eyelash of a plurality of natural eyelashes of a subject using an eyelash extension and a device including a robotic mechanism configured to manipulate the eyelash extension, the method comprising:

acquiring the eyelash extension with the robotic mechanism; and placing the eyelash extension alongside the natural eyelash with the robotic mechanism.

43. The method of claim 42, wherein the robotic mechanism has two ends, the first end comprises a mechanism configured to hold the eyelash extension, the second end comprises a mechanism configured to move the plurality of natural eyelashes, and placing the eyelash extension alongside the natural eyelash includes placing the eyelash extension alongside the natural eyelash with the first end, the method further comprising:

prior to placing the eyelash extension alongside the natural eyelash, moving the plurality of natural eyelashes with the second end until the natural eyelash is isolated from the other eyelashes of the plurality of natural eyelashes.

44. The method of claim 43, wherein the first end comprises a first pair of tweezers, the second end comprises a second pair of tweezers, acquiring the eyelash extension includes grasping the eyelash extension with the first pair of tweezers, placing the eyelash extension alongside the natural eyelash includes placing the eyelash extension alongside the natural eyelash with the first pair of tweezers, and moving the plurality of natural eyelashes includes pushing the second pair of tweezers around the natural eyelash, the method further comprising:

opening the second pair of tweezers, thereby isolating the natural eyelash.

45. The method of claim 43, wherein the mechanism of the second end comprises two sharp tipped probes.

46. The method of claim 43, wherein the device further includes a computer vision system configured to image the natural eyelash, the first end and the second end, the method further comprising:

determining a position of the natural eyelash, the first end and the second end with the computer vision system.

47. The method of claim 43, wherein moving the plurality of natural eyelashes occurs before the eyelash extension is acquired.

48. The method of claim 43, wherein the natural eyelash comprises a group of at least two natural eyelashes.

49. The method of claim 42, further comprising:

imaging a position of the natural eyelash; and communicating the position to the robotic mechanism, wherein placing the eyelash extension alongside the natural eyelash includes placing the eyelash extension alongside the natural eyelash based on the position.

50. The method of claim 49, wherein the robotic mechanism is configured to use visual servoing.

51. The method of claim 42, further comprising:

applying adhesive to the eyelash extension with the robotic mechanism before placing the eyelash extension alongside the natural eyelash; and attaching the eyelash extension to the natural eyelash.

52. The method of claim 51, further comprising:

acquiring a second eyelash extension with the robotic mechanism;

applying adhesive to the second eyelash extension with the robotic mechanism;

placing the second eyelash extension alongside a second natural eyelash of the plurality of natural eyelashes with the robotic mechanism; and attaching the second eyelash extension to the second natural eyelash.

53. The method of claim 42, further comprising using a manual eyelash isolation tool before the robotic mechanism places the eyelash extension alongside the natural eyelash.

* * * * *